US010921976B2

(12) United States Patent
Zambetti et al.

(10) Patent No.: US 10,921,976 B2
(45) Date of Patent: *Feb. 16, 2021

(54) USER INTERFACE FOR MANIPULATING USER INTERFACE OBJECTS

(71) Applicant: Apple Inc., Cupertino, CA (US)

(72) Inventors: Nicholas Zambetti, Largo, FL (US); Gary Ian Butcher, San Jose, CA (US); Imran Chaudhri, San Francisco, CA (US); Jonathan R. Dascola, San Francisco, CA (US); Anton M. Davydov, Gilroy, CA (US); Alan C. Dye, San Francisco, CA (US); Dylan Ross Edwards, San Jose, CA (US); Christopher Patrick Foss, San Francisco, CA (US); Aurelio Guzman, San Jose, CA (US); Jonathan P. Ive, San Jose, CA (US); Chanaka G. Karunamuni, San Jose, CA (US); Zachery Kennedy, San Jose, CA (US); Duncan Robert Kerr, San Francisco, CA (US); Nicholas V. King, San Jose, CA (US); Stephen O. Lemay, Palo Alto, CA (US); Natalia Maric, San Francisco, CA (US); Daniel Trent Preston, San Jose, CA (US); Christopher Wilson, San Francisco, CA (US); Eric Lance Wilson, San Jose, CA (US); Lawrence Y. Yang, Bellevue, WA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/930,300

(22) Filed: May 12, 2020

(65) Prior Publication Data
US 2020/0272293 A1    Aug. 27, 2020

Related U.S. Application Data

(63) Continuation of application No. 14/913,349, filed as application No. PCT/US2014/053957 on Sep. 3, (Continued)

(51) Int. Cl.
   G06F 3/048    (2013.01)
   G06F 3/033    (2013.01)
   (Continued)

(52) U.S. Cl.
   CPC .......... G06F 3/0488 (2013.01); G04G 21/08 (2013.01); G06F 1/163 (2013.01); G06F 1/1694 (2013.01);
   (Continued)

(58) Field of Classification Search
   None
   See application file for complete search history.

(56) References Cited

U.S. PATENT DOCUMENTS 4,358,837 A    11/1982    Yamazaki et al.
4,395,134 A    7/1983    Luce
(Continued)

FOREIGN PATENT DOCUMENTS

AU    2012200689 A1    3/2012
AU    2014100584 A4    7/2014
(Continued)

OTHER PUBLICATIONS

Baidu Experience, "iPhone how to move icon", Online available at: https://jingyan.baidu.com/article/eb9f7b6da4eacb869264e84f.html, Apr. 28, 2014, 4 pages (Official Copy Only) (See Communication under 37 CFR § 1.98(a) (3)).
(Continued)

*Primary Examiner* — Jordany Nunez
(74) *Attorney, Agent, or Firm* — Dentons US LLP

(57) ABSTRACT

User interface navigation on a personal electronics device based on movements of a crown is disclosed. The device can
(Continued)

select an appropriate level of information arranged along a z-axis for display based on crown movement. The navigation can be based on an angular velocity of the crown.

30 Claims, 28 Drawing Sheets

Related U.S. Application Data 2014, which is a continuation-in-part of application No. 14/476,657, filed on Sep. 3, 2014, now abandoned.

(60) Provisional application No. 61/873,356, filed on Sep. 3, 2013, provisional application No. 61/959,851, filed on Sep. 3, 2013, provisional application No. 61/873,359, filed on Sep. 3, 2013, provisional application No. 61/873,360, filed on Sep. 3, 2013.

(51) Int. Cl.
| | |
|---|---|
| G06F 3/0481 | (2013.01) |
| G06F 3/0488 | (2013.01) |
| G06F 1/16 | (2006.01) |
| G06F 3/0482 | (2013.01) |
| G06F 3/0485 | (2013.01) |
| G06F 3/0362 | (2013.01) |
| G04G 21/08 | (2010.01) |
| G06F 3/023 | (2006.01) |

(52) U.S. Cl.
CPC .......... *G06F 3/0236* (2013.01); *G06F 3/0362* (2013.01); *G06F 3/0482* (2013.01); *G06F 3/0485* (2013.01); *G06F 3/04817* (2013.01); *G06F 3/04883* (2013.01); *G06F 3/04886* (2013.01); *G06F 2203/04802* (2013.01)

(56) References Cited

U.S. PATENT DOCUMENTS

| | | |
|---|---|---|
| 4,623,261 A | 11/1986 | Muto |
| 4,974,174 A | 11/1990 | Kleinman |
| 5,088,070 A | 2/1992 | Shiff et al. |
| 5,204,600 A | 4/1993 | Kahkoska |
| 5,220,260 A | 6/1993 | Schuler |
| 5,305,435 A | 4/1994 | Bronson |
| 5,313,229 A | 5/1994 | Gilligan et al. |
| 5,323,363 A | 6/1994 | Hysek et al. |
| 5,329,501 A | 7/1994 | Meister et al. |
| 5,333,256 A | 7/1994 | Green et al. |
| 5,430,496 A | 7/1995 | Silverbrook et al. |
| 5,463,725 A | 10/1995 | Henckel et al. |
| 5,477,508 A | 12/1995 | Will |
| 5,508,978 A | 4/1996 | Kalbermatter et al. |
| 5,519,393 A | 5/1996 | Brandestini |
| 5,528,260 A | 6/1996 | Kent |
| 5,544,295 A | 8/1996 | Capps |
| 5,557,711 A | 9/1996 | Malzbender et al. |
| 5,563,631 A | 10/1996 | Masunaga |
| 5,572,649 A | 11/1996 | Elliott et al. |
| 5,689,628 A | 11/1997 | Robertson |
| 5,691,747 A | 11/1997 | Amano |
| 5,736,974 A | 4/1998 | Selker |
| 5,739,775 A | 4/1998 | Brandestini |
| 5,745,096 A | 4/1998 | Ludolph et al. |
| 5,751,260 A | 5/1998 | Nappi et al. |
| 5,825,353 A | 10/1998 | Will |
| 5,852,413 A | 12/1998 | Bacchi et al. |
| 5,874,961 A | 2/1999 | Bates et al. |
| 5,880,735 A | 3/1999 | Shinohara et al. |
| 5,903,229 A | 5/1999 | Kishi |
| 5,940,521 A | 8/1999 | East et al. |
| 5,943,039 A | 8/1999 | Anderson et al. |
| 5,960,366 A | 9/1999 | Duwaer |
| 5,973,694 A | 10/1999 | Steele et al. |
| 5,973,702 A | 10/1999 | Orton et al. |
| 5,982,710 A | 11/1999 | Rawat et al. |
| 6,002,398 A | 12/1999 | Wilson |
| 6,005,579 A * | 12/1999 | Sugiyama ........... G06F 3/04815 715/788 |
| 6,043,816 A | 3/2000 | Williams et al. |
| 6,081,256 A | 6/2000 | Martin et al. |
| 6,128,006 A | 10/2000 | Rosenberg et al. |
| 6,157,381 A | 12/2000 | Bates et al. |
| 6,161,957 A | 12/2000 | Guanter |
| 6,166,736 A | 12/2000 | Hugh |
| 6,192,258 B1 | 2/2001 | Kamada et al. |
| 6,202,096 B1 | 3/2001 | Arnold et al. |
| 6,203,190 B1 | 3/2001 | Stotz |
| 6,215,490 B1 | 4/2001 | Kaply |
| 6,230,170 B1 | 5/2001 | Zellweger et al. |
| 6,249,689 B1 | 6/2001 | Aizawa |
| 6,266,098 B1 | 7/2001 | Cove et al. |
| 6,297,795 B1 | 10/2001 | Kato et al. |
| 6,300,939 B1 | 10/2001 | Decker et al. |
| 6,305,234 B1 | 10/2001 | Thies et al. |
| 6,310,633 B1 | 10/2001 | Graham et al. |
| 6,310,648 B1 | 10/2001 | Miller et al. |
| 6,333,752 B1 | 12/2001 | Hasegawa et al. |
| 6,336,126 B1 | 1/2002 | Bjorklund et al. |
| 6,339,438 B1 | 1/2002 | Bates et al. |
| 6,351,657 B2 | 2/2002 | Yamada |
| 6,369,794 B1 | 4/2002 | Sakurai et al. |
| 6,396,482 B1 | 5/2002 | Griffin et al. |
| 6,429,883 B1 | 8/2002 | Plow et al. |
| 6,456,285 B2 | 9/2002 | Hayhurst et al. |
| 6,462,757 B1 | 10/2002 | Kao et al. |
| 6,477,117 B1 | 11/2002 | Narayanaswami et al. |
| 6,483,519 B1 | 11/2002 | Long et al. |
| 6,486,895 B1 | 11/2002 | Robertson et al. |
| 6,489,950 B1 | 12/2002 | Griffin et al. |
| 6,515,675 B1 | 2/2003 | Bourdev et al. |
| 6,525,997 B1 | 2/2003 | Narayanaswami et al. |
| 6,535,461 B1 | 3/2003 | Karhu et al. |
| 6,556,222 B1 | 4/2003 | Narayanaswami |
| 6,570,583 B1 | 5/2003 | Kung et al. |
| 6,597,374 B1 | 7/2003 | Baker et al. |
| 6,609,146 B1 | 8/2003 | Slotznick et al. |
| 6,636,197 B1 | 10/2003 | Goldenberg et al. |
| 6,636,245 B1 | 10/2003 | Estipona et al. |
| 6,636,246 B1 * | 10/2003 | Gallo ................. G06F 3/04815 715/746 |
| 6,647,338 B1 | 11/2003 | Remlinger et al. |
| 6,661,438 B1 | 12/2003 | Shiraishi et al. |
| 6,670,970 B1 | 12/2003 | Silverman et al. |
| 6,686,904 B1 | 2/2004 | Sherman et al. |
| 6,686,911 B1 | 2/2004 | Levin et al. |
| 6,700,564 B2 | 3/2004 | Mcloone et al. |
| 6,720,860 B1 | 4/2004 | Narayanaswami |
| 6,763,226 B1 | 7/2004 | McZeal, Jr. |
| 6,768,497 B2 | 7/2004 | Baar et al. |
| 6,788,220 B2 | 9/2004 | Netzer et al. |
| 6,801,230 B2 | 10/2004 | Driskell et al. |
| 6,809,275 B1 | 10/2004 | Cheng et al. |
| 6,809,724 B1 | 10/2004 | Shiraishi et al. |
| 6,842,169 B2 | 1/2005 | Griffin et al. |
| 6,937,228 B2 | 8/2005 | Yu |
| 6,957,395 B1 | 10/2005 | Jobs et al. |
| 6,967,642 B2 | 11/2005 | Sangiovanni et al. |
| 6,967,903 B2 | 11/2005 | Guanter et al. |
| 6,977,868 B2 | 12/2005 | Brewer et al. |
| 7,002,558 B2 | 2/2006 | Keely et al. |
| 7,046,230 B2 | 5/2006 | Zadesky et al. |
| 7,058,904 B1 | 6/2006 | Khan et al. |
| 7,075,513 B2 | 7/2006 | Silfverberg et al. |
| 7,081,905 B1 | 7/2006 | Raghunath |
| 7,091,964 B2 | 8/2006 | Wong et al. |
| 7,116,317 B2 | 10/2006 | Gregorio et al. |
| 7,136,064 B2 | 11/2006 | Zuiderveld et al. |
| 7,143,355 B2 | 11/2006 | Yamaguchi et al. |
| 7,146,005 B1 | 12/2006 | Anft et al. |
| 7,168,047 B1 | 1/2007 | Huppi et al. |

(56) References Cited

U.S. PATENT DOCUMENTS

| | | | |
|---|---|---|---|
| 7,227,963 B1 | 6/2007 | Yamada et al. | |
| 7,256,770 B2 | 8/2007 | Hinckley et al. | |
| 7,272,077 B2 | 9/2007 | Nobs et al. | |
| 7,286,063 B2 | 10/2007 | Gauthey et al. | |
| 7,286,119 B2 | 10/2007 | Miyashita et al. | |
| 7,317,449 B2 | 1/2008 | Robbins et al. | |
| 7,333,084 B2 | 2/2008 | Griffin et al. | |
| 7,355,609 B1 | 4/2008 | Voas et al. | |
| 7,458,014 B1 | 11/2008 | Rubin et al. | |
| 7,463,239 B2 | 12/2008 | Ledbetter et al. | |
| 7,469,381 B2 | 12/2008 | Ording | |
| 7,469,386 B2 | 12/2008 | Bear et al. | |
| 7,477,890 B1 | 1/2009 | Narayanaswami et al. | |
| 7,489,303 B1 | 2/2009 | Pryor | |
| 7,499,040 B2 | 3/2009 | Zadesky et al. | |
| 7,506,269 B2 | 3/2009 | Lang et al. | |
| 7,519,468 B2 | 4/2009 | Orr et al. | |
| 7,596,761 B2 * | 9/2009 | Lemay | G06F 3/0482 715/764 |
| 7,600,192 B1 * | 10/2009 | Hashimoto | G06F 3/0482 715/716 |
| 7,710,393 B2 | 5/2010 | Tsuk et al. | |
| 7,710,409 B2 | 5/2010 | Robbin et al. | |
| 7,720,552 B1 | 5/2010 | Lloyd | |
| 7,739,622 B2 | 6/2010 | Deline et al. | |
| 7,794,138 B2 | 9/2010 | Hilfiker | |
| 7,814,112 B2 | 10/2010 | Gupta et al. | |
| 7,844,915 B2 | 11/2010 | Platzer et al. | |
| 7,856,255 B2 | 12/2010 | Tsuchiya et al. | |
| 7,916,157 B1 | 3/2011 | Kelley et al. | |
| 7,954,056 B2 | 5/2011 | Graham | |
| 7,956,847 B2 * | 6/2011 | Christie | G11B 27/34 345/173 |
| 7,965,276 B1 | 6/2011 | Martin et al. | |
| 8,001,488 B1 | 8/2011 | Lam et al. | |
| 8,009,144 B2 | 8/2011 | Yajima et al. | |
| 8,046,705 B2 | 10/2011 | Hunleth et al. | |
| 8,130,205 B2 | 3/2012 | Forstall et al. | |
| 8,140,996 B2 | 3/2012 | Tomkins et al. | |
| 8,191,011 B2 * | 5/2012 | Abanami | G06F 3/0488 715/835 |
| 8,194,036 B1 | 6/2012 | Geiss et al. | |
| 8,196,061 B1 | 6/2012 | Bhojan | |
| 8,201,102 B2 | 6/2012 | Lee et al. | |
| 8,250,071 B1 | 8/2012 | Killalea et al. | |
| 8,266,550 B1 * | 9/2012 | Cleron | G06F 3/04845 715/863 |
| 8,290,777 B1 | 10/2012 | Nguyen et al. | |
| 8,307,306 B2 | 11/2012 | Komatsu et al. | |
| 8,311,727 B2 | 11/2012 | Eckstein et al. | |
| 8,365,090 B2 | 1/2013 | Ording | |
| 8,427,432 B2 | 4/2013 | Kim et al. | |
| 8,443,280 B2 | 5/2013 | Noyes | |
| 8,487,882 B2 * | 7/2013 | Inaba | G06F 1/1684 345/173 |
| 8,499,236 B1 | 7/2013 | Keljo | |
| 8,504,937 B2 | 8/2013 | Jobs et al. | |
| 8,533,623 B2 * | 9/2013 | St. Jacques, Jr. | G06F 3/04886 715/776 |
| 8,549,429 B2 * | 10/2013 | Tsuruta | G06F 3/0481 715/810 |
| 8,566,700 B2 | 10/2013 | Ueda | |
| 8,566,722 B2 | 10/2013 | Gordon et al. | |
| 8,627,236 B2 | 1/2014 | Jung et al. | |
| 8,656,040 B1 | 2/2014 | Bajaj et al. | |
| 8,665,209 B2 | 3/2014 | Rimas-Ribikauskas et al. | |
| 8,669,945 B2 | 3/2014 | Coddington | |
| 8,677,283 B2 | 3/2014 | Fong | |
| 8,686,944 B1 | 4/2014 | Dayer et al. | |
| 8,717,302 B1 | 5/2014 | Qin et al. | |
| 8,762,844 B2 | 6/2014 | Kim et al. | |
| 8,782,513 B2 | 7/2014 | Migos et al. | |
| 8,799,816 B2 | 8/2014 | Wells et al. | |
| 8,824,245 B2 | 9/2014 | Lau et al. | |
| 8,860,674 B2 | 10/2014 | Lee et al. | |
| 8,952,886 B2 | 2/2015 | Tsuk et al. | |
| 8,954,887 B1 | 2/2015 | Mendis et al. | |
| 9,001,625 B2 | 4/2015 | Essery et al. | |
| 9,007,057 B2 | 4/2015 | Villaret | |
| 9,007,302 B1 | 4/2015 | Bandt-horn | |
| 9,007,323 B2 | 4/2015 | Araki | |
| 9,052,814 B2 | 6/2015 | Ording | |
| 9,104,705 B2 | 8/2015 | Fujinaga | |
| 9,176,652 B1 | 11/2015 | Patel et al. | |
| 9,182,876 B2 * | 11/2015 | Kim | G06F 3/04817 |
| 9,189,089 B2 | 11/2015 | Sutton et al. | |
| 9,195,219 B2 | 11/2015 | Hong et al. | |
| 9,229,624 B2 * | 1/2016 | Wei | G06F 3/04842 |
| 9,268,400 B2 | 2/2016 | Gomez Sainz-Garcia | |
| 9,395,867 B2 | 7/2016 | Yach et al. | |
| 9,395,905 B2 | 7/2016 | Wherry | |
| 9,442,516 B2 | 9/2016 | Migos et al. | |
| 9,442,649 B2 | 9/2016 | Davis et al. | |
| 9,448,691 B2 * | 9/2016 | Suda | G06F 3/0482 |
| 9,552,015 B2 | 1/2017 | Capela et al. | |
| D778,912 S | 2/2017 | Akana et al. | |
| 9,582,187 B2 * | 2/2017 | Gil | G06F 3/04883 |
| 9,620,312 B2 | 4/2017 | Ely et al. | |
| 9,651,922 B2 | 5/2017 | Hysek et al. | |
| 9,666,178 B2 | 5/2017 | Loubiere et al. | |
| 9,678,571 B1 | 6/2017 | Robert et al. | |
| 9,696,809 B2 | 7/2017 | Temple | |
| 9,772,769 B2 | 9/2017 | Shimazu | |
| 9,798,443 B1 | 10/2017 | Gray | |
| 9,823,828 B2 | 11/2017 | Zambetti et al. | |
| D813,239 S | 3/2018 | Akana et al. | |
| 9,921,711 B2 * | 3/2018 | Oh | G06F 3/0488 |
| 9,965,144 B2 * | 5/2018 | Nakamura | G06F 3/0486 |
| 9,984,539 B2 | 5/2018 | Moussette et al. | |
| 10,019,097 B2 | 7/2018 | Ely et al. | |
| 10,048,802 B2 | 8/2018 | Shedletsky et al. | |
| 10,057,470 B2 | 8/2018 | Kim et al. | |
| 10,097,496 B2 | 10/2018 | Dye et al. | |
| 10,114,521 B2 | 10/2018 | Kocienda et al. | |
| 10,133,439 B1 * | 11/2018 | Brichter | G06F 3/0481 |
| 10,175,652 B2 | 1/2019 | Ely et al. | |
| 10,216,147 B2 | 2/2019 | Ely et al. | |
| 10,216,352 B2 | 2/2019 | Liang et al. | |
| 10,222,909 B2 | 3/2019 | Shedletsky et al. | |
| 10,275,117 B2 | 4/2019 | Zambetti et al. | |
| D849,749 S | 5/2019 | Akana et al. | |
| 10,289,218 B1 | 5/2019 | Young | |
| 10,296,125 B2 | 5/2019 | Ely et al. | |
| 10,324,620 B2 | 6/2019 | Balaram | |
| 10,331,081 B2 | 6/2019 | Ely et al. | |
| 10,331,082 B2 | 6/2019 | Ely et al. | |
| 10,339,721 B1 | 7/2019 | Dascola et al. | |
| 10,642,467 B2 | 5/2020 | Merminod et al. | |
| 2001/0004337 A1 | 6/2001 | Paratte et al. | |
| 2001/0011991 A1 | 8/2001 | Wang et al. | |
| 2001/0012018 A1 | 8/2001 | Hayhurst et al. | |
| 2001/0041596 A1 | 11/2001 | Forlenzo et al. | |
| 2002/0010707 A1 | 1/2002 | Chang et al. | |
| 2002/0019296 A1 | 2/2002 | Freeman et al. | |
| 2002/0027547 A1 | 3/2002 | Kamijo et al. | |
| 2002/0030665 A1 | 3/2002 | Ano | |
| 2002/0030668 A1 | 3/2002 | Hoshino et al. | |
| 2002/0036623 A1 | 3/2002 | Kano et al. | |
| 2002/0047860 A1 | 4/2002 | Ceulaer et al. | |
| 2002/0063684 A1 | 5/2002 | Tran | |
| 2002/0070935 A1 | 6/2002 | Suzuki et al. | |
| 2002/0075334 A1 | 6/2002 | Yfantis | |
| 2002/0083101 A1 | 6/2002 | Card et al. | |
| 2002/0101457 A1 * | 8/2002 | Lang | G06F 3/04892 715/856 |
| 2002/0101458 A1 | 8/2002 | Sangiovanni | |
| 2002/0113802 A1 | 8/2002 | Card et al. | |
| 2002/0118169 A1 | 8/2002 | Hinckley et al. | |
| 2002/0118230 A1 | 8/2002 | Card et al. | |
| 2002/0120651 A1 | 8/2002 | Pustejovsky et al. | |
| 2002/0122072 A1 | 9/2002 | Selker | |
| 2002/0126099 A1 | 9/2002 | Engholm | |
| 2002/0154150 A1 | 10/2002 | Ogaki et al. | |

(56) References Cited

U.S. PATENT DOCUMENTS

| | | |
|---|---|---|
| 2002/0154175 A1 | 10/2002 | Abello et al. |
| 2002/0171689 A1 | 11/2002 | Fox et al. |
| 2002/0186621 A1 | 12/2002 | Lai et al. |
| 2003/0020671 A1 | 1/2003 | Santoro et al. |
| 2003/0025673 A1 | 2/2003 | Ledbetter et al. |
| 2003/0030673 A1 | 2/2003 | Ho |
| 2003/0052901 A1 | 3/2003 | Fukuchi |
| 2003/0076301 A1 | 4/2003 | Tsuk et al. |
| 2003/0076352 A1 | 4/2003 | Uhlig et al. |
| 2003/0098891 A1 | 5/2003 | Molander et al. |
| 2003/0103044 A1 | 6/2003 | Sunda et al. |
| 2003/0112279 A1 | 6/2003 | Irimajiri |
| 2003/0115384 A1 | 6/2003 | Sonehara et al. |
| 2003/0123329 A1 | 7/2003 | Guanter et al. |
| 2003/0137540 A1 | 7/2003 | Klevenz et al. |
| 2003/0142081 A1 | 7/2003 | Iizuka et al. |
| 2003/0142288 A1 | 7/2003 | Kinrot et al. |
| 2003/0184598 A1 | 10/2003 | Graham |
| 2003/0189598 A1 | 10/2003 | Lipstein et al. |
| 2003/0210286 A1 | 11/2003 | Gerpheide et al. |
| 2004/0013042 A1 | 1/2004 | Farine et al. |
| 2004/0017404 A1 | 1/2004 | Schileru-key |
| 2004/0027793 A1 | 2/2004 | Haraguchi et al. |
| 2004/0038667 A1 | 2/2004 | Vance |
| 2004/0047244 A1 | 3/2004 | Iino et al. |
| 2004/0073935 A1 | 4/2004 | Kang |
| 2004/0080531 A1 | 4/2004 | Berstis |
| 2004/0085328 A1 | 5/2004 | Maruyama et al. |
| 2004/0100479 A1 | 5/2004 | Nakano et al. |
| 2004/0113819 A1 | 6/2004 | Gauthey et al. |
| 2004/0125081 A1 | 7/2004 | Hayakawa |
| 2004/0130580 A1 | 7/2004 | Howard et al. |
| 2004/0130581 A1 | 7/2004 | Howard et al. |
| 2004/0141016 A1 | 7/2004 | Fukatsu et al. |
| 2004/0145595 A1 | 7/2004 | Bennett |
| 2004/0150621 A1 | 8/2004 | Bohn |
| 2004/0155907 A1 | 8/2004 | Yamaguchi et al. |
| 2004/0170270 A1 | 9/2004 | Takashima et al. |
| 2004/0205514 A1 | 10/2004 | Sommerer et al. |
| 2004/0218472 A1 | 11/2004 | Narayanaswami et al. |
| 2004/0225613 A1 | 11/2004 | Narayanaswami et al. |
| 2004/0230599 A1* | 11/2004 | Moore .................. G06F 3/0483 |
| 2004/0233162 A1 | 11/2004 | Kobayashi |
| 2004/0239649 A1 | 12/2004 | Ludtke et al. |
| 2004/0239692 A1 | 12/2004 | Balle et al. |
| 2004/0252119 A1 | 12/2004 | Hunleth et al. |
| 2004/0257384 A1 | 12/2004 | Park et al. |
| 2004/0264301 A1 | 12/2004 | Howard et al. |
| 2005/0007884 A1 | 1/2005 | Lorenzato et al. |
| 2005/0012723 A1 | 1/2005 | Pallakoff |
| 2005/0081164 A1 | 4/2005 | Hama et al. |
| 2005/0097466 A1 | 5/2005 | Levi et al. |
| 2005/0116941 A1 | 6/2005 | Wallington et al. |
| 2005/0132281 A1 | 6/2005 | Pan et al. |
| 2005/0136955 A1 | 6/2005 | Mumick et al. |
| 2005/0168566 A1 | 8/2005 | Tada et al. |
| 2005/0183012 A1 | 8/2005 | Petro et al. |
| 2005/0191994 A1 | 9/2005 | May et al. |
| 2005/0195216 A1 | 9/2005 | Kramer et al. |
| 2005/0209051 A1 | 9/2005 | Santomassimo et al. |
| 2005/0215848 A1 | 9/2005 | Lorenzato et al. |
| 2005/0223068 A1 | 10/2005 | Shohfi et al. |
| 2005/0259077 A1 | 11/2005 | Adams et al. |
| 2005/0278757 A1 | 12/2005 | Grossman et al. |
| 2006/0007129 A1 | 1/2006 | Pletikosa et al. |
| 2006/0020904 A1 | 1/2006 | Aaltonen et al. |
| 2006/0022956 A1 | 2/2006 | Lengeling et al. |
| 2006/0026521 A1 | 2/2006 | Hotelling et al. |
| 2006/0026535 A1 | 2/2006 | Hotelling et al. |
| 2006/0028444 A1 | 2/2006 | Hinckley et al. |
| 2006/0028446 A1 | 2/2006 | Liberty et al. |
| 2006/0036962 A1 | 2/2006 | Jobs et al. |
| 2006/0064716 A1 | 3/2006 | Sull et al. |
| 2006/0085751 A1 | 4/2006 | O'brien et al. |
| 2006/0090090 A1 | 4/2006 | Perng et al. |
| 2006/0092177 A1 | 5/2006 | Blasko et al. |
| 2006/0101122 A1 | 5/2006 | Ishii |
| 2006/0112350 A1 | 5/2006 | Kato et al. |
| 2006/0143574 A1 | 6/2006 | Ito et al. |
| 2006/0150215 A1 | 7/2006 | Wroblewski et al. |
| 2006/0152480 A1 | 7/2006 | Senn |
| 2006/0181506 A1 | 8/2006 | Fyke et al. |
| 2006/0212905 A1 | 9/2006 | Matsuda et al. |
| 2006/0224945 A1 | 10/2006 | Khan et al. |
| 2006/0230346 A1 | 10/2006 | Bhogal et al. |
| 2006/0255683 A1 | 11/2006 | Suzuki et al. |
| 2006/0268019 A1 | 11/2006 | Wang et al. |
| 2006/0268020 A1 | 11/2006 | Han |
| 2006/0277486 A1 | 12/2006 | Skinner |
| 2006/0290671 A1 | 12/2006 | Bohn et al. |
| 2007/0002019 A1 | 1/2007 | Lane et al. |
| 2007/0031119 A1 | 2/2007 | Iwanaga |
| 2007/0035513 A1 | 2/2007 | Sherrard et al. |
| 2007/0046635 A1 | 3/2007 | Nishiyama et al. |
| 2007/0063995 A1 | 3/2007 | Bailey et al. |
| 2007/0070090 A1 | 3/2007 | Debettencourt et al. |
| 2007/0073917 A1 | 3/2007 | Larson et al. |
| 2007/0083828 A1 | 4/2007 | Toriyama et al. |
| 2007/0085841 A1 | 4/2007 | Tsuk et al. |
| 2007/0097151 A1 | 5/2007 | Rosenberg |
| 2007/0106949 A1* | 5/2007 | Narita ............... H04N 5/44543 715/757 |
| 2007/0120819 A1 | 5/2007 | Young et al. |
| 2007/0132733 A1 | 6/2007 | Ram |
| 2007/0157089 A1 | 7/2007 | Van Os et al. |
| 2007/0168369 A1 | 7/2007 | Bruns |
| 2007/0174761 A1 | 7/2007 | Lin et al. |
| 2007/0176910 A1 | 8/2007 | Simek et al. |
| 2007/0180379 A1 | 8/2007 | Osato et al. |
| 2007/0182595 A1 | 8/2007 | Ghasabian |
| 2007/0182999 A1 | 8/2007 | Anthony et al. |
| 2007/0209017 A1 | 9/2007 | Gupta et al. |
| 2007/0211042 A1 | 9/2007 | Kim et al. |
| 2007/0226646 A1 | 9/2007 | Nagiyama et al. |
| 2007/0229458 A1 | 10/2007 | Moon |
| 2007/0233736 A1 | 10/2007 | Xiong et al. |
| 2007/0236475 A1 | 10/2007 | Wherry |
| 2007/0236479 A1 | 10/2007 | Wang et al. |
| 2007/0237493 A1* | 10/2007 | Hall ................... G06F 16/447 386/240 |
| 2007/0239831 A1 | 10/2007 | Basu |
| 2007/0239837 A1 | 10/2007 | Jablokov et al. |
| 2007/0242569 A1 | 10/2007 | Inoue et al. |
| 2007/0247435 A1 | 10/2007 | Benko et al. |
| 2007/0277121 A1 | 11/2007 | Beckman |
| 2007/0279401 A1 | 12/2007 | Ramstein et al. |
| 2007/0290045 A1 | 12/2007 | Cisar |
| 2007/0296711 A1 | 12/2007 | Yee et al. |
| 2008/0001915 A1 | 1/2008 | Pihlaja et al. |
| 2008/0004084 A1 | 1/2008 | Park et al. |
| 2008/0020810 A1 | 1/2008 | Park |
| 2008/0043028 A1 | 2/2008 | Tanaka |
| 2008/0052945 A1 | 3/2008 | Matas et al. |
| 2008/0062127 A1 | 3/2008 | Brodersen et al. |
| 2008/0062141 A1 | 3/2008 | Chandhri |
| 2008/0066135 A1 | 3/2008 | Brodersen et al. |
| 2008/0123473 A1 | 5/2008 | Ozawa et al. |
| 2008/0125196 A1 | 5/2008 | Ryu |
| 2008/0129520 A1 | 6/2008 | Lee |
| 2008/0134033 A1 | 6/2008 | Burns et al. |
| 2008/0141182 A1 | 6/2008 | Barsness et al. |
| 2008/0148177 A1 | 6/2008 | Lang et al. |
| 2008/0150901 A1 | 6/2008 | Lowles et al. |
| 2008/0155461 A1 | 6/2008 | Ozaki et al. |
| 2008/0155475 A1 | 6/2008 | Duhig et al. |
| 2008/0158149 A1 | 7/2008 | Levin |
| 2008/0163116 A1 | 7/2008 | Lee et al. |
| 2008/0163119 A1* | 7/2008 | Kim ................... G11B 19/025 715/840 |
| 2008/0165124 A1 | 7/2008 | Kim |
| 2008/0165140 A1 | 7/2008 | Christie et al. |
| 2008/0165153 A1 | 7/2008 | Platzer et al. |
| 2008/0168073 A1 | 7/2008 | Siegel et al. |
| 2008/0168349 A1 | 7/2008 | Lamiraux et al. |

(56) References Cited

U.S. PATENT DOCUMENTS

| | | |
|---|---|---|
| 2008/0168382 A1 | 7/2008 | Louch et al. |
| 2008/0168384 A1 | 7/2008 | Platzer et al. |
| 2008/0168404 A1 | 7/2008 | Ording |
| 2008/0172634 A1 | 7/2008 | Choi et al. |
| 2008/0174570 A1 | 7/2008 | Jobs et al. |
| 2008/0186808 A1 | 8/2008 | Lee |
| 2008/0204478 A1 | 8/2008 | Hung |
| 2008/0207281 A1 | 8/2008 | Tsuchiya et al. |
| 2008/0216001 A1 | 9/2008 | Ording et al. |
| 2008/0224995 A1 | 9/2008 | Perkunder |
| 2008/0257701 A1 | 10/2008 | Wlotzka et al. |
| 2008/0266407 A1 | 10/2008 | Battles et al. |
| 2008/0279475 A1 | 11/2008 | Lee et al. |
| 2008/0288880 A1 | 11/2008 | Reponen et al. |
| 2008/0318635 A1 | 12/2008 | Yoon et al. |
| 2008/0319944 A1 | 12/2008 | Venolia et al. |
| 2008/0320391 A1 | 12/2008 | Lemay et al. |
| 2009/0007019 A1 | 1/2009 | Kobayashi et al. |
| 2009/0015550 A1 | 1/2009 | Koski et al. |
| 2009/0030800 A1 | 1/2009 | Grois |
| 2009/0046110 A1 | 2/2009 | Sadler et al. |
| 2009/0050465 A1 | 2/2009 | Asada et al. |
| 2009/0051649 A1 | 2/2009 | Rondel et al. |
| 2009/0059730 A1 | 3/2009 | Lyons et al. |
| 2009/0064031 A1 | 3/2009 | Bull et al. |
| 2009/0070705 A1 | 3/2009 | Ording |
| 2009/0070711 A1 | 3/2009 | Kwak et al. |
| 2009/0079698 A1 | 3/2009 | Takashima et al. |
| 2009/0089712 A1 | 4/2009 | Sato |
| 2009/0098912 A1 | 4/2009 | Kim et al. |
| 2009/0100373 A1 | 4/2009 | Pixley et al. |
| 2009/0103780 A1 | 4/2009 | Nishihara et al. |
| 2009/0109069 A1 | 4/2009 | Takasaki et al. |
| 2009/0113347 A1 | 4/2009 | Hess et al. |
| 2009/0119678 A1 | 5/2009 | Shih et al. |
| 2009/0138827 A1 | 5/2009 | Van Os et al. |
| 2009/0143117 A1 | 6/2009 | Shin et al. |
| 2009/0144642 A1 | 6/2009 | Crystal |
| 2009/0152452 A1 | 6/2009 | Lee et al. |
| 2009/0156255 A1 | 6/2009 | Shin et al. |
| 2009/0178008 A1 | 7/2009 | Herz et al. |
| 2009/0183100 A1 | 7/2009 | Eom et al. |
| 2009/0187825 A1 | 7/2009 | Sandquist et al. |
| 2009/0193359 A1 | 7/2009 | Anthony et al. |
| 2009/0196124 A1 | 8/2009 | Mooring et al. |
| 2009/0199130 A1 | 8/2009 | Tsern et al. |
| 2009/0204920 A1 | 8/2009 | Beverley et al. |
| 2009/0204929 A1 | 8/2009 | Baurmann et al. |
| 2009/0228126 A1 | 9/2009 | Spielberg et al. |
| 2009/0231271 A1 | 9/2009 | Heubel et al. |
| 2009/0235155 A1 | 9/2009 | Ueda |
| 2009/0235162 A1 | 9/2009 | Nuccio et al. |
| 2009/0241054 A1 | 9/2009 | Hendricks |
| 2009/0241150 A1 | 9/2009 | White et al. |
| 2009/0254867 A1 | 10/2009 | Farouki et al. |
| 2009/0259939 A1 | 10/2009 | Lockett et al. |
| 2009/0271381 A1 | 10/2009 | Beezer et al. |
| 2009/0288039 A1 | 11/2009 | Mail et al. |
| 2009/0293014 A1 | 11/2009 | Meuninck et al. |
| 2009/0315841 A1 | 12/2009 | Cheng et al. |
| 2009/0315867 A1* | 12/2009 | Sakamoto ........... G06F 3/03547 |
| | | 345/184 |
| 2009/0319888 A1 | 12/2009 | Oygard |
| 2009/0319928 A1 | 12/2009 | Alphin et al. |
| 2009/0325563 A1 | 12/2009 | Horodezky et al. |
| 2009/0327955 A1 | 12/2009 | Mouilleseaux et al. |
| 2010/0001967 A1 | 1/2010 | Yoo |
| 2010/0023878 A1 | 1/2010 | Douris et al. |
| 2010/0023883 A1 | 1/2010 | Khazaka et al. |
| 2010/0026640 A1 | 2/2010 | Kim et al. |
| 2010/0029327 A1 | 2/2010 | Jee |
| 2010/0044121 A1 | 2/2010 | Simon et al. |
| 2010/0045616 A1 | 2/2010 | Li et al. |
| 2010/0058223 A1 | 3/2010 | Price et al. |
| 2010/0058226 A1 | 3/2010 | Flake et al. |
| 2010/0058240 A1 | 3/2010 | Bull et al. |
| 2010/0066763 A1 | 3/2010 | Macdougall et al. |
| 2010/0070926 A1* | 3/2010 | Abanami .............. G06F 1/1626 |
| | | 715/835 |
| 2010/0073692 A1 | 3/2010 | Waltman et al. |
| 2010/0079500 A1 | 4/2010 | Osullivan et al. |
| 2010/0088634 A1* | 4/2010 | Tsuruta .................. G09G 5/14 |
| | | 715/800 |
| 2010/0093400 A1 | 4/2010 | Ju et al. |
| 2010/0107078 A1 | 4/2010 | Hayashi |
| 2010/0110044 A1 | 5/2010 | Englund |
| 2010/0113101 A1 | 5/2010 | Tanada |
| 2010/0125807 A1 | 5/2010 | Easterday et al. |
| 2010/0128570 A1 | 5/2010 | Smith et al. |
| 2010/0141609 A1 | 6/2010 | Frisbee |
| 2010/0146387 A1 | 6/2010 | Hoover |
| 2010/0148945 A1 | 6/2010 | Yun et al. |
| 2010/0164908 A1 | 7/2010 | Hill et al. |
| 2010/0169097 A1 | 7/2010 | Nachman et al. |
| 2010/0173678 A1 | 7/2010 | Kim et al. |
| 2010/0174606 A1 | 7/2010 | Hoyle |
| 2010/0175018 A1 | 7/2010 | Petschnigg et al. |
| 2010/0187074 A1 | 7/2010 | Manni |
| 2010/0188268 A1 | 7/2010 | Grignani et al. |
| 2010/0199232 A1 | 8/2010 | Mistry et al. |
| 2010/0211498 A1 | 8/2010 | Aabye et al. |
| 2010/0211919 A1* | 8/2010 | Brown .................. G06F 3/0482 |
| | | 715/863 |
| 2010/0214243 A1 | 8/2010 | Birnbaum et al. |
| 2010/0220562 A1 | 9/2010 | Hozumi et al. |
| 2010/0223055 A1 | 9/2010 | Mclean |
| 2010/0235742 A1 | 9/2010 | Hsu et al. |
| 2010/0241699 A1 | 9/2010 | Muthukumarasamy et al. |
| 2010/0241967 A1 | 9/2010 | Lee et al. |
| 2010/0242066 A1 | 9/2010 | Tseng et al. |
| 2010/0248778 A1 | 9/2010 | Biswas |
| 2010/0259481 A1 | 10/2010 | Oh et al. |
| 2010/0267424 A1 | 10/2010 | Kim et al. |
| 2010/0269038 A1 | 10/2010 | Tsuda |
| 2010/0271340 A1 | 10/2010 | Nagashima et al. |
| 2010/0271342 A1 | 10/2010 | Nagashima et al. |
| 2010/0271343 A1 | 10/2010 | Nagashima et al. |
| 2010/0277126 A1 | 11/2010 | Naeimi et al. |
| 2010/0283743 A1 | 11/2010 | Coddington |
| 2010/0289217 A1 | 11/2010 | Lavie et al. |
| 2010/0315417 A1 | 12/2010 | Cho et al. |
| 2010/0325575 A1 | 12/2010 | Platzer et al. |
| 2010/0331145 A1 | 12/2010 | Lakovic et al. |
| 2010/0333045 A1 | 12/2010 | Guéziec et al. |
| 2011/0006980 A1 | 1/2011 | Taniguchi et al. |
| 2011/0007029 A1 | 1/2011 | Ben-david |
| 2011/0014956 A1 | 1/2011 | Lee et al. |
| 2011/0022472 A1 | 1/2011 | Zon et al. |
| 2011/0025311 A1 | 2/2011 | Chauvin et al. |
| 2011/0025624 A1 | 2/2011 | Goto |
| 2011/0041056 A1 | 2/2011 | Griffin et al. |
| 2011/0055752 A1 | 3/2011 | Rubinstein et al. |
| 2011/0057877 A1 | 3/2011 | Nagashima et al. |
| 2011/0057886 A1 | 3/2011 | Ng et al. |
| 2011/0072345 A1 | 3/2011 | Lim |
| 2011/0074719 A1 | 3/2011 | Yeh et al. |
| 2011/0074824 A1 | 3/2011 | Srinivasan et al. |
| 2011/0086613 A1 | 4/2011 | Doudkine et al. |
| 2011/0087955 A1 | 4/2011 | Ho et al. |
| 2011/0090255 A1 | 4/2011 | Wilson et al. |
| 2011/0091182 A1 | 4/2011 | Look et al. |
| 2011/0099509 A1 | 4/2011 | Horagai et al. |
| 2011/0102455 A1 | 5/2011 | Temple |
| 2011/0107241 A1 | 5/2011 | Moore |
| 2011/0126155 A1 | 5/2011 | Krishnaraj et al. |
| 2011/0128226 A1 | 6/2011 | Jensen |
| 2011/0131494 A1 | 6/2011 | Ono et al. |
| 2011/0131531 A1 | 6/2011 | Russell et al. |
| 2011/0141031 A1 | 6/2011 | Mccullough et al. |
| 2011/0145691 A1 | 6/2011 | Noyes |
| 2011/0145692 A1 | 6/2011 | Noyes et al. |
| 2011/0157046 A1 | 6/2011 | Lee et al. |
| 2011/0164042 A1 | 7/2011 | Chaudhri |
| 2011/0167262 A1 | 7/2011 | Ross et al. |

(56) References Cited

U.S. PATENT DOCUMENTS

| | | |
|---|---|---|
| 2011/0187355 A1 | 8/2011 | Dixon et al. |
| 2011/0191710 A1 | 8/2011 | Jang et al. |
| 2011/0199342 A1 | 8/2011 | Vartanian et al. |
| 2011/0202834 A1* | 8/2011 | Mandryk ............ G06F 3/04883 715/701 |
| 2011/0202859 A1* | 8/2011 | Fong ................... G06F 3/04883 715/769 |
| 2011/0202866 A1 | 8/2011 | Huang et al. |
| 2011/0209099 A1 | 8/2011 | Hinckley et al. |
| 2011/0209104 A1 | 8/2011 | Hinckley et al. |
| 2011/0224967 A1 | 9/2011 | Van |
| 2011/0227810 A1 | 9/2011 | Mckinney et al. |
| 2011/0248948 A1 | 10/2011 | Griffin et al. |
| 2011/0252062 A1 | 10/2011 | Hanatani et al. |
| 2011/0252357 A1 | 10/2011 | Chaudhri |
| 2011/0252362 A1 | 10/2011 | Cho et al. |
| 2011/0252369 A1 | 10/2011 | Chaudhri |
| 2011/0252372 A1 | 10/2011 | Chaudhri |
| 2011/0252373 A1 | 10/2011 | Chaudhri |
| 2011/0252375 A1 | 10/2011 | Chaudhri |
| 2011/0261030 A1 | 10/2011 | Bullock |
| 2011/0271183 A1 | 11/2011 | Bose et al. |
| 2011/0279384 A1 | 11/2011 | Miller et al. |
| 2011/0295879 A1 | 12/2011 | Logis et al. |
| 2011/0296312 A1 | 12/2011 | Boyer et al. |
| 2011/0296344 A1 | 12/2011 | Habib et al. |
| 2011/0298830 A1 | 12/2011 | Lam |
| 2011/0302493 A1 | 12/2011 | Runstedler et al. |
| 2011/0302513 A1 | 12/2011 | Ademar et al. |
| 2011/0307842 A1 | 12/2011 | Chiang et al. |
| 2011/0316888 A1* | 12/2011 | Sachs .................... G06F 3/017 345/667 |
| 2012/0005622 A1 | 1/2012 | Park et al. |
| 2012/0011437 A1 | 1/2012 | James et al. |
| 2012/0023438 A1 | 1/2012 | Xia et al. |
| 2012/0023462 A1 | 1/2012 | Rosing et al. |
| 2012/0026198 A1 | 2/2012 | Maesaka |
| 2012/0030627 A1 | 2/2012 | Nurmi et al. |
| 2012/0032988 A1 | 2/2012 | Katayama et al. |
| 2012/0038582 A1 | 2/2012 | Grant |
| 2012/0044267 A1 | 2/2012 | Fino et al. |
| 2012/0050185 A1 | 3/2012 | Davydov et al. |
| 2012/0056848 A1 | 3/2012 | Yamano et al. |
| 2012/0062398 A1 | 3/2012 | Durand |
| 2012/0066638 A1 | 3/2012 | Ohri et al. |
| 2012/0068925 A1 | 3/2012 | Wong et al. |
| 2012/0083260 A1 | 4/2012 | Arriola et al. |
| 2012/0084644 A1 | 4/2012 | Robert et al. |
| 2012/0089951 A1 | 4/2012 | Cassidy |
| 2012/0092383 A1 | 4/2012 | Hysek et al. |
| 2012/0096344 A1 | 4/2012 | Ho et al. |
| 2012/0099406 A1 | 4/2012 | Lau et al. |
| 2012/0102387 A1 | 4/2012 | Badoiu et al. |
| 2012/0105484 A1 | 5/2012 | Cui |
| 2012/0121185 A1 | 5/2012 | Zavesky |
| 2012/0131470 A1 | 5/2012 | Wessling et al. |
| 2012/0131504 A1 | 5/2012 | Fadell et al. |
| 2012/0155223 A1 | 6/2012 | Hoover |
| 2012/0159373 A1 | 6/2012 | Archer et al. |
| 2012/0159380 A1 | 6/2012 | Kocienda et al. |
| 2012/0162261 A1* | 6/2012 | Kim ........................ G06F 3/017 345/647 |
| 2012/0166950 A1 | 6/2012 | Frumar et al. |
| 2012/0169776 A1 | 7/2012 | Rissa et al. |
| 2012/0174005 A1 | 7/2012 | Deutsch et al. |
| 2012/0179970 A1 | 7/2012 | Hayes |
| 2012/0179998 A1* | 7/2012 | Nesladek ............ G06F 3/0488 715/835 |
| 2012/0186951 A1 | 7/2012 | Wu et al. |
| 2012/0192068 A1 | 7/2012 | Migos et al. |
| 2012/0192102 A1 | 7/2012 | Migos et al. |
| 2012/0192110 A1* | 7/2012 | Wu ..................... G06F 3/04817 715/815 |
| 2012/0192118 A1 | 7/2012 | Migos et al. |
| 2012/0197743 A1 | 8/2012 | Grigg et al. |
| 2012/0226977 A1 | 9/2012 | Lengeling et al. |
| 2012/0236037 A1 | 9/2012 | Lessing et al. |
| 2012/0240085 A1 | 9/2012 | Sim et al. |
| 2012/0256863 A1 | 10/2012 | Zhang et al. |
| 2012/0272145 A1 | 10/2012 | Ryan et al. |
| 2012/0272181 A1 | 10/2012 | Rogers et al. |
| 2012/0274550 A1 | 11/2012 | Campbell et al. |
| 2012/0278725 A1 | 11/2012 | Gordon et al. |
| 2012/0278745 A1 | 11/2012 | Kim et al. |
| 2012/0280908 A1 | 11/2012 | Rhoads et al. |
| 2012/0284012 A1 | 11/2012 | Rodriguez et al. |
| 2012/0289290 A1 | 11/2012 | Chae et al. |
| 2012/0290472 A1 | 11/2012 | Mullen et al. |
| 2012/0297342 A1 | 11/2012 | Jang et al. |
| 2012/0304113 A1 | 11/2012 | Patten et al. |
| 2012/0306765 A1 | 12/2012 | Moore et al. |
| 2012/0324390 A1 | 12/2012 | Tao et al. |
| 2012/0327006 A1 | 12/2012 | Israr et al. |
| 2013/0019182 A1* | 1/2013 | Gil ......................... G06F 3/0482 715/738 |
| 2013/0024780 A1 | 1/2013 | Sutedja et al. |
| 2013/0024811 A1 | 1/2013 | Gleadall et al. |
| 2013/0027412 A1 | 1/2013 | Roddy |
| 2013/0038636 A1* | 2/2013 | Fujiwaka ............. G06F 3/0481 345/681 |
| 2013/0050109 A1 | 2/2013 | Ban |
| 2013/0055160 A1* | 2/2013 | Yamada ............. G06F 3/04883 715/810 |
| 2013/0067390 A1 | 3/2013 | Kwiatkowski et al. |
| 2013/0073932 A1 | 3/2013 | Migos et al. |
| 2013/0076774 A1 | 3/2013 | Yu et al. |
| 2013/0097566 A1 | 4/2013 | Berglund |
| 2013/0111342 A1 | 5/2013 | Alameh et al. |
| 2013/0111384 A1* | 5/2013 | Kim .................... G06F 3/04886 715/765 |
| 2013/0111407 A1 | 5/2013 | Mullen |
| 2013/0117689 A1* | 5/2013 | Lessing .................. G06F 3/041 715/752 |
| 2013/0117698 A1* | 5/2013 | Park .................... G06F 3/04817 715/765 |
| 2013/0127850 A1 | 5/2013 | Bindon |
| 2013/0135228 A1 | 5/2013 | Won et al. |
| 2013/0135234 A1* | 5/2013 | Hisano .................. G06F 3/0412 345/173 |
| 2013/0135236 A1* | 5/2013 | Yano .................... G06F 3/0483 345/173 |
| 2013/0139102 A1* | 5/2013 | Miura ................. G06F 3/04883 715/788 |
| 2013/0141342 A1 | 6/2013 | Bokma et al. |
| 2013/0142016 A1 | 6/2013 | Pozzo Di Borgo et al. |
| 2013/0145292 A1 | 6/2013 | Cohen et al. |
| 2013/0147747 A1 | 6/2013 | Takagi |
| 2013/0154933 A1 | 6/2013 | Sheik-nainar |
| 2013/0169579 A1 | 7/2013 | Havnor |
| 2013/0176020 A1 | 7/2013 | Chauvin et al. |
| 2013/0205244 A1 | 8/2013 | Decker et al. |
| 2013/0205939 A1 | 8/2013 | Meerovitsch et al. |
| 2013/0208013 A1 | 8/2013 | Yuu et al. |
| 2013/0218517 A1 | 8/2013 | Ausserlechner et al. |
| 2013/0222301 A1 | 8/2013 | Lee et al. |
| 2013/0226444 A1 | 8/2013 | Johansson et al. |
| 2013/0258819 A1 | 10/2013 | Hoover |
| 2013/0262564 A1 | 10/2013 | Wall et al. |
| 2013/0275918 A1 | 10/2013 | Antonini et al. |
| 2013/0282360 A1 | 10/2013 | Shimota et al. |
| 2013/0282459 A1 | 10/2013 | Smets et al. |
| 2013/0290116 A1 | 10/2013 | Hepworth et al. |
| 2013/0303087 A1 | 11/2013 | Hauser et al. |
| 2013/0305187 A1* | 11/2013 | Phillips ............... G06F 3/04845 715/800 |
| 2013/0311954 A1 | 11/2013 | Minkkinen et al. |
| 2013/0332886 A1 | 12/2013 | Cranfill et al. |
| 2013/0339343 A1 | 12/2013 | Hierons et al. |
| 2013/0339345 A1 | 12/2013 | Soto Matamala et al. |

(56) References Cited

U.S. PATENT DOCUMENTS

| | | |
|---|---|---|
| 2013/0342457 A1 | 12/2013 | Cox et al. |
| 2014/0028554 A1 | 1/2014 | De Los Reyes et al. |
| 2014/0028688 A1 | 1/2014 | Houjou et al. |
| 2014/0028735 A1 | 1/2014 | Williams et al. |
| 2014/0040742 A1 | 2/2014 | Park et al. |
| 2014/0075368 A1 | 3/2014 | Kim et al. |
| 2014/0092037 A1 | 4/2014 | Kim |
| 2014/0098102 A1 | 4/2014 | Raffle et al. |
| 2014/0105278 A1 | 4/2014 | Bivolarsky |
| 2014/0106734 A1 | 4/2014 | Lee |
| 2014/0132640 A1 | 5/2014 | Sharma et al. |
| 2014/0136443 A1 | 5/2014 | Kinsey et al. |
| 2014/0136981 A1 | 5/2014 | Xiang et al. |
| 2014/0137020 A1 | 5/2014 | Sharma et al. |
| 2014/0139422 A1 | 5/2014 | Misty et al. |
| 2014/0139637 A1 | 5/2014 | Misty et al. |
| 2014/0143678 A1 | 5/2014 | Misty et al. |
| 2014/0143737 A1 | 5/2014 | Mistry et al. |
| 2014/0157160 A1 | 6/2014 | Cudak et al. |
| 2014/0160078 A1 | 6/2014 | Seo et al. |
| 2014/0204229 A1 | 7/2014 | Leung et al. |
| 2014/0215340 A1 | 7/2014 | Shetty et al. |
| 2014/0215457 A1 | 7/2014 | Gava et al. |
| 2014/0222916 A1 | 8/2014 | Foley et al. |
| 2014/0237382 A1 | 8/2014 | Grandhi |
| 2014/0253487 A1 | 9/2014 | Bezinge et al. |
| 2014/0258935 A1 | 9/2014 | Nishida et al. |
| 2014/0260776 A1 | 9/2014 | Burleson et al. |
| 2014/0282214 A1 | 9/2014 | Shirzadi et al. |
| 2014/0292668 A1 | 10/2014 | Fricklas et al. |
| 2014/0306989 A1 | 10/2014 | Doubleday et al. |
| 2014/0328147 A1 | 11/2014 | Yang et al. |
| 2014/0330435 A1 | 11/2014 | Stoner et al. |
| 2014/0333670 A1 | 11/2014 | Balivada et al. |
| 2014/0344700 A1 | 11/2014 | Jenkins et al. |
| 2014/0347289 A1 | 11/2014 | Lee et al. |
| 2014/0362024 A1 | 12/2014 | Hicks |
| 2014/0372115 A1 | 12/2014 | Lebeau et al. |
| 2015/0036555 A1 | 2/2015 | Shin et al. |
| 2015/0046871 A1* | 2/2015 | Lewis .................. G06F 3/04883 715/798 |
| 2015/0058744 A1 | 2/2015 | Dhingra et al. |
| 2015/0067497 A1 | 3/2015 | Cieplinski et al. |
| 2015/0074615 A1 | 3/2015 | Han et al. |
| 2015/0077398 A1 | 3/2015 | Stokes et al. |
| 2015/0085621 A1 | 3/2015 | Hong et al. |
| 2015/0121224 A1 | 4/2015 | Krasnahill, Jr. |
| 2015/0149899 A1 | 5/2015 | Bernstein et al. |
| 2015/0178041 A1 | 6/2015 | Uskoreit |
| 2015/0199012 A1 | 7/2015 | Palmer |
| 2015/0199110 A1 | 7/2015 | Nakazato |
| 2015/0234518 A1 | 8/2015 | Teller et al. |
| 2015/0234562 A1 | 8/2015 | Ording |
| 2015/0242989 A1 | 8/2015 | Lee et al. |
| 2015/0261310 A1 | 9/2015 | Walmsley et al. |
| 2015/0261412 A1 | 9/2015 | Guillama et al. |
| 2015/0269944 A1 | 9/2015 | Wang |
| 2015/0277559 A1 | 10/2015 | Vescovi et al. |
| 2015/0281945 A1 | 10/2015 | Seo et al. |
| 2015/0302301 A1 | 10/2015 | Petersen |
| 2015/0370425 A1 | 12/2015 | Chen et al. |
| 2015/0370529 A1 | 12/2015 | Zambetti et al. |
| 2015/0378447 A1 | 12/2015 | Nagano et al. |
| 2015/0378555 A1* | 12/2015 | Ramanathan ....... G06F 3/04817 715/765 |
| 2016/0011758 A1 | 1/2016 | Meggs et al. |
| 2016/0034133 A1 | 2/2016 | Wilson |
| 2016/0034148 A1 | 2/2016 | Wilson et al. |
| 2016/0034152 A1 | 2/2016 | Wilson et al. |
| 2016/0034153 A1* | 2/2016 | Lejeune .............. G06F 3/04842 715/765 |
| 2016/0034166 A1 | 2/2016 | Wilson et al. |
| 2016/0034167 A1 | 2/2016 | Wilson et al. |
| 2016/0048296 A1 | 2/2016 | Gan et al. |
| 2016/0054710 A1 | 2/2016 | Kim et al. |
| 2016/0062466 A1 | 3/2016 | Verweij et al. |
| 2016/0062487 A1 | 3/2016 | Foss et al. |
| 2016/0062567 A1 | 3/2016 | Yang et al. |
| 2016/0062571 A1 | 3/2016 | Dascola et al. |
| 2016/0062572 A1 | 3/2016 | Yang et al. |
| 2016/0062573 A1 | 3/2016 | Dascola et al. |
| 2016/0062598 A1 | 3/2016 | Kocienda et al. |
| 2016/0062608 A1 | 3/2016 | Foss et al. |
| 2016/0063828 A1 | 3/2016 | Verweij et al. |
| 2016/0063850 A1 | 3/2016 | Yang et al. |
| 2016/0065509 A1 | 3/2016 | Butcher et al. |
| 2016/0065525 A1 | 3/2016 | Dye et al. |
| 2016/0071241 A1 | 3/2016 | Anzures et al. |
| 2016/0077495 A1 | 3/2016 | Brown et al. |
| 2016/0092063 A1 | 3/2016 | Lee |
| 2016/0098016 A1 | 4/2016 | Shedletsky et al. |
| 2016/0117141 A1 | 4/2016 | Ro et al. |
| 2016/0124626 A1 | 5/2016 | Lee et al. |
| 2016/0162164 A1* | 6/2016 | Phillips ................ G06F 3/0416 715/815 |
| 2016/0170436 A1 | 6/2016 | Farrar et al. |
| 2016/0170598 A1 | 6/2016 | Zambetti et al. |
| 2016/0170608 A1 | 6/2016 | Zambetti et al. |
| 2016/0170624 A1 | 6/2016 | Zambetti et al. |
| 2016/0170625 A1 | 6/2016 | Zambetti et al. |
| 2016/0180820 A1 | 6/2016 | Pascucci et al. |
| 2016/0202866 A1 | 7/2016 | Zambetti |
| 2016/0209939 A1 | 7/2016 | Zambetti et al. |
| 2016/0231883 A1 | 8/2016 | Zambetti |
| 2016/0259499 A1 | 9/2016 | Kocienda et al. |
| 2016/0259530 A1 | 9/2016 | Everitt et al. |
| 2016/0259535 A1 | 9/2016 | Seymour et al. |
| 2016/0269540 A1 | 9/2016 | Butcher et al. |
| 2016/0327911 A1 | 11/2016 | Eim et al. |
| 2017/0010678 A1 | 1/2017 | Tuli |
| 2017/0010751 A1 | 1/2017 | Shedletsky et al. |
| 2017/0045958 A1 | 2/2017 | Battlogg |
| 2017/0053542 A1 | 2/2017 | Wilson et al. |
| 2017/0089735 A1 | 3/2017 | Ruh |
| 2017/0104902 A1 | 4/2017 | Kim et al. |
| 2017/0208466 A1 | 7/2017 | Seo et al. |
| 2017/0255169 A1 | 9/2017 | Lee et al. |
| 2017/0269692 A1 | 9/2017 | Eck et al. |
| 2017/0315716 A1 | 11/2017 | Zambetti et al. |
| 2017/0357426 A1 | 12/2017 | Wilson et al. |
| 2017/0357427 A1 | 12/2017 | Wilson et al. |
| 2017/0358181 A1 | 12/2017 | Moussette et al. |
| 2018/0024683 A1 | 1/2018 | Ely et al. |
| 2018/0067557 A1 | 3/2018 | Robert et al. |
| 2018/0074690 A1 | 3/2018 | Zambetti et al. |
| 2018/0081453 A1 | 3/2018 | Ely |
| 2018/0088532 A1 | 3/2018 | Ely et al. |
| 2018/0088797 A1 | 3/2018 | Mcatee et al. |
| 2018/0210516 A1 | 7/2018 | Zambetti et al. |
| 2018/0307363 A1 | 10/2018 | Ely et al. |
| 2018/0335891 A1 | 11/2018 | Shedletsky et al. |
| 2018/0335901 A1 | 11/2018 | Manzari et al. |
| 2018/0336866 A1 | 11/2018 | Triverio et al. |
| 2018/0341344 A1 | 11/2018 | Foss et al. |
| 2018/0367489 A1 | 12/2018 | Dye et al. |
| 2019/0012063 A1 | 1/2019 | Kocienda et al. |
| 2019/0033862 A1 | 1/2019 | Groden et al. |
| 2019/0050055 A1 | 2/2019 | Chaudhri et al. |
| 2019/0056700 A1 | 2/2019 | Matsuno et al. |
| 2019/0072912 A1 | 3/2019 | Pandya et al. |
| 2019/0080066 A1 | 3/2019 | Van Os et al. |
| 2019/0080072 A1* | 3/2019 | Van Os .................. G06F 3/016 |
| 2019/0101870 A1 | 4/2019 | Pandya et al. |
| 2019/0163324 A1 | 5/2019 | Shedletsky et al. |
| 2019/0163329 A1 | 5/2019 | Yang et al. |
| 2019/0212885 A1 | 7/2019 | Zambetti et al. |
| 2019/0243471 A1 | 8/2019 | Foss et al. |
| 2019/0274565 A1 | 9/2019 | Soli et al. |
| 2019/0279520 A1 | 9/2019 | Wilson et al. |
| 2019/0354268 A1 | 11/2019 | Everitt et al. |
| 2020/0081538 A1 | 3/2020 | Moussette et al. |
| 2020/0081539 A1 | 3/2020 | Moussette et al. |

(56) References Cited

U.S. PATENT DOCUMENTS

| | | | |
|---|---|---|---|
| 2020/0110522 A1 | 4/2020 | Zambetti et al. | |
| 2020/0145361 A1 | 5/2020 | Dye et al. | |
| 2020/0167047 A1 | 5/2020 | Dascola et al. | |

FOREIGN PATENT DOCUMENTS

| | | |
|---|---|---|
| AU | 2016231505 A1 | 10/2016 |
| AU | 2018100429 A4 | 5/2018 |
| AU | 2018100429 B4 | 8/2018 |
| CH | 700242 A2 | 7/2010 |
| CN | 1330310 A | 1/2002 |
| CN | 1398366 A | 2/2003 |
| CN | 1549998 A | 11/2004 |
| CN | 1757011 A | 4/2006 |
| CN | 1797295 A | 7/2006 |
| CN | 1811899 A | 8/2006 |
| CN | 101101595 A | 1/2008 |
| CN | 103914261 A | 1/2008 |
| CN | 101202866 A | 6/2008 |
| CN | 101356493 A | 1/2009 |
| CN | 103995647 A | 1/2009 |
| CN | 103995724 A | 1/2009 |
| CN | 101390038 A | 3/2009 |
| CN | 101431545 A | 5/2009 |
| CN | 101446802 A | 6/2009 |
| CN | 101535938 A | 9/2009 |
| CN | 101625620 A | 1/2010 |
| CN | 101627349 A | 1/2010 |
| CN | 101770331 A | 7/2010 |
| CN | 101796478 A | 8/2010 |
| CN | 101876877 A | 11/2010 |
| CN | 101893992 A | 11/2010 |
| CN | 101976171 A | 2/2011 |
| CN | 102033710 A | 4/2011 |
| CN | 102037436 A | 4/2011 |
| CN | 102112946 A | 6/2011 |
| CN | 101241407 B | 7/2011 |
| CN | 102138120 A | 7/2011 |
| CN | 102402328 A | 4/2012 |
| CN | 102479027 A | 5/2012 |
| CN | 102508707 A | 6/2012 |
| CN | 102591579 A | 7/2012 |
| CN | 102750066 A | 10/2012 |
| CN | 102902453 A | 1/2013 |
| CN | 102902454 A | 1/2013 |
| CN | 102905181 A | 1/2013 |
| CN | 101034328 B | 2/2013 |
| CN | 102981770 A | 3/2013 |
| CN | 103069378 A | 4/2013 |
| CN | 103076942 A | 5/2013 |
| CN | 103460164 A | 12/2013 |
| CN | 103547987 A | 1/2014 |
| CN | 103870282 A | 3/2014 |
| CN | 103713848 A | 4/2014 |
| CN | 103777842 A | 5/2014 |
| CN | 103782252 A | 5/2014 |
| CN | 103793138 A | 5/2014 |
| CN | 103870255 A | 6/2014 |
| CN | 104166458 A | 11/2014 |
| CN | 107797657 A | 8/2017 |
| CN | 108139863 A | 8/2017 |
| CN | 108369455 A | 8/2017 |
| CN | 108304106 A | 1/2018 |
| EP | 1052566 A1 | 5/1999 |
| EP | 1168149 A2 | 6/2001 |
| EP | 1486860 A1 | 3/2003 |
| EP | 1505484 A1 | 5/2003 |
| EP | 1406158 A2 | 4/2004 |
| EP | 1517228 A2 | 9/2004 |
| EP | 2194452 A1 | 12/2006 |
| EP | 1850213 A2 | 2/2007 |
| EP | 1942401 A1 | 10/2007 |
| EP | 1956446 A2 | 11/2007 |
| EP | 1956433 A1 | 1/2008 |
| EP | 1944677 A2 | 7/2008 |
| EP | 2224317 A1 | 3/2009 |
| EP | 2124131 A2 | 5/2009 |
| EP | 2151745 A2 | 5/2009 |
| EP | 2207084 A2 | 11/2009 |
| EP | 2237140 A2 | 10/2010 |
| EP | 2302492 A2 | 3/2011 |
| EP | 2385451 A1 | 11/2011 |
| EP | 2525282 A2 | 11/2012 |
| EP | 2551784 A1 | 1/2013 |
| EP | 2565767 A1 | 3/2013 |
| EP | 2565769 A2 | 3/2013 |
| EP | 2610738 A2 | 7/2013 |
| EP | 2733579 A2 | 5/2014 |
| EP | 2733598 A2 | 5/2014 |
| EP | 2741176 A2 | 6/2014 |
| EP | 2911377 A1 | 8/2015 |
| EP | 3401770 A1 | 11/2018 |
| GB | 2392773 A | 3/2004 |
| GB | 2489580 A | 10/2012 |
| JP | 55-80084 A | 6/1980 |
| JP | 5-88812 A | 4/1993 |
| JP | 6-110881 A | 4/1994 |
| JP | 6-348408 A | 12/1994 |
| JP | 7-152478 A | 6/1995 |
| JP | 7-325700 A | 12/1995 |
| JP | 8-76926 A | 3/1996 |
| JP | 10-240488 A | 9/1998 |
| JP | 11-110106 A | 4/1999 |
| JP | 2000-40158 A | 2/2000 |
| JP | 2000-503153 A | 3/2000 |
| JP | 2000-242390 A | 9/2000 |
| JP | 2000-305760 A | 11/2000 |
| JP | 2001-100905 A | 4/2001 |
| JP | 2001-101202 A | 4/2001 |
| JP | 2001-202178 A | 7/2001 |
| JP | 2001-202181 A | 7/2001 |
| JP | 2002-288690 A | 10/2002 |
| JP | 2003-195998 A | 7/2003 |
| JP | 2003-248544 A | 9/2003 |
| JP | 2003-526820 A | 9/2003 |
| JP | 2003-330586 A | 11/2003 |
| JP | 2003-330856 A | 11/2003 |
| JP | 2004-21522 A | 1/2004 |
| JP | 2004-184396 A | 7/2004 |
| JP | 2004-259063 A | 9/2004 |
| JP | 2005-4891 A | 1/2005 |
| JP | 2005-45744 A | 2/2005 |
| JP | 2005-196077 A | 7/2005 |
| JP | 2006-11690 A | 1/2006 |
| JP | 2006-140990 A | 6/2006 |
| JP | 2006-185273 A | 7/2006 |
| JP | 2007-170995 A | 7/2007 |
| JP | 2007-179544 A | 7/2007 |
| JP | 2008-157974 A | 7/2008 |
| JP | 2008-276801 A | 11/2008 |
| JP | 2008-539513 A | 11/2008 |
| JP | 2009-59382 A | 3/2009 |
| JP | 2009-510404 A | 3/2009 |
| JP | 2009-80710 A | 4/2009 |
| JP | 2009-128296 A | 6/2009 |
| JP | 2009-246553 A | 10/2009 |
| JP | 2009-294526 A | 12/2009 |
| JP | 2010-97353 A | 4/2010 |
| JP | 2010-511939 A | 4/2010 |
| JP | 2010-522935 A | 7/2010 |
| JP | 2011-8540 A | 1/2011 |
| JP | 2011-90640 A | 5/2011 |
| JP | 2011-96043 A | 5/2011 |
| JP | 2011-530738 A | 12/2011 |
| JP | 2012-58979 A | 3/2012 |
| JP | 2012-155698 A | 8/2012 |
| JP | 2013-114844 A | 6/2013 |
| JP | 2013-122738 A | 6/2013 |
| JP | 2013-137750 A | 7/2013 |
| JP | 2014-42164 A | 3/2014 |
| JP | 2016-538653 A | 12/2016 |
| KR | 10-2004-107472 A | 12/2004 |
| KR | 100630154 B1 | 9/2006 |
| KR | 10-2010-0003589 A | 1/2010 |

(56) References Cited

FOREIGN PATENT DOCUMENTS

| | | |
|---|---|---|
| KR | 10-2010-0019887 A | 2/2010 |
| KR | 10-2010-0109277 A | 10/2010 |
| KR | 10-2011-0093090 A | 8/2011 |
| KR | 10-2011-0114294 A | 10/2011 |
| KR | 10-2012-0071468 A | 7/2012 |
| KR | 10-2012-0079707 A | 7/2012 |
| KR | 10-2013-0027017 A | 3/2013 |
| KR | 10-2015-0022599 A | 3/2015 |
| TW | I269202 B | 12/2006 |
| TW | D122820 S | 5/2008 |
| TW | 200843452 A | 11/2008 |
| TW | 201027419 A1 | 7/2010 |
| TW | 201119339 A | 6/2011 |
| TW | I349212 B | 9/2011 |
| TW | I381305 B | 1/2013 |
| TW | I384394 B1 | 2/2013 |
| TW | I394410 B1 | 4/2013 |
| TW | I395498 B | 5/2013 |
| TW | I405106 B | 8/2013 |
| TW | 201403363 A | 1/2014 |
| TW | 201403406 A | 1/2014 |
| TW | I426416 B | 2/2014 |
| TW | 201421340 A | 6/2014 |
| TW | 201426492 A | 7/2014 |
| TW | I443547 B | 7/2014 |
| TW | 201432552 A | 8/2014 |
| WO | 1993/08517 A1 | 4/1993 |
| WO | 1996/19872 A1 | 6/1996 |
| WO | 2001/69369 A1 | 9/2001 |
| WO | 2003/021568 A1 | 3/2003 |
| WO | 2006/037545 A2 | 4/2006 |
| WO | 2006/042309 A1 | 4/2006 |
| WO | 2007/002621 A2 | 1/2007 |
| WO | 2008/033853 A2 | 3/2008 |
| WO | 2008/067498 A2 | 6/2008 |
| WO | 2008/085742 A2 | 7/2008 |
| WO | 2008/086218 A2 | 7/2008 |
| WO | 2008/090902 A1 | 7/2008 |
| WO | 2008/106777 A1 | 9/2008 |
| WO | 2009/026508 A1 | 2/2009 |
| WO | 2009/085378 A1 | 7/2009 |
| WO | 2009/097592 A1 | 8/2009 |
| WO | 2010/024969 A1 | 3/2010 |
| WO | 2010/134729 A2 | 11/2010 |
| WO | 2010/150768 A1 | 12/2010 |
| WO | 2011/126502 A1 | 10/2011 |
| WO | 2012/006494 A1 | 1/2012 |
| WO | 2012/080020 A1 | 6/2012 |
| WO | 2012/103117 A1 | 8/2012 |
| WO | 2013/114844 A1 | 8/2013 |
| WO | 2013/169842 A2 | 11/2013 |
| WO | 2013/169846 A1 | 11/2013 |
| WO | 2013/169875 A2 | 11/2013 |
| WO | 2014/058816 A1 | 4/2014 |
| WO | 2014/105276 A1 | 7/2014 |
| WO | 2015/034969 A2 | 3/2015 |
| WO | 2016/144385 A1 | 9/2016 |
| WO | 2016/144563 A1 | 9/2016 |
| WO | 2017/027625 A2 | 2/2017 |
| WO | 2018/048518 A1 | 3/2018 |
| WO | 2018/048632 A1 | 3/2018 |

OTHER PUBLICATIONS

Non-Final Office Action received for U.S. Appl. No. 16/525,082, dated Jul. 9, 2020, 20 pages.
Notice of Allowance received for Chinese Patent Application No. 201580046331.1, dated Jun. 24, 2020, 4 pages (1 page of English Translation and 3 pages of Official Copy).
Office Action received for Chinese Patent Application No. 201580046339.8, dated Jun. 3, 2020, 19 pages (10 pages of English Translation and 9 pages of Official Copy).
Advisory Action received for U.S. Appl. No. 09/477,419, dated Dec. 4, 2002, 3 pages.
Advisory Action received for U.S. Appl. No. 11/069,977, dated Aug. 6, 2012, 3 pages.
Advisory Action received for U.S. Appl. No. 11/069,977, dated May 13, 2009, 2 pages.
Advisory Action received for U.S. Appl. No. 11/069,977, dated May 26, 2011, 3 pages.
Advisory Action received for U.S. Appl. No. 10/213,929, dated Sep. 22, 2006, 3 pages.
Advisory Action received for U.S. Appl. No. 13/077,850, dated Apr. 24, 2014, 3 pages.
Advisory Action received for U.S. Appl. No. 13/077,855, dated Jun. 15, 2016, 4 pages.
Advisory Action received for U.S. Appl. No. 13/077,862, dated Apr. 7, 2016, 3 pages.
Advisory Action received for U.S. Appl. No. 13/077,874, dated Aug. 19, 2016, 3 pages.
Advisory Action received for U.S. Appl. No. 14/641,308, dated Nov. 14, 2019, 4 pages.
Advisory Action received for U.S. Appl. No. 14/841,646, dated Nov. 21, 2018, 5 pages.
Advisory Action received for U.S. Appl. No. 15/049,058, dated Oct. 18, 2017, 3 pages.
Advisory Action received for U.S. Appl. No. 15/049,064, dated May 10, 2017, 3 pages.
Advisory Action received for U.S. Appl. No. 16/144,950, dated Feb. 20, 2020, 5 pages.
Advisory Action received for U.S. Appl. No. 16/147,413, dated Nov. 25, 2019, 6 pages.
Appeal Decision received for U.S. Appl. No. 13/077,862, dated Mar. 22, 2019, 10 pages.
Apple, "iPhone User's Guide", Available at <http://mesnotices.20minutes.fr/manuel-notice-mode-emploi/APPLE/IPHONE%2D%5FE#>, Retrieved on Mar. 27, 2008, Jun. 2007, 137 pages.
Appleltouchreviews, "The Best Cydia Tweak for Your iPhone, iPod Touch & iPad-Iconoclasm", Available online at: https://www.youtube.com/watch?v=EhriZRlNufQ, Apr. 23, 2011, 2 pages.
Applicant Initiated Interview Summary received for U.S. Appl. No. 14/913,345, dated Nov. 4, 2019, 5 pages.
Applicant Initiated Interview Summary received for U.S. Appl. No. 15/655,253, dated Mar. 31, 2020, 5 pages.
Applicant Initiated Interview Summary received for U.S. Appl. No. 15/655,253, dated Nov. 12, 2019, 3 pages.
Applicant Initiated Interview Summary received for U.S. Appl. No. 16/144,950, dated Jan. 29, 2020, 5 pages.
Applicant Initiated Interview Summary received for U.S. Appl. No. 16/147,413, dated Oct. 28, 2019, 5 pages.
Applicant-Initiated Interview Summary received for U.S. Appl. No. 14/641,308, dated Oct. 10, 2019, 5 pages.
Applicant-Initiated Interview Summary received for U.S. Appl. No. 15/418,537, dated Dec. 23, 2019, 6 pages.
Applicant-Initiated Interview Summary received for U.S. Appl. No. 15/818,500, dated Jan. 30, 2020, 5 pages.
Applicant-Initiated Interview Summary received for U.S. Appl. No. 16/130,838, dated Mar. 26, 2020, 8 pages.
Applicant-Initiated Interview Summary received for U.S. Appl. No. 16/147,413, dated Jun. 2, 2020, 4 pages.
Brinkmann Martin, "How to Zoom in Firefox", Ghacks, Available at <https://web.archive.org/web/20130804034728/https://www.ghacks.net/2009/02/23/how-to-zoom-in-firefox/>, Feb. 23, 2009, 11 pages.
Certificate of Examination received for Australian Patent Application No. 2017101561, dated Jun. 25, 2018, 2 pages.
Certificate of Examination received for Australian Patent Application No. 2018101076, dated Apr. 11, 2019, 2 pages.
Chester et al, "Mastering Excel 97", Sybex Inc, Fourth Edition, pp. 6, 35, and 44-45.
Colt Sam, "Here's One Way Apple's Smartwatch Could Be Better Than Anything Else", Business Insider, Aug. 21, 2014, pp. 1-4.
Corrected Notice of Allowance received for U.S. Appl. No. 13/077,874, dated Dec. 9, 2016, 2 pages.
Corrected Notice of Allowance received for U.S. Appl. No. 14/641,252, dated Aug. 28, 2018, 2 pages.
Corrected Notice of Allowance received for U.S. Appl. No. 14/641,252, dated Jul. 9, 2018, 25 pages.

(56) References Cited

OTHER PUBLICATIONS

Corrected Notice of Allowance received for U.S. Appl. No. 14/641,252, dated May 10, 2018, 10 pages.
Corrected Notice of Allowance received for U.S. Appl. No. 14/641,287, dated Aug. 9, 2018, 2 pages.
Corrected Notice of Allowance received for U.S. Appl. No. 14/641,287, dated Sep. 12, 2018, 2 pages.
Corrected Notice of Allowance received for U.S. Appl. No. 14/641,308, dated Mar. 10, 2020, 4 pages.
Corrected Notice of Allowance received for U.S. Appl. No. 14/829,573, dated Aug. 9, 2018, 3 pages.
Corrected Notice of Allowance received for U.S. Appl. No. 14/829,573, dated Sep. 11, 2018, 3 pages.
Corrected Notice of Allowance received for U.S. Appl. No. 14/830,629, dated Feb. 13, 2019, 3 pages.
Corrected Notice of Allowance received for U.S. Appl. No. 14/841,656, dated Apr. 11, 2018, 2 pages.
Corrected Notice of Allowance received for U.S. Appl. No. 14/841,656, dated May 7, 2018, 14 pages.
Corrected Notice of Allowance received for U.S. Appl. No. 14/913,345, dated Apr. 13, 2020, 4 pages.
Corrected Notice of Allowance received for U.S. Appl. No. 15/927,768, dated Aug. 7, 2019, 2 pages.
Corrected Notice of Allowance received for U.S. Appl. No. 15/927,768, dated Jul. 9, 2019, 2 pages.
Corrected Notice of Allowance received for U.S. Appl. No. 16/055,489, dated Feb. 26, 2019, 2 pages.
Corrected Notice of Allowance received for U.S. Appl. No. 16/109,120, dated Nov. 12, 2019, 2 pages.
Cowart Robert, "Mastering Windows 3.1", Sybex, Special Edition, 1993, pp. 66 67.
Cuyamaca LRC Computer Labs,"Topics in CommonSpace Application", Available at: http://www.cuyamaca.net/librarylab/Technical%20Help/cmspace.asp, Retrieved on May 19, 2014, 16 pages.
Decision on Appeal received for Korean Patent Application No. 10-2016-7008474, dated Jan. 29, 2020, 21 pages (2 pages of English Translation and 19 pages of Official Copy).
Decision on Appeal received for Korean Patent Application No. 10-2016-7008488, dated Oct. 18, 2019, 33 pages (4 pages of English Translation and 29 pages of Official Copy).
Decision to Grant received for Danish Patent Application No. PA201770181, dated Mar. 7, 2018, 2 pages.
Decision to Grant received for Danish Patent Application No. PA201870631, dated May 15, 2019, 2 pages.
Decision to Grant received for Danish Patent Application No. PA201870632, dated May 14, 2019, 2 pages.
Decision to Grant received for European Patent Application No. 12704175.4, dated Jul. 19, 2018, 2 pages.
Decision to Grant received for European Patent Application No. 14772002.3, dated Feb. 20, 2020, 2 pages.
Decision to Grant received for European Patent Application No. 15782209.9, dated Feb. 14, 2019, 2 pages.
Decision to Grant received for European Patent Application No. 18157131.6, dated May 16, 2019, 2 pages.
Dewsberry Victor, "Designing for Small Screens", AVA Publishing, 2005, 27 pages.
Esther, "Instructions for Kobo Books: How to change to scrolling mode and do table of contents navigation—Google Groups", XP055513050, retrieved from the Internet: URL: https://groups.google.com/forum/print/msg/viphone/dkqODh_31N8acJK2dGPe8J?ctz=4607561_ 48_52_123900_ 48_ 436380, Aug. 28, 2010, 3 pages.
European Search Report received for European Patent Application No. 19173371.6, dated Oct. 30, 2019, 7 pages.
European Search Report received for European Patent Application No. 19173886.3, dated Oct. 30, 2019, 8 pages.
European Search Report received for European Patent Application No. 19206249.5, dated Dec. 19, 2019, 4 pages.
Extended European Search Report received for European Patent Application No. 17810739.7, dated Mar. 22, 2019, 9 pages.
Extended European Search Report received for European Patent Application No. 18185408.4, dated Oct. 17, 2018, 10 pages.
Extended European Search Report received for European Patent Application No. 19156614.0, dated May 28, 2019, 9 pages.
Extended European Search Report received for European Patent Application No. 19195247.2, dated Mar. 9, 2020, 7 pages.
Extended European Search Report received for European Patent Application No. 19217240.1, dated May 25, 2020, 7 pages.
Final Office Action received for U.S. Appl. No. 09/477,419, dated Aug. 15, 2002, 13 pages.
Final Office Action received for U.S. Appl. No. 11/069,977, dated Feb. 3, 2009, 12 pages.
Final Office Action received for U.S. Appl. No. 11/069,977, dated Mar. 10, 2011, 18 pages.
Final Office Action received for U.S. Appl. No. 11/069,977, dated Mar. 11, 2010, 17 pages.
Final Office Action received for U.S. Appl. No. 11/069,977, dated Mar. 29, 2012, 19 pages.
Final Office Action received for U.S. Appl. No. 13/038,276, dated Mar. 27, 2014, 24 pages.
Final Office Action received for U.S. Appl. No. 13/038,276, dated Mar. 11, 2016, 36 pages.
Final Office Action received for U.S. Appl. No. 10/213,929, dated Dec. 14, 2004, 13 pages.
Final Office Action received for U.S. Appl. No. 10/213,929, dated Jul. 25, 2007, 25 pages.
Final Office Action received for U.S. Appl. No. 10/213,929, dated Mar. 22, 2006, 22 pages.
Final Office Action Received for U.S. Appl. No. 13/077,850, dated Nov. 7, 2013, 14 pages.
Final Office Action Received for U.S. Appl. No. 13/077,855, dated Mar. 17, 2014, 11 pages.
Final Office Action Received for U.S. Appl. No. 13/077,855, dated Nov. 7, 2013, 14 pages.
Final Office Action Received for U.S. Appl. No. 13/077,862, dated Nov. 8, 2013, 15 pages.
Final Office Action received for U.S. Appl. No. 13/077,862, dated Oct. 22, 2015, 16 pages.
Final Office Action Received for U.S. Appl. No. 13/077,867, dated May 23, 2013, May 23, 2013, 10 pages.
Final Office Action received for U.S. Appl. No. 13/077,874, dated Dec. 3, 2014, 23 pages.
Final Office Action received for U.S. Appl. No. 13/077,874, dated May 5, 2016, 26 pages.
Final Office Action received for U.S. Appl. No. 14/641,287, dated Jul. 20, 2017, 18 pages.
Final Office Action received for U.S. Appl. No. 14/641,308, dated Jul. 1, 2019, 46 pages.
Final Office Action received for U.S. Appl. No. 14/641,308, dated Mar. 14, 2018, 42 pages.
Final Office Action received for U.S. Appl. No. 14/830,629, dated Apr. 16, 2018, 27 pages.
Final Office Action received for U.S. Appl. No. 14/841,646, dated Aug. 2, 2018, 22 pages.
Final Office Action received for U.S. Appl. No. 14/913,345, dated Oct. 26, 2018, 20 pages.
Final Office Action received for U.S. Appl. No. 15/049,049 dated Jul. 12, 2018, 24 pages.
Final Office Action received for U.S. Appl. No. 15/049,049, dated May 23, 2017, 23 pages.
Final Office Action received for U.S. Appl. No. 15/049,058, dated Aug. 8, 2018, 23 pages.
Final Office Action received for U.S. Appl. No. 15/049,058, dated May 8, 2017, 21 pages.
Final Office Action received for U.S. Appl. No. 15/049,064, dated Feb. 27, 2017, 13 pages.
Final Office Action received for U.S. Appl. No. 15/418,537, dated Sep. 23, 2019, 53 pages.
Final Office Action received for U.S. Appl. No. 15/655,253, dated Feb. 4, 2020, 20 pages.
Final Office Action received for U.S. Appl. No. 15/818,500, dated Apr. 6, 2020, 15 pages.

(56) References Cited

OTHER PUBLICATIONS

Final Office Action received for U.S. Appl. No. 16/130,838, dated May 29, 2020, 25 pages.
Final Office Action received for U.S. Appl. No. 16/144,950, dated Nov. 25, 2019, 24 pages.
Final Office Action received for U.S. Appl. No. 16/147,413, dated Sep. 3, 2019, 19 pages.
Final Office Action received for U.S. Appl. No. 13/077,855, dated Mar. 24, 2016, 19 pages.
Getting Started, "Qualcomm Toq-smartwatch-User Manual", Available Online At: URL: https://toq.qualcomm.com/sites/default/files/qualcomm_toq_user_manual.pdf [retrieved on Jun. 25, 2015], Nov. 27, 2013, pp. 1-38.
"Headset Button Controller v7.3 APK Full APP Download for Android, Blackberry, iPhone", Jan. 27, 2014, 11 pages.
"How to move and arrange icons on iPhone", Available online at: https://www.youtube.com/watch?v=5XKAk4wSons, Retrieved on Sep. 10, 2015, Dec. 11, 2011, 1 page.
Intention to Grant received for Danish Patent Application No. PA201870631, dated Apr. 5, 2019, 2 pages.
Intention to Grant received for Danish Patent Application No. PA201870632, dated Apr. 5, 2019, 2 pages.
Intention to Grant received for European Patent Application No. 12704175.4, dated Mar. 22, 2018, 8 pages.
Intention to Grant received for European Patent Application No. 14772002.3, dated Jun. 24, 2019, 9 pages.
Intention to Grant received for European Patent Application No. 14772002.3, dated Nov. 6, 2019, 9 pages.
Intention to Grant received for European Patent Application No. 14772494.2, dated Mar. 16, 2020, 10 pages.
Intention to Grant received for European Patent Application No. 15782209.9, dated Sep. 28, 2018, 8 pages.
Intention to Grant received for European Patent Application No. 18157131.6, dated Jan. 9, 2019, 9 pages.
International Preliminary Report on Patentability received for PCT Patent Application No. PCT/US2012/022401, dated Aug. 8, 2013, 12 pages.
International Preliminary Report on Patentability received for PCT Patent Application No. PCT/US2012/025519, dated Sep. 12, 2013, 6 pages.
International Preliminary Report on Patentability received for PCT Patent Application No. PCT/US2014/053951, dated Mar. 17, 2016, 9 pages.
International Preliminary Report on Patentability received for PCT Patent Application No. PCT/US2014/053958, dated Mar. 17, 2016, 8 pages.
International Preliminary Report on Patentability received for PCT Patent Application No. PCT/US2014/053961, dated Jul. 21, 2016, 24 pages.
International Preliminary Report on Patentability received for PCT Patent Application No. PCT/US2015/019322, dated Mar. 16, 2017, 11 pages.
International Preliminary Report on Patentability received for PCT Patent Application No. PCT/US2015/045936, dated Mar. 16, 2017, 9 pages.
International Preliminary Report on Patentability received for PCT Patent Application No. PCT/US2015/045965, dated Dec. 27, 2016, 10 pages.
International Preliminary Report on Patentability received for PCT Patent Application No. PCT/US2015/054310, dated Sep. 14, 2017, 7 pages.
International Preliminary Report on Patentability received for PCT Patent Application No. PCT/US2016/019637, dated Sep. 21, 2017, 12 pages.
International Preliminary Report on Patentability received for PCT Patent Application No. PCT/US2017/035331, dated Dec. 20, 2018, 13 pages.
International Preliminary Report on Patentability received for PCT Patent Application No. PCT/US2015/019303, dated Mar. 16, 2017, 22 pages.
International Preliminary Report on Patentability received for PCT Patent Application No. PCT/US2015/019320, dated Mar. 16, 2017, 10 pages.
International Preliminary Report on Patentability received for PCT Patent Application No. PCT/US2015/019321, dated Mar. 16, 2017, 8 pages.
International Search Report and Written Opinion received for PCT Patent Application No. PCT/US2012/022401, dated Jul. 6, 2012, 16 pages.
International Search Report and Written Opinion received for PCT Patent Application No. PCT/US2012/025519, dated Jun. 11, 2012, 7 pages.
International Search Report and Written Opinion received for PCT Patent Application No. PCT/US2014/053951, dated Dec. 8, 2014, 11 pages.
International Search Report and Written Opinion received for PCT Patent Application No. PCT/US2014/053958, dated Feb. 19, 2015, 10 pages.
International Search Report and Written Opinion received for PCT Patent Application No. PCT/US2015/019303, dated Sep. 28, 2015, 27 pages.
International Search Report and Written Opinion received for PCT Patent Application No. PCT/US2015/019320, dated Jul. 2, 2015, 14 pages.
International Search Report and Written Opinion received for PCT Patent Application No. PCT/US2015/019321, dated Jun. 3, 2015, 11 pages.
International Search Report and Written Opinion received for PCT Patent Application No. PCT/US2015/019322, dated Jun. 18, 2015, 16 pages.
International Search Report and Written Opinion received for PCT Patent Application No. PCT/US2015/045936, dated Nov. 4, 2015, 12 pages.
International Search Report and Written Opinion received for PCT Patent Application No. PCT/US2015/045965, dated Feb. 1, 2016, 20 pages.
International Search Report and Written Opinion received for PCT Patent Application No. PCT/US2015/054310, dated Jan. 20, 2016, 10 pages.
International Search Report and Written Opinion received for PCT Patent Application No. PCT/US2016/019637, dated Aug. 18, 2016, 18 pages.
International Search Report and Written Opinion received for PCT Patent Application No. PCT/US2017/035331, dated Oct. 6, 2017, 18 pages.
International Search Report and Written Opinion received for PCT Patent Application No. PCT/US2019/049237, dated Jan. 8, 2020, 21 pages.
International Search Report received for PCT Patent Application No. PCT/US2014/053961, dated Jul. 11, 2016, 10 pages.
International Written Opinion received for PCT Patent Application No. PCT/US2014/053961, dated Jul. 11, 2016, 22 pages.
Invitation to Pay Additional Fee received for PCT Patent Application No. PCT/US2017/035331, Aug. 7, 2017, 4 pages.
Invitation to Pay Additional Fees received for PCT Patent Application No. PCT/US2012/022401, May 4, 2012, 8 pages.
Invitation to Pay Additional Fees received for PCT Patent Application No. PCT/US2014/053961, mailed on Aug. 3, 2015, 6 pages.
Invitation to Pay Additional Fees received for PCT Patent Application No. PCT/US2016/019637, mailed on Jun. 1, 2016, 6 pages.
Invitation to Pay Additional Fees received for PCT Patent Application No. PCT/US2019/049237, mailed on Oct. 31, 2019, 18 pages.
Ldinos, "Bejeweled Blitz—PC Game", Online available at: https://www.youtube.com/watch?v=8-p3FAxjKTs, Apr. 7, 2010, 1 page.
Non-Final Office Action received for U.S. Appl. No. 09/477,419, dated Apr. 17, 2002, 10 pages.
Non-Final Office Action received for U.S. Appl. No. 09/477,419, dated Apr. 22, 2003, 13 pages.
Non-Final Office Action received for U.S. Appl. No. 11/069,977, dated Aug. 9, 2011, 18 pages.
Non-Final Office Action received for U.S. Appl. No. 11/069,977, dated Jul. 31, 2009, 13 pages.

(56) References Cited

OTHER PUBLICATIONS

Non-Final Office Action received for U.S. Appl. No. 11/069,977, dated Sep. 19, 2008, 12 pages.
Non-Final Office Action received for U.S. Appl. No. 11/069,977, dated Oct. 4, 2010, 15 pages.
Non-Final Office Action received for U.S. Appl. No. 13/038,276, dated Jul. 29, 2015, 31 pages.
Non-Final Office Action received for U.S. Appl. No. 13/038,276, dated Sep. 12, 2013, 24 pages.
Non-Final Office Action received for U.S. Appl. No. 13/077,850, dated Mar. 28, 2013, 15 pages.
Non-Final Office Action received for U.S. Appl. No. 13/077,850, dated Sep. 10, 2015, 14 pages.
Non-Final Office Action received for U.S. Appl. No. 13/077,855, dated Aug. 13, 2015, 13 pages.
Non-Final Office Action received for U.S. Appl. No. 13/077,855, dated Mar. 28, 2013, 15 pages.
Non-Final Office Action received for U.S. Appl. No. 13/077,862, dated Dec. 29, 2014, 11 pages.
Non-Final Office Action received for U.S. Appl. No. 13/077,862, dated Mar. 15, 2013, 10 pages.
Non-Final Office Action received for U.S. Appl. No. 13/077,862, dated Nov. 21, 2019, 18 pages.
Non-Final Office Action received for U.S. Appl. No. 13/077,867, dated Dec. 21, 2012, 9 pages.
Non-Final Office Action received for U.S. Appl. No. 13/077,867, dated Jul. 20, 2012, Jul. 20, 2012, 10 pages.
Non-Final Office Action received for U.S. Appl. No. 13/077,874, dated Jun. 19, 2014, 15 pages.
Non-Final Office Action received for U.S. Appl. No. 14/641,287, dated Feb. 27, 2017, 18 pages.
Non-Final Office Action received for U.S. Appl. No. 14/641,308, dated Dec. 20, 2018, 43 pages.
Non-Final Office Action received for U.S. Appl. No. 14/641,308, dated Jun. 23, 2017, 53 pages.
Non-Final Office Action received for U.S. Appl. No. 14/829,573, dated Jan. 22, 2018, 26 pages.
Non-Final Office Action received for U.S. Appl. No. 14/830,629, dated Dec. 1, 2016, 20 pages.
Non-Final Office Action received for U.S. Appl. No. 14/830,629, dated Jun. 15, 2017, 24 pages.
Non-Final Office Action received for U.S. Appl. No. 14/841,646, dated Dec. 1, 2017, 23 pages.
Non-Final Office Action received for U.S. Appl. No. 14/841,656, dated Jul. 26, 2017, 20 pages.
Non-Final Office Action received for U.S. Appl. No. 14/913,345, dated Apr. 5, 2018, 15 pages.
Non-Final Office Action received for U.S. Appl. No. 14/913,350, dated May 14, 2018, 30 pages.
Non-Final Office Action received for U.S. Appl. No. 15/049,049 dated Dec. 15, 2017, 23 pages.
Non-Final Office Action received for U.S. Appl. No. 15/049,049, dated Feb. 6, 2019, 21 pages.
Non-Final Office Action received for U.S. Appl. No. 15/049,049, dated Nov. 9, 2016, 21 pages.
Non-Final Office Action received for U.S. Appl. No. 15/049,058, dated Feb. 20, 2018, 21 pages.
Non-Final Office Action received for U.S. Appl. No. 15/049,058, dated Jun. 5, 2019, 25 pages.
Non-Final Office Action received for U.S. Appl. No. 15/049,058, dated Nov. 16, 2016, 19 pages.
Non-Final Office Action received for U.S. Appl. No. 15/049,064, dated Oct. 27, 2016, 15 pages.
Non-Final Office Action received for U.S. Appl. No. 15/418,537, dated Dec. 13, 2018, 53 pages.
Non-Final Office Action received for U.S. Appl. No. 15/655,253, dated Jul. 10, 2019, 16 pages.
Non-Final Office Action received for U.S. Appl. No. 15/818,500, dated Aug. 30, 2019, 17 pages.
Non-Final Office Action received for U.S. Appl. No. 16/130,838, dated Jan. 7, 2020, 16 pages.
Non-Final Office Action received for U.S. Appl. No. 16/144,950, dated Mar. 6, 2019, 24 pages.
Non-Final Office Action received for U.S. Appl. No. 16/147,413, dated Feb. 7, 2019, 18 pages.
Non-Final Office Action received for U.S. Appl. No. 16/147,413, dated Mar. 11, 2020, 22 pages.
Non-Final Office Action received for U.S. Appl. No. 16/358,483, dated May 1, 2020, 37 pages.
Non-Final Office Action received for U.S. Appl. No. 16/384,726, dated May 14, 2020, 16 pages.
Non-Final Office Action received for U.S. Appl. No. 10/213,929, dated Aug. 24, 2005, 12 pages.
Non-Final Office Action received for U.S. Appl. No. 10/213,929, dated Feb. 12, 2007, 27 pages.
Non-Final Office Action received for U.S. Appl. No. 10/213,929, dated May 5, 2004, 11 pages.
Non-Final Office Action received for U.S. Appl. No. 13/077,874, dated Dec. 3, 2015, 23 pages.
Non-Final Office Action received for U.S. Appl. No. 14/913,345, dated Jun. 26, 2019, 23 pages.
Notice of Acceptance received for Australian Patent Application No. 2012209199, dated Jan. 27, 2016, 3 pages.
Notice of Acceptance received for Australian Patent Application No. 2014315319, dated Oct. 12, 2017, 3 pages.
Notice of Acceptance received for Australian Patent Application No. 2014315325, dated Apr. 19, 2017, 3 pages.
Notice of Acceptance received for Australian Patent Application No. 2017277851, dated Dec. 9, 2019, 3 pages.
Notice of Acceptance received for Australian Patent Application No. 2018200289, dated Jul. 23, 2019, 3 pages.
Notice of Acceptance received for Australian Patent Application No. 2019201628, dated Sep. 10, 2019, 3 pages.
Notice of Allowance and Search Report received for Taiwanese Patent Application No. 104128687, dated Jun. 7, 2016, 4 pages (1 page of English Translation and 3 pages of Official copy).
Notice of Allowance received for Australian Patent Application No. 2016202837, dated Apr. 21, 2017, 3 pages.
Notice of Allowance received for Chinese Patent Application No. 201280006317.5, dated Feb. 17, 2017, 2 pages (1 page of English Translation and 1 page of Official Copy).
Notice of Allowance received for Chinese Patent Application No. 201480059543.9, dated Sep. 4, 2019, 2 pages (1 page of English Translation and 1 page of Official Copy).
Notice of Allowance received for Chinese Patent Application No. 201480060082.7, dated Mar. 12, 2019, 2 pages (1 page of English Translation and 1 page of Official Copy).
Notice of Allowance received for Chinese Patent Application No. 201710240907.9, dated Nov. 25, 2019, 2 pages (1 page of English Translation and 1 page of Official Copy).
Notice of Allowance received for Danish Patent Application No. PA201670118, dated Mar. 30, 2017, 2 pages.
Notice of Allowance received for Japanese Patent Application No. 2016-130565, dated Aug. 28, 2017, 3 pages (Official Copy Only) {See Communication under 37 CFR § 1.98(a) (3)}.
Notice of Allowance received for Japanese Patent Application No. 2016-537945, dated Aug. 3, 2018, 4 pages (1 page of English translation and 3 pages of Official copy).
Notice of Allowance received for Japanese Patent Application No. 2016-537947, dated Jun. 5, 2017, 6 pages (3 pages of English Translation and 3 pages of Official Copy).
Notice of Allowance received for Japanese Patent Application No. 2016-537948, dated Nov. 11, 2019, 3 pages (1 page of English Translation and 2 pages of Official Copy).
Notice of Allowance received for Japanese Patent Application No. 2017-545561, dated Jul. 12, 2019, 4 pages (1 page of English Translation and 3 pages of Official Copy).
Notice of Allowance received for Japanese Patent Application No. 2018-090084, dated May 24, 2019, 4 pages (1 page of English Translation and 3 pages of Official Copy).

(56) References Cited

OTHER PUBLICATIONS

Notice of Allowance received for Japanese Patent Application No. 2018-143982, dated Apr. 8, 2019, 4 pages (1 page of English Translation and 3 pages of Official Copy).
Notice of Allowance received for Korean Patent Application No. 10-2013-7022057, dated Apr. 27, 2015, 2 pages (Official Copy only) {See Communication under 37 CFR § 1.98(a) (3)}.
Notice of Allowance received for Korean Patent Application No. 10-2014-7033660, dated Sep. 25, 2015, 3 pages (1 page of English Translation and 2 pages of Official Copy).
Notice of Allowance received for Korean Patent Application No. 10-2015-7013849, dated Mar. 28, 2016, 3 pages (1 page of English Translation and 2 pages of Official Copy).
Notice of Allowance received for Korean Patent Application No. 10-2016-7008488, dated Oct. 25, 2019, 4 pages (2 pages of English Translation and 2 pages of Official Copy).
Notice of Allowance received for Korean Patent Application No. 10-2016-7017508, dated Apr. 27, 2017, 3 pages (1 page of English translation and 2 pages of Official Copy).
Notice of Allowance received for Korean Patent Application No. 10-2018-7002695, dated Oct. 8, 2018, 5 pages (2 pages of English Translation and 3 pages of Official Copy).
Notice of Allowance received for Korean Patent Application No. 10-2018-7013265, dated Apr. 1, 2020, 4 pages (1 pages of English Translation and 3 pages of Official Copy).
Notice of Allowance received for Korean Patent Application No. 10-2018-7032106, dated Jun. 28, 2019, 5 pages (2 pages of English Translation and 3 pages of Official Copy).
Notice of Allowance received for Korean Patent Application No. 10-2019-7007748, dated May 6, 2020, 5 pages (1 page of English Translation and 4 pages of Official Copy).
Notice of Allowance received for Taiwanese Patent Application No. 103130518, dated May 19, 2016, 6 pages (4 pages of English Translation and 2 pages of Official Copy).
Notice of Allowance received for Taiwanese Patent Application No. 103130519, dated Oct. 27, 2016, 3 pages (Official Copy only) {See Communication under 37 CFR § 1.98(a) (3)}.
Notice of Allowance received for Taiwanese Patent Application No. 103130520, dated Apr. 25, 2018, 4 pages (1 page of English Translation and 3 pages of Official copy).
Notice of Allowance received for Taiwanese Patent Application No. 104107317, dated Oct. 18, 2017, 7 pages (Official Copy Only) {See Communication under 37 CFR § 1.98(a) (3)}.
Notice of Allowance received for Taiwanese Patent Application No. 104107327, dated Jul. 19, 2019, 5 pages (2 pages of English Translation and 3 pages of Official copy).
Notice of Allowance received for Taiwanese Patent Application No. 104107333, dated Nov. 8, 2016, 2 pages (Official Copy Only) {See Communication under 37 CFR § 1.98(a) (3)}.
Notice of Allowance received for Taiwanese Patent Application No. 104107334, dated Jan. 26, 2017, 3 pages. (Official Copy Only) {See Communication under 37 CFR § 1.98(a) (3)}.
Notice of Allowance received for Taiwanese Patent Application No. 104133281, dated Mar. 29, 2018, 4 pages (1 page of English Translation and 3 pages of Official copy).
Notice of Allowance received for U.S. Appl. No. 09/477,419, dated May 19, 2005, 5 pages.
Notice of Allowance received for U.S. Appl. No. 11/069,977, dated Apr. 8, 2013, 16 pages.
Notice of Allowance received for U.S. Appl. No. 11/069,977, dated May 15, 2013, 13 pages.
Notice of Allowance received for U.S. Appl. No. 10/213,929, dated Nov. 15, 2007, 9 pages.
Notice of Allowance received for U.S. Appl. No. 13/038,276, dated Nov. 3, 2016, 10 pages.
Notice of Allowance received for U.S. Appl. No. 13/038,276, dated Nov. 30, 2016, 2 pages.
Notice of Allowance received for U.S. Appl. No. 13/077,850, dated May 5, 2016, 15 pages.
Notice of Allowance received for U.S. Appl. No. 13/077,855, dated Jan. 30, 2017, 7 pages.
Notice of Allowance received for U.S. Appl. No. 13/077,862, dated Jun. 20, 2019, 9 pages.
Notice of Allowance received for U.S. Appl. No. 13/077,862, dated Sep. 20, 2019, 2 pages.
Notice of Allowance received for U.S. Appl. No. 13/077,867, dated Mar. 12, 2014, 7 pages.
Notice of Allowance received for U.S. Appl. No. 13/077,867, dated Sep. 18, 2013, 8 pages.
Notice of Allowance received for U.S. Appl. No. 13/077,874, dated Nov. 22, 2016, 13 pages.
Notice of Allowance received for U.S. Appl. No. 14/641,241, dated Apr. 13, 2017, 2 pages.
Notice of Allowance received for U.S. Appl. No. 14/641,241, dated Jan. 31, 2017, 13 pages.
Notice of Allowance received for U.S. Appl. No. 14/641,241, dated Mar. 24, 2017, 3 pages.
Notice of Allowance received for U.S. Appl. No. 14/641,252, dated Apr. 11, 2018, 14 pages.
Notice of Allowance received for U.S. Appl. No. 14/641,252, dated Jul. 18, 2018, 9 pages.
Notice of Allowance received for U.S. Appl. No. 14/641,287, dated Jun. 28, 2018, 8 pages.
Notice of Allowance received for U.S. Appl. No. 14/641,308, dated Jan. 15, 2020, 7 pages.
Notice of Allowance received for U.S. Appl. No. 14/829,573, dated Apr. 25, 2018, 6 pages.
Notice of Allowance received for U.S. Appl. No. 14/830,629, dated Oct. 17, 2018, 8 pages.
Notice of Allowance received for U.S. Appl. No. 14/841,646, dated Apr. 18, 2019, 7 pages.
Notice of Allowance received for U.S. Appl. No. 14/841,656, dated Feb. 12, 2018, 9 pages.
Notice of Allowance received for U.S. Appl. No. 14/841,656, dated Mar. 5, 2018, 3 pages.
Notice of Allowance received for U.S. Appl. No. 14/913,345, dated Feb. 10, 2020, 10 pages.
Notice of Allowance received for U.S. Appl. No. 14/913,350, dated Dec. 19, 2018, 27 pages.
Notice of Allowance received for U.S. Appl. No. 15/049,049, dated Jul. 25, 2019, 8 pages.
Notice of Allowance received for U.S. Appl. No. 15/049,064, dated Jul. 18, 2017, 24 pages.
Notice of Allowance received for U.S. Appl. No. 15/418,537, dated Apr. 6, 2020, 9 pages.
Notice of Allowance received for U.S. Appl. No. 15/927,768, dated May 31, 2019, 13 pages.
Notice of Allowance received for U.S. Appl. No. 16/055,489, dated Jan. 9, 2019, 24 pages.
Notice of Allowance received for U.S. Appl. No. 16/055,489, dated Jan. 25, 2019, 8 pages.
Notice of Allowance received for U.S. Appl. No. 16/055,489, dated Nov. 8, 2018, 28 pages.
Notice of Allowance received for U.S. Appl. No. 16/109,120, dated Sep. 11, 2019, 12 pages.
Notice of Allowance received for U.S. Appl. No. 16/144,950, dated Mar. 19, 2020, 14 pages.
Office Action and Search Report received for Danish Patent Application No. PA201670118, dated Jul. 1, 2016, 7 pages.
Office Action received for Danish Patent Application No. PA201670595, dated Nov. 25, 2016, 9 pages.
Office Action received for Australian Patent Application No. 2012209199, dated Jan. 15, 2015, 3 pages.
Office Action received for Australian Patent Application No. 2014315234, dated Jul. 12, 2017, 4 pages.
Office Action received for Australian Patent Application No. 2014315234, dated Nov. 2, 2016, 3 pages.
Office Action received for Australian Patent Application No. 2014315319, dated Aug. 3, 2017, 3 pages.
Office Action received for Australian Patent Application No. 2014315319, dated Oct. 17, 2016, 3 pages.

(56) References Cited

OTHER PUBLICATIONS

Office Action received for Australian Patent Application No. 2014315325, dated Nov. 3, 2016, 3 pages.
Office Action received for Australian Patent Application No. 2016202837, dated Jan. 10, 2017, 2 pages.
Office Action received for Australian Patent Application No. 2016229407, dated Aug. 15, 2018, 4 pages.
Office Action received for Australian Patent Application No. 2016229407, dated May 27, 2019, 4 pages.
Office Action received for Australian Patent Application No. 2017100207, dated Apr. 6, 2017, 4 pages.
Office Action received for Australian Patent Application No. 2017100207, dated Jul. 10, 2017, 3 pages.
Office Action received for Australian Patent Application No. 2017101561, dated Dec. 22, 2017, 4 pages.
Office Action received for Australian Patent Application No. 2017254897, dated Aug. 29, 2018, 4 pages.
Office Action received for Australian Patent Application No. 2017254897, dated Jun. 28, 2019, 4 pages.
Office Action received for Australian Patent Application No. 2017277851, dated Jul. 5, 2019, 3 pages.
Office Action received for Australian Patent Application No. 2018101076, dated Oct. 16, 2018, 5 pages.
Office Action received for Australian Patent Application No. 2018200289, dated Apr. 9, 2019, 5 pages.
Office Action received for Australian Patent Application No. 2018200289, dated Dec. 4, 2018, 4 pages.
Office Action received for Australian Patent Application No. 2018200998, dated Jan. 30, 2019, 4 pages.
Office Action received for Australian Patent Application No. 2018200998, dated Mar. 9, 2018, 5 pages.
Office Action received for Australian Patent Application No. 2019201628, dated May 13, 2019, 2 pages.
Office Action received for Australian Patent Application No. 2019216614, dated Apr. 1, 2020, 4 pages.
Office Action received for Australian Patent Application No. 2019216614, dated Aug. 22, 2019, 3 pages.
Office Action received for Australian Patent Application No. 2014315234, dated Apr. 19, 2017, 4 pages.
Office Action Received for Chinese Patent Application No. 201280006317.5, dated Jan. 11, 2016, 10 pages (5 pages of English Translation and 5 pages of official Copy).
Office Action received for Chinese Patent Application No. 201280006317.5, dated Jul. 11, 2016, 6 pages (1 page of English Translation and 5 pages of Official Copy).
Office Action received for Chinese Patent Application No. 201480059543.9, dated Feb. 28, 2019, 16 pages (4 pages of English Translation and 12 pages of Official Copy).
Office Action received for Chinese Patent Application No. 201480059543.9, dated Jan. 26, 2018, 17 pages (4 pages of English Translation and 13 pages of Official Copy).
Office Action received for Chinese Patent Application No. 201480059543.9, dated Sep. 19, 2018, 18 pages (5 pages of English Translation and 13 pages of Official Copy).
Office Action received for Chinese Patent Application No. 201480060082.7, dated Jan. 26, 2018, 15 pages (4 pages of English translation and 11 pages of Official Copy).
Office Action received for Chinese Patent Application No. 201480060082.7, dated Sep. 25, 2018, 6 pages (3 pages of English Translation and 3 pages of Official copy).
Office Action received for Chinese Patent Application No. 201480060083.1, dated Aug. 13, 2019, 6 pages (3 pages of English Translation and 3 pages of Official Copy).
Office Action received for Chinese Patent Application No. 201480060083.1, dated Dec. 5, 2018, 11 pages (5 pages of English Translation and 6 pages of Official Copy).
Office Action received for Chinese Patent Application No. 201580046331.1, dated Apr. 23, 2020, 15 pages (9 pages of English Translation and 6 pages of Official Copy).
Office Action received for Chinese Patent Application No. 201580046331.1, dated Aug. 2, 2019, 18 pages (6 pages of English Translation and 12 pages of Official Copy).
Office Action received for Chinese Patent Application No. 201580046339.8, dated Feb. 26, 2019, 18 pages (6 pages of English Translation and 12 pages of Official Copy).
Office Action received for Chinese Patent Application No. 201580046339.8, dated Oct. 31, 2019, 9 pages (3 pages of English Translation and 6 pages of Official Copy).
Office Action received for Chinese Patent Application No. 201580077206.7, dated Feb. 3, 2020, 29 pages (8 pages of English Translation and 21 pages of Official Copy).
Office Action received for Chinese Patent Application No. 201710240907.9, dated Jun. 5, 2019, 10 pages (5 pages of English Translation and 5 pages of Official Copy).
Office Action received for Chinese Patent Application No. 201910164962.3, dated Apr. 8, 2020, 25 pages (13 pages of English Translation and 12 pages of Official Copy).
Office Action received for Chinese Patent Application No. 201910454069.4, dated Dec. 20, 2019, 6 pages (1 page of English Translation and 5 pages of Official Copy).
Office Action received for Chinese Patent Application No. 201910454076.4, dated Dec. 18, 2019, 14 pages (7 pages of English Translation and 7 pages of Official Copy).
Office Action received for Danish Patent Application No. PA201670118, dated Feb. 2, 2017, 2 pages.
Office Action received for Danish Patent Application No. PA201670118, dated Oct. 25, 2016, 3 pages.
Office Action received for Danish Patent Application No. PA201670595, dated Aug. 23, 2018, 5 pages.
Office Action received for Danish Patent Application No. PA201670595, dated May 31, 2017, 3 pages.
Office Action received for Danish Patent Application No. PA201670595, dated Nov. 30, 2017, 4 pages.
Office Action received for Danish Patent Application No. PA201770103, dated Dec. 11, 2018, 2 pages.
Office Action received for Danish Patent Application No. PA201770103, dated Jan. 16, 2018, 2 pages.
Office Action received for Danish Patent Application No. PA201770181, dated Jan. 3, 2018, 2 pages.
Office Action received for Danish Patent Application No. PA201770181, dated Jun. 13, 2017, 6 pages.
Office Action received for Danish Patent Application No. PA201970259, dated Jan. 15, 2020, 4 pages.
Office Action received for European Patent Application No. 14771688.0, dated Jan. 21, 2019, 8 pages.
Office Action received for European Patent Application No. 14771688.0, dated May 31, 2018, 6 pages.
Office Action received for European Patent Application No. 14771688.0, dated Nov. 30, 2017, 15 pages.
Office Action received for European Patent Application No. 14771688.0, dated Sep. 16, 2019, 7 pages.
Office Action received for European Patent Application No. 14772002.3, dated Jul. 4, 2017, 8 pages.
Office Action received for European Patent Application No. 14772494.2, dated Jun. 20, 2017, 7 pages.
Office Action received for European Patent Application No. 14772494.2, dated Oct. 2, 2018, 9 pages.
Office Action received for European Patent Application No. 16710372.0, dated Feb. 22, 2019, 7 pages.
Office Action received for European Patent Application No. 18157131.6, dated May 8, 2018, 12 pages.
Office Action received for European Patent Application No. 19173371.6, dated Nov. 12, 2019, 11 pages.
Office Action received for European Patent Application No. 19173886.3, dated Nov. 12, 2019, 9 pages.
Office Action received for European Patent Application No. 19206249.5, dated Jan. 20, 2020, 8 pages.
Office Action received for Indian Patent Application No. 201617008291, dated Jan. 14, 2020, 7 pages.
Office Action received for Indian Patent Application No. 201617009216, dated Jan. 24, 2020, 6 pages.

(56) References Cited

OTHER PUBLICATIONS

Office Action received for Indian Patent Application No. 201617009428, dated Feb. 26, 2020, 7 pages.
Office Action received for Japanese Patent Application No. 2013-550664, dated Jun. 10, 2016, 3 pages (Official Copy only) {See Communication under 37 CFR § 1.98(a) (3)}.
Office Action received for Japanese Patent Application No. 2013-550664, dated Aug. 24, 2015, 9 pages (4 pages of English Translation and 5 pages of Official Copy).
Office Action received for Japanese Patent Application No. 2013-550664, dated Sep. 12, 2014, 10 pages (6 pages of English Translation and 4 pages of Official Copy).
Office Action received for Japanese Patent Application No. 2016-537945, dated Apr. 7, 2017, 6 pages (3 pages of English Translation and 3 pages of Official Copy).
Office Action received for Japanese Patent Application No. 2016-537945, dated Jan. 9, 2018, 5 pages (2 pages of English Translation and 3 pages of Official copy).
Office Action received for Japanese Patent Application No. 2016-537947, dated Feb. 24, 2017, 6 pages (3 pages of English Translation and 3 pages of Official Copy).
Office Action received for Japanese Patent Application No. 2016-537948, dated Apr. 6, 2018, 5 pages (2 pages of English Translation and 3 pages of Official Copy).
Office Action received for Japanese Patent Application No. 2016-537948, dated Jun. 9, 2017, 10 pages (5 pages of English Translation and 5 pages of Official Copy).
Office Action received for Japanese Patent Application No. 2016-537948, dated Sep. 3, 2018, 4 pages (2 pages of English Translation and 2 pages of Official copy).
Office Action received for Japanese Patent Application No. 2017-545561, dated Aug. 6, 2018, 8 pages (4 pages of English Translation and 4 pages of Official copy).
Office Action received for Japanese Patent Application No. 2018-090084, dated Feb. 15, 2019, 6 pages (3 pages of English Translation and 3 pages of Official copy).
Office Action received for Japanese Patent Application No. 2018-143982, dated Dec. 7, 2018, 10 pages (5 pages of English Translation and 5 pages of Official Copy).
Office Action received for Korean Patent Application No. 10-2013-7022057, dated May 28, 2014, 7 pages (3 pages of English Translation and 4 pages of Official Copy).
Office Action received for Korean Patent Application No. 10-2014-7033660, dated Feb. 23, 2015, 3 pages (Official Copy only) {See Communication under 37 CFR § 1.98(a) (3)}.
Office Action received for Korean Patent Application No. 10-2015-7013849, dated Aug. 20, 2015, 5 pages (2 pages of English Translation and 3 pages of Official Copy).
Office Action received for Korean Patent Application No. 10-2016-7008474, dated Aug. 6, 2018, 10 pages (5 pages of English Translation and 5 pages of Official Copy).
Office Action received for Korean Patent Application No. 10-2016-7008474, dated Dec. 30, 2016, 10 pages (4 pages of English Translation and 6 pages of Official Copy).
Office Action received for Korean Patent Application No. 10-2016-7008474, dated May 15, 2018, 7 pages (3 pages of English Translation and 4 pages of Official Copy).
Office Action received for Korean Patent Application No. 10-2016-7008474, dated Nov. 27, 2017, 6 pages (2 pages of English Translation and 4 pages of Official Copy).
Office Action received for Korean Patent Application No. 10-2016-7008488, dated Feb. 8, 2018, 8 pages (4 pages of English Translation and 4 pages of Official Copy).
Office Action received for Korean Patent Application No. 10-2016-7008488, dated Jan. 12, 2017, 14 pages (6 pages of English Translation and 8 pages of Official Copy).
Office Action received for Korean Patent Application No. 10-2016-7008488, dated Nov. 27, 2017, 6 pages (3 pages of English Translation and 3 pages of Official Copy).
Office Action received for Korean Patent Application No. 10-2016-7008682, dated Dec. 30, 2016, 11 pages (4 pages of English Translation and 7 pages of Official Copy).
Office Action received for Korean Patent Application No. 10-2016-7008682, dated Feb. 8, 2018, 7 pages (3 pages of English Translation and 4 pages of Official Copy).
Office Action received for Korean Patent Application No. 10-2016-7008682, dated Nov. 27, 2017, 7 pages (3 page of English Translation and 4 pages of Official Copy).
Office Action received for Korean Patent Application No. 10-2016-7017508, dated Oct. 20, 2016, 5 pages (2 pages of English Translation and 3 pages of Official Copy).
Office Action received for Korean Patent Application No. 10-2017-7024506, dated Aug. 12, 2019, 6 pages (2 pages of English Translation and 4 pages of Official Copy).
Office Action received for Korean Patent Application No. 10-2017-7024506, dated Feb. 19, 2020, 12 pages (5 pages of English Translation and 7 pages of Official Copy).
Office Action received for Korean Patent Application No. 10-2017-7024506, dated Sep. 28, 2018, 11 pages (4 pages of English Translation and 7 pages of Official Copy).
Office Action received for Korean Patent Application No. 10-2018-7002695, dated Feb. 27, 2018, 12 pages (5 pages of English Translation and 7 pages of Official Copy).
Office Action received for Korean Patent Application No. 10-2018-7002695, dated Jun. 19, 2018, 8 pages (4 pages of English Translation and 4 pages of Official Copy).
Office Action received for Korean Patent Application No. 10-2018-7013265, dated Aug. 10, 2018, 12 pages (5 pages of English Translation and 7 pages of Official copy).
Office Action received for Korean Patent Application No. 10-2018-7013265, dated Jun. 14, 2019, 6 pages (2 pages of English Translation and 4 pages of official copy).
Office Action received for Korean Patent Application No. 10-2018-7032106, dated Dec. 26, 2018, 10 pages (4 pages of English translation and 6 pages of Official Copy).
Office Action received for Korean Patent Application No. 10-2018-7033888, dated Nov. 28, 2019, 10 pages (4 pages of English Translation and 6 pages of Official Copy).
Office Action received for Korean Patent Application No. 10-2019-7028736, dated May 7, 2020, 8 pages (3 pages of English Translation and 5 pages of Official Copy).
Office Action received for Korean Patent Application No. 10-2019-7028736, dated Nov. 28, 2019, 8 pages (3 pages of English Translation and 5 pages of Official Copy).
Office Action received for Taiwan Patent Application No. 103130519, dated Mar. 25, 2016, 14 pages (6 pages of English Translation and 8 pages of Official Copy).
Office Action received for Taiwanese Patent Application No. 103130518, dated Oct. 15, 2015, 7 pages (3 pages of English Translation and 4 pages of Official Copy).
Office Action received for Taiwanese Patent Application No. 103130520, dated Apr. 17, 2017, 8 pages (3 pages of English Translation and 5 pages of Official Copy).
Office Action received for Taiwanese Patent Application No. 103130520, dated Jan. 23, 2018, 5 pages (2 pages of English Translation and 3 pages of Official Copy).
Office Action received for Taiwanese Patent Application No. 103130520, dated May 23, 2016, 38 pages (15 pages of English Translation and 23 pages of Official Copy).
Office Action received for Taiwanese Patent Application No. 103130520, dated Oct. 1, 2015, 58 pages (22 pages of English translation and 36 pages of Official copy).
Office Action received for Taiwanese Patent Application No. 103130520, dated Sep. 29, 2016, 39 pages (16 pages of English Translation and 23 pages of Official Copy).
Office Action received for Taiwanese Patent Application No. 104107317, dated Mar. 28, 2017, 39 pages (11 pages of English Translation and 28 pages of Official Copy).
Office Action received for Taiwanese Patent Application No. 104107318, dated Dec. 26, 2018, 33 pages (9 pages of English Translation and 24 pages of Official Copy).

(56) References Cited

OTHER PUBLICATIONS

Office Action received for Taiwanese Patent Application No. 104107318, dated Feb. 18, 2020, 10 pages (4 pages of English Translation and 6 pages of Official Copy).
Office Action received for Taiwanese Patent Application No. 104107327, dated Sep. 28, 2018, 7 pages (3 pages of English Translation and 4 pages of Official Copy).
Office Action received for Taiwanese Patent Application No. 104107333, dated May 17, 2016, 6 pages (3 pages of English Translation and 3 pages of Official Copy).
Office Action received for Taiwanese Patent Application No. 104107334, dated Sep. 19, 2016, 15 pages (6 pages of English Translation and 9 pages of Official Copy).
Office Action received for Taiwanese Patent Application No. 104133281, dated Mar. 30, 2017, 10 pages (4 pages of English translation and 6 pages of official copy).
Office Action received for Taiwanese Patent Application No. 104133281, dated Sep. 1, 2016, 10 pages (4 pages of English Translation and 6 pages of Official Copy).
Office Action Report received for Australian Patent Application No. 2012209199, dated Dec. 17, 2015, 3 pages.
Partial European Search Report received for European Patent Application No. 19173371.6, dated Jul. 18, 2019, 17 pages.
Partial European Search Report received for European Patent Application No. 19173886.3, dated Jul. 18, 2019, 15 pages.
Patel Amit, ""Hexagonal Grids"", Available online at: http://www.redblobgames.com/grids/hexagons/, 36 pages.
Patel Amit, "Amit's Thoughts on Grids", Available online at: http://www-cs-students.stanford.edu/~amitp/game-programming/grids/, Jan. 9, 2006, 22 pages.
Raghunath et al, "User Interfaces for Applications on a Wrist Watch", Journal of Personal and Ubiquitous Computing, vol. 6, 2002, pp. 17-30.
Search Report and opinion received for Danish Patent Application No. PA201870631, dated Dec. 6, 2018, 8 pages.
Search Report and Opinion received for Danish Patent Application No. PA201870632, dated Dec. 3, 2018, 8 pages.
Search Report and Opinion received for Danish Patent Application No. PA201970259, dated Jul. 19, 2019, 10 pages.
Search Report received for Danish Patent Application No. PA201770103, dated Jun. 9, 2017, 9 pages.
Search Report received for European Patent Application No. 18157131.6, dated Apr. 19, 2018, 4 pages.
Shestopalyuk Ruslan, "Hexagonal grid math", Feb. 15, 2011, 7 pages.
The interview with a key person. IBM and Citizen met and applied Linux to a watch, ASCII Corporation, vol. 25, No. 12, Dec. 12, 2001, pp. 136-143 (Official Copy only) {See Communication under 37 CFR § 1.98(a) (3)}.
Watchpad 1.5 demo, YouTube.com, Online Available at: https://www.youtube.com/watch?v=7xjvVbeUn80, Uploaded on Jun. 20, 2010, 2 pages.
Watchpad 1.5, Online Available at: http://web.archive.org/web/20011205071448/http://www.trl.ibm.com:80/projects/ngm/index_e.htm, Dec. 5, 2001, 2 pages.
Wikipedia, "Rotary encoder", Online Available at: https://en.wikipedia.org/wiki/Rotary_encoder, Retrieved on May 17, 2017, 17 pages (10 pages of English Translation and 7 pages of Official Copy).
Wolfe Joanna, "Annotation Technologies: A Software and Research Review", Computers and Composition, vol. 19, No. 4, 2002, pp. 471-497.
Advisory Action received for U.S. Appl. No. 14/839,912, dated Nov. 14, 2019, 6 pages.
Advisory Action received for U.S. Appl. No. 14/913,349, dated Oct. 29, 2019, 4 pages.
Advisory Action received for U.S. Appl. No. 15/049,052, dated Sep. 11, 2017, 2 pages.

Agarwal Deepesh, "DexClock—Live Clock and Date Blended into Beautiful Artwork as Your Desktop Wallpaper", Online Available at: https://www.megaleecher.net/DexCiock_Wallpaper_Designs, Jul. 6, 2013, 4 pages.
Applicant Initiated Interview Summary received for U.S. Appl. No. 14/913,349, dated Oct. 7, 2019, 4 pages.
Applicant Initiated Interview Summary received for U.S. Appl No. 14/839,912, dated Nov. 5, 2019, 5 pages.
Decision on Appeal received for Korean Patent Application No. 10-2016-7008449, dated Jul. 30, 2019, 29 pages.
Decision on Appeal received for Korean Patent Application No. 10-2018-7010872, dated Jan. 20, 2020, 20 pages.
Decision to Grant received for Danish Patent Application No. PA201570781, dated Jul. 17, 2017, 2 pages.
Decision to Grant received for Danish Patent Application No. PA201670117, dated Nov. 20, 2017, 2 pages.
Decision to Grant received for Danish Patent Application No. PA201770794, dated Nov. 11, 2019, 2 pages.
Decision to Grant received for European Patent Application No. 14772001.5, dated Dec. 5, 2019, 2 pages.
European Search Report received for European Patent Application No. 19199004.3, dated Nov. 12, 2019, 6 pages.
Final Office Action received for U.S. Appl. No. 14/913,349, dated Jul. 22, 2019, 20 pages.
Final Office Action received for U.S. Appl. No. 14/913,349, dated Jul. 30, 2018, 18 pages.
Final Office Action received for U.S. Appl. No. 15/049,052, dated Mar. 1, 2018, 15 pages.
Final Office Action received for U.S. Appl. No. 15/049,052, dated May 17, 2017, 13 pages.
Final Office Action received for U.S. Appl. No. 15/049,052, dated Oct. 2, 2018, 16 pages.
Final Office Action received for U.S. Appl. No. 14/839,912, dated Jul. 30, 2019, 42 pages.
Final Office Action received for U.S. Appl. No. 14/839,912, dated Sep. 13, 2018, 31 pages.
Intention to Grant received for Danish Patent Application No. PA201570776, dated Dec. 8, 2016, 2 pages.
Intention to Grant received for Danish Patent Application No. PA201570781, dated Dec. 8, 2016, 2 pages.
Intention to Grant received for Danish Patent Application No. PA201670117, dated Apr. 21, 2017, 2 pages.
Intention to Grant received for Danish Patent Application No. PA201770794, dated Aug. 15, 2019, 2 pages.
Intention to Grant received for European Patent Application No. 14772001.5, dated Jul. 18, 2019, 16 pages.
Intention to Grant received for European Patent Application No. 14772001.5, dated Mar. 22, 2019, 17 pages.
International Preliminary Report on Patentability received for PCT Patent Application No. PCT/US2014/053957, dated Mar. 17, 2016, 8 pages.
International Preliminary Report on Patentability received for PCT Patent Application No. PCT/US2015/047704, dated Mar. 16, 2017, 19 pages.
International Search Report and Written Opinion received for PCT Patent Application No. PCT/US2014/053957, dated Feb. 19, 2015, 11 pages.
International Search Report and Written Opinion received for PCT Patent Application No. PCT/US2015/047704, dated Feb. 22, 2016, 25 pages.
Invitation to Pay Additional Fees received for PCT Patent Application No. PCT/US2015/047704, dated Dec. 16, 2015, 10 pages.
NDTV, "Sony Smart Watch 2 Launched in India for Rs. 14,990", Online Available at: http://gadgets.ndtv.com/others/news/sony-smartwatch-2-launched-in-india-for-rs-14990-420319, Sep. 18, 2013, 4 pages.
Non-Final Office Action received for U.S. Appl. No. 14/839,912, dated Feb. 26, 2019, 36 pages.
Non-Final Office Action received for U.S. Appl. No. 14/839,914, dated Oct. 19, 2017, 46 pages.
Non-Final Office Action received for U.S. Appl. No. 14/913,349, dated Apr. 2, 2019, 15 pages.

(56) References Cited

OTHER PUBLICATIONS

Non-Final Office Action received for U.S. Appl. No. 14/913,349, dated Apr. 22, 2020, 20 pages.
Non-Final Office Action received for U.S. Appl. No. 14/913,349, dated Jan. 2, 2020, 25 pages.
Non-Final Office Action received for U.S. Appl. No. 14/913,349, dated Jan. 11, 2018, 6 pages.
Non-Final Office Action received for U.S. Appl. No. 15/049,052, dated May 31, 2018, 15 pages.
Non-Final Office Action received for U.S. Appl. No. 15/049,052, dated Nov. 29, 2016, 13 pages.
Non-Final Office Action received for U.S. Appl. No. 15/049,052, dated Sep. 21, 2017, 14 pages.
Non-Final Office Action received for U.S. Appl. No. 14/839,912, dated Feb. 12, 2018, 30 pages.
Non-Final Office Action Received for U.S. Appl. No. 14/839,912, dated Jun. 8, 2017, 26 pages.
Notice of Acceptance received for Australian Patent Application No. 2014315324, dated Sep. 28, 2017, 3 pages.
Notice of Acceptance received for Australian Patent Application No. 2017276285, dated Apr. 3, 2019, 3 pages.
Notice of Allowance received for Chinese Patent Application No. 201480060044.1, dated Mar. 29, 2019, 3 pages.
Notice of Allowance received for Danish Patent Application No. PA201570776, dated Feb. 8, 2017, 2 pages.
Notice of Allowance received for Japanese Patent Application No. 2016-537946, dated Mar. 26, 2018, 4 pages.
Notice of Allowance received for Japanese Patent Application No. 2018-083313, dated Jul. 1, 2019, 4 pages.
Notice of Allowance received for Korean Patent Application No. 10-2016-7008449, dated Aug. 9, 2019, 6 pages.
Notice of Allowance received for Korean Patent Application No. 10-2018-7010872, dated Feb. 10, 2020, 6 pages.
Notice of Allowance received for Taiwanese Patent Application No. 103130517, dated May 14, 2018, 5 pages.
Notice of Allowance received for U.S. Appl. No. 14/839,914, dated Jun. 22, 2018, 12 pages.
Notice of Allowance received for U.S. Appl. No. 15/049,052, dated Sep. 16, 2019, 5 pages.
Office Action received for Australian Patent Application No. 2014315324, dated Aug. 8, 2017, 3 pages.
Office Action received for Australian Patent Application No. 2014315324, dated Oct. 21, 2016, 3 pages.
Office Action received for Australian Patent Application No. 2017276285, dated Nov. 26, 2018, 2 pages.
Office Action received for Chinese Patent Application No. 201480060044.1, dated Jan. 26, 2018, 15 pages.
Office Action received for Chinese Patent Application No. 201480060044.1, dated Sep. 25, 2018, 6 pages.
Office Action received for Danish Patent Application No. PA201570776, dated Aug. 19, 2016, 3 pages.
Office Action received for Danish Patent Application No. PA201570776, dated Jan. 26, 2016, 12 pages.
Office Action received for Danish Patent Application No. PA201570781, dated Aug. 19, 2016, 3 pages.
Office Action received for Danish Patent Application No. PA201670117, dated Jan. 12, 2017, 3 pages.
Office Action received for Danish Patent Application No. PA201670117, dated Jun. 13, 2016, 10 pages.
Office Action received for Danish Patent Application No. PA201770794, dated Apr. 5, 2018, 4 pages.
Office Action received for Danish Patent Application No. PA201770794, dated Dec. 19, 2017, 8 pages.
Office Action received for Danish Patent Application No. PA201770794, dated Jun. 13, 2019, 2 pages.
Office Action received for Danish Patent Application No. PA201770794, dated Oct. 30, 2018, 3 pages.
Office Action received for European Patent Application No. 14772001.5, dated Feb. 14, 2018, 5 pages.
Office Action received for European Patent Application No. 14772001.5, dated May 30, 2017, 10 pages.
Office Action received for European Patent Application No. 19199004.3, dated Nov. 22, 2019, 10 pages.
Office Action received for Indian Patent Application No. 201617008296, dated Jan. 14, 2020, 7 pages.
Office Action received for Japanese Patent Application No. 2016-537946, dated Aug. 7, 2017, 8 pages.
Office Action received for Japanese Patent Application No. 2016-537946, dated Jan. 30, 2017, 12 pages.
Office Action received for Japanese Patent Application No. 2018-083313, dated Feb. 12, 2019, 4 pages.
Office Action received for Korean Patent Application No. 10-2016-7008449, dated Jan. 12, 2017, 15 pages.
Office Action received for Korean Patent Application No. 10-2016-7008449, dated Jan. 16, 2018, 10 pages.
Office Action received for Korean Patent Application No. 10-2016-7008449, dated Nov. 27, 2017, 6 pages.
Office Action received for Korean Patent Application No. 10-2018-7010872, dated Dec. 21, 2018, 7 pages.
Office Action received for Korean Patent Application No. 10-2018-7010872, dated May 21, 2018, 10 pages.
Office Action received for Korean Patent Application No. 10-2019-7007748, dated Nov. 15, 2019, 9 pages.
Office Action received for Korean Patent Application No. 10-2018-7010872, dated Feb. 13, 2019, 7 pages.
Office Action received for Taiwanese Patent Application No. 103130517, dated Feb. 6, 2018, 5 pages.
Office Action received for Taiwanese Patent Application No. 103130517, dated Feb. 22, 2016, 7 pages.
Office Action received for Taiwanese Patent Application No. 103130517, dated Jul. 29, 2016, 7 pages.
Office Action received for Taiwanese Patent Application No. 104107329, dated Mar. 5, 2020, 22 pages.
Office Action received for Taiwanese Patent Application No. 104128701, dated Jul. 22, 2016, 25 pages.
Office Action received for Taiwanese Patent Application No. 104128701, dated Mar. 16, 2017, 8 pages.
Search Report received for Danish Patent Application No. PA201570781, dated Mar. 8, 2016, 10 pages.
Summons to Attend Oral Proceedings received for European Patent Application No. 14772001.5, dated Nov. 14, 2018, 5 pages.
Summons to Attend Oral Proceedings received for European Patent Application No. 14772001.5, dated Oct. 4, 2018, 15 pages.
The Window Club, "How to Set GIF as Background Windows 7", Online Available at: https://www.youtube.com/watch?v=tUec42Qd7ng, Dec. 24, 2012, pp. 1-5.
Intention to Grant received for European Patent Application No. 19199004.3, dated Sep. 14, 2020, 9 pages.
Office Action received for Korean Patent Application No. 10-2020-7022802, dated Aug. 28, 2020, 7 pages (2 pages of English Translation and 5 pages of Official Copy).

* cited by examiner

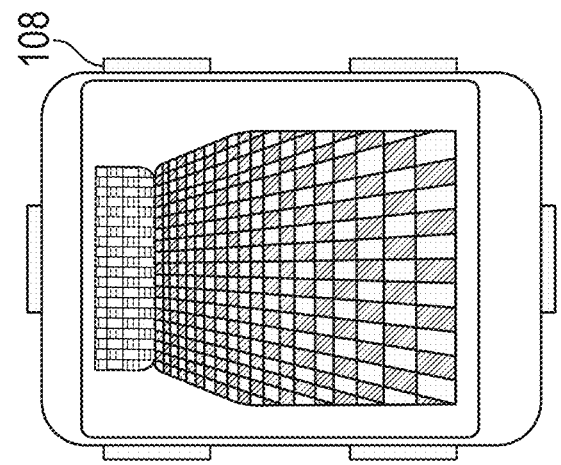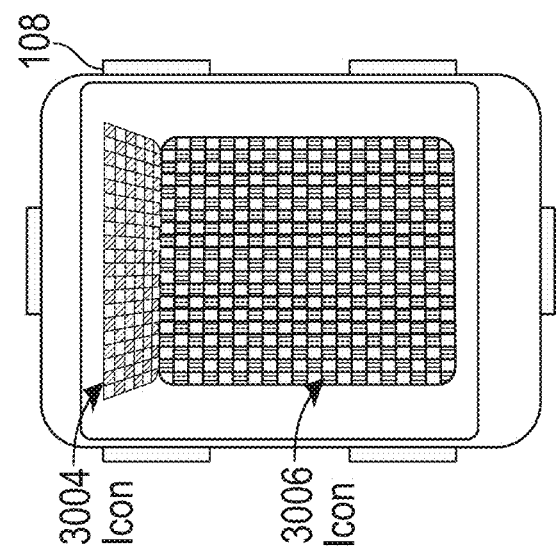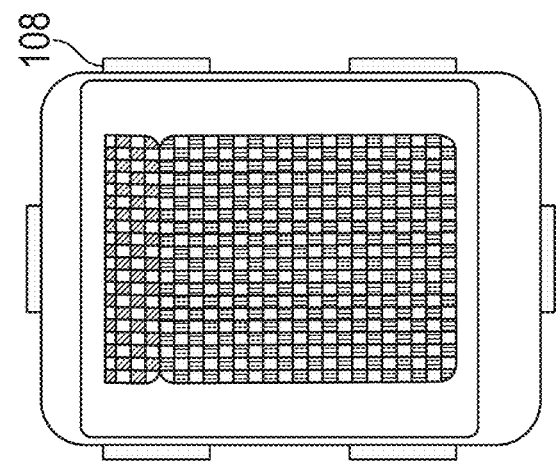
FIG. 30

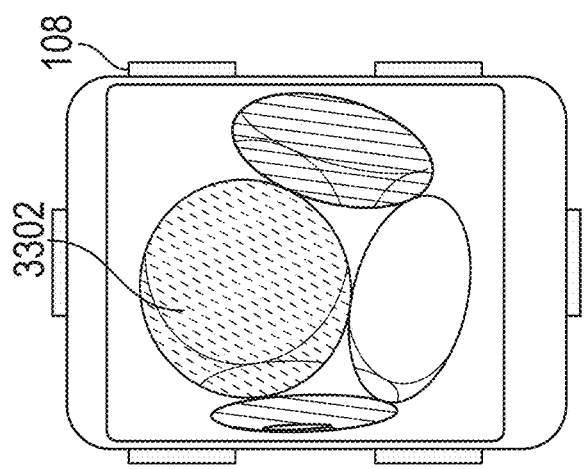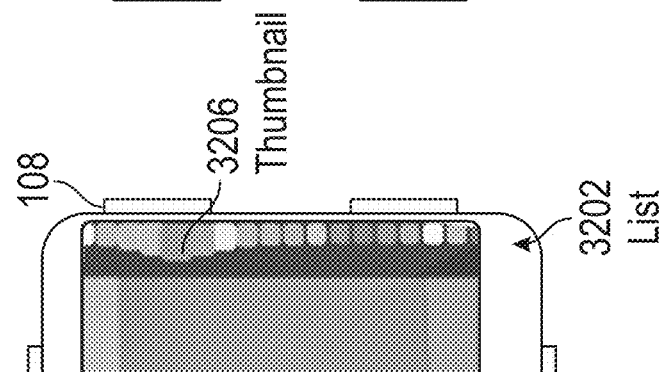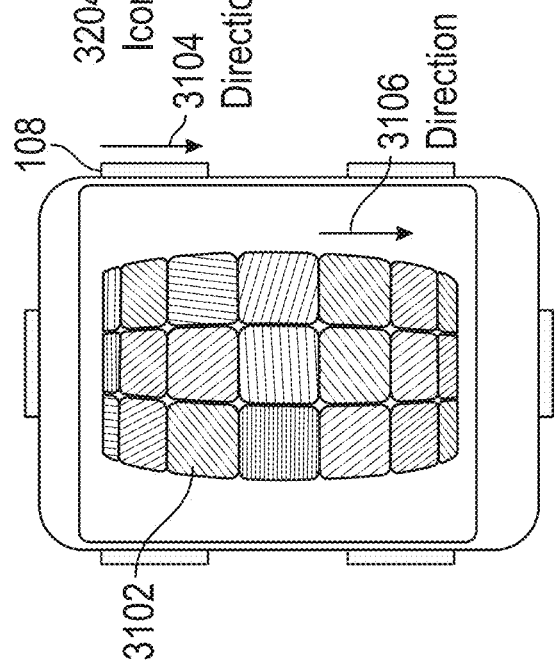

USER INTERFACE FOR MANIPULATING USER INTERFACE OBJECTS

CROSS-REFERENCE TO RELATED APPLICATIONS

This application is a continuation of U.S. patent application Ser. No. 14/913,349, filed Feb. 19, 2016, entitled "USER INTERFACE FOR MANIPULATING USER INTERFACE OBJECTS", which is a 35 U.S.C. § 371 national stage application of International Patent Application No. PCT/US2014/053957, filed Sep. 3, 2014, entitled "USER INTERFACE FOR MANIPULATING USER INTERFACE OBJECTS", which claims the benefit of priority of U.S. Provisional Patent Application Ser. No. 61/873,356, filed Sep. 3, 2013, entitled "CROWN INPUT FOR A WEARABLE ELECTRONIC DEVICE"; U.S. Provisional Patent Application Ser. No. 61/873,359, filed Sep. 3, 2013, entitled "USER INTERFACE OBJECT MANIPULATIONS IN A USER INTERFACE"; U.S. Provisional Patent Application Ser. No. 61/959,851, filed Sep. 3, 2013, entitled "USER INTERFACE FOR MANIPULATING USER INTERFACE OBJECTS"; U.S. Provisional Patent Application Ser. No. 61/873,360, filed Sep. 3, 2013, entitled "USER INTERFACE FOR MANIPULATING USER INTERFACE OBJECTS WITH MAGNETIC PROPERTIES". International Patent Application No. PCT/US2014/053957, filed Sep. 3, 2014, entitled "USER INTERFACE FOR MANIPULATING USER INTERFACE OBJECTS", is also a continuation-in-part of U.S. Non-provisional patent application Ser. No. 14/476,657, filed Sep. 3, 2014, entitled "USER INTERFACE FOR MANIPULATING USER INTERFACE OBJECTS WITH MAGNETIC PROPERTIES". The content of these applications is hereby incorporated by reference in its entirety for all purposes.

This application is related to International Patent Application Serial Number PCT/US2014/053961, filed Sep. 3, 2014, entitled "USER INTERFACE FOR MANIPULATING USER INTERFACE OBJECTS WITH MAGNETIC PROPERTIES"; International Patent Application Serial Number PCT/US2014/053951, filed Sep. 3, 2014, entitled "CROWN INPUT FOR A WEARABLE ELECTRONIC DEVICE"; and International Patent Application Serial Number PCT/US2014/053958 filed Sep. 3, 2014, entitled "USER INTERFACE OBJECT MANIPULATIONS IN A USER INTERFACE". The content of these applications is hereby incorporated by reference in its entirety for all purposes.

FIELD

The disclosed embodiments relate generally to user interfaces of electronic devices, including but not limited to user interfaces for electronic watches.

BACKGROUND

Advanced personal electronic devices can have small form factors. Exemplary personal electronic devices include but are not limited to tablets and smart phones. Uses of such personal electronic devices involve manipulation of user interface objects on display screens which also have small form factors that complement the design of the personal electronic devices.

Exemplary manipulations that users can perform on personal electronic devices include navigating a hierarchy, selecting a user interface object, adjusting the position, size, and zoom of user interface objects, or otherwise manipulating user interfaces. Exemplary user interface objects include digital images, video, text, icons, control elements such as buttons, and other graphics.

Existing methods for manipulating user interface objects on reduced-size personal electronic devices can be inefficient. Further, existing methods generally provide less precision than is preferable.

SUMMARY

In some embodiments, techniques for navigating a user interface on a personal electronics device based on movements of a crown are disclosed. Systems and computer-readable storage media for performing the processes described above are also disclosed.

BRIEF DESCRIPTION OF THE DRAWINGS

FIG. 30 illustrates an exemplary user interface and transition.
FIG. 31 illustrates an exemplary user interface.
FIG. 32 illustrates an exemplary user interface.
FIG. 33 illustrates an exemplary user interface.

DETAILED DESCRIPTION

In the following description of the disclosure and examples, reference is made to the accompanying drawings in which it is shown by way of illustration specific examples that can be practiced. It is to be understood that other examples can be practiced and structural changes can be made without departing from the scope of the disclosure.

Figure 1:
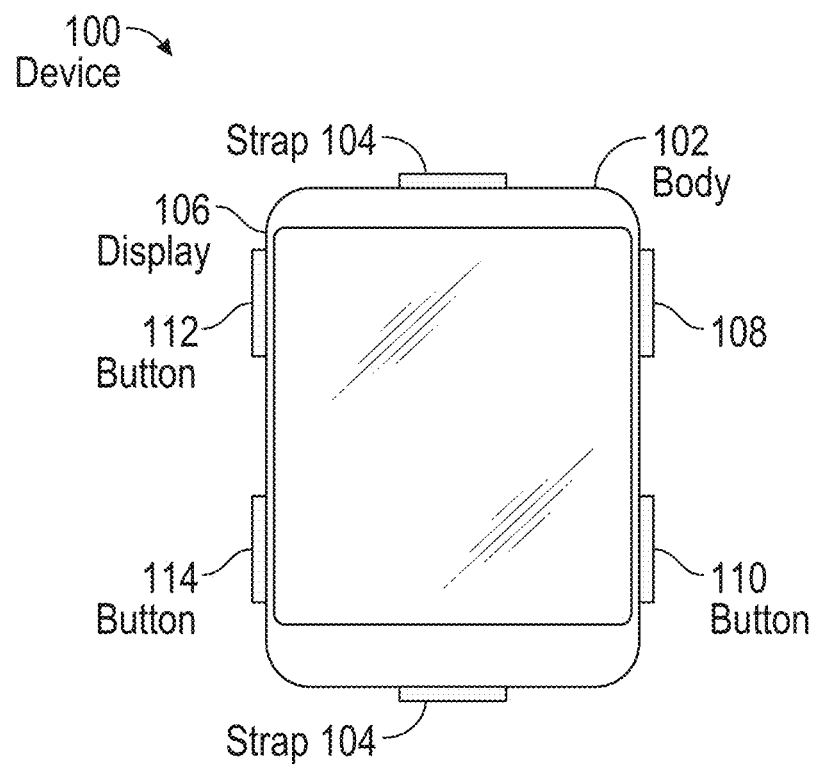
FIG. 1 illustrates an exemplary personal electronic device.

FIG. 1 illustrates exemplary personal electronic device 100. In the illustrated example, device 100 is a watch that generally includes body 102 and strap 104 for affixing device 100 to the body of a user. That is, device 100 is wearable. Body 102 can designed to couple with straps 104. Device 100 can have touch-sensitive display screen (hereafter touchscreen) 106 and crown 108. In some embodiments, device 100 can have one or more buttons 110, 112, and 114. In some embodiments, device 100 does not have buttons 110, 112, nor 114.

Conventionally, the term "crown," in the context of a watch, refers to the cap atop a stem for winding the watch. In the context of a personal electronic device, the crown can be a physical component of the electronic device, rather than a virtual crown on a touch sensitive display. Crown 108 can be mechanical meaning that it can be connected to a sensor for converting physical movement of the crown into electrical signals. Crown 108 can rotate in two directions of rotation (e.g., forward and backward). Crown 108 can also be pushed in towards the body of device 100 and/or be pulled away from device 100. Crown 108 can be touch-sensitive, for example, using capacitive touch technologies that can detect whether a user is touching the crown. Moreover, crown 108 can further be rocked in one or more directions or translated along a track along an edge or at least partially around a perimeter of body 102. In some examples, more than one crown 108 can be used. The visual appearance of crown 108 can, but need not, resemble crowns of conventional watches. There examples described herein refer to crown rotations, pushes, pulls, and/or touches, each of which constitutes a physical state of the crown.

Buttons 110, 112, and 114, if included, can each be a physical or a touch-sensitive button. That is, the buttons may be, for example, physical buttons or capacitive buttons. Further, body 102, which can include a bezel, may have predetermined regions on the bezel that act as buttons.

Touchscreen 106 can include a display device, such as a liquid crystal display (LCD), light-emitting diode (LED) display, organic light-emitting diode (OLED) display, or the like, positioned partially or fully behind or in front of a touch sensor panel implemented using any desired touch sensing technology, such as mutual-capacitance touch sensing, self-capacitance touch sensing, resistive touch sensing, projection scan touch sensing, or the like. Touchscreen 106 can allow a user to perform various functions by touching over hovering near the touch sensor panel using one or more fingers or other object.

In some examples, device 100 can further include one or more pressure sensors (not shown) for detecting a force or pressure applied to the display. The force or pressure applied to touchscreen 106 can be used as an input to device 100 to perform any desired operation, such as making a selection, entering or exiting a menu, causing the display of additional options/actions, or the like. In some examples, different operations can be performed based on the amount of force or pressure being applied to touchscreen 106. The one or more pressure sensors can further be used to determine a position that the force is being applied to touchscreen 106.

1. Crown-Based User Interface Control

Figure 2:
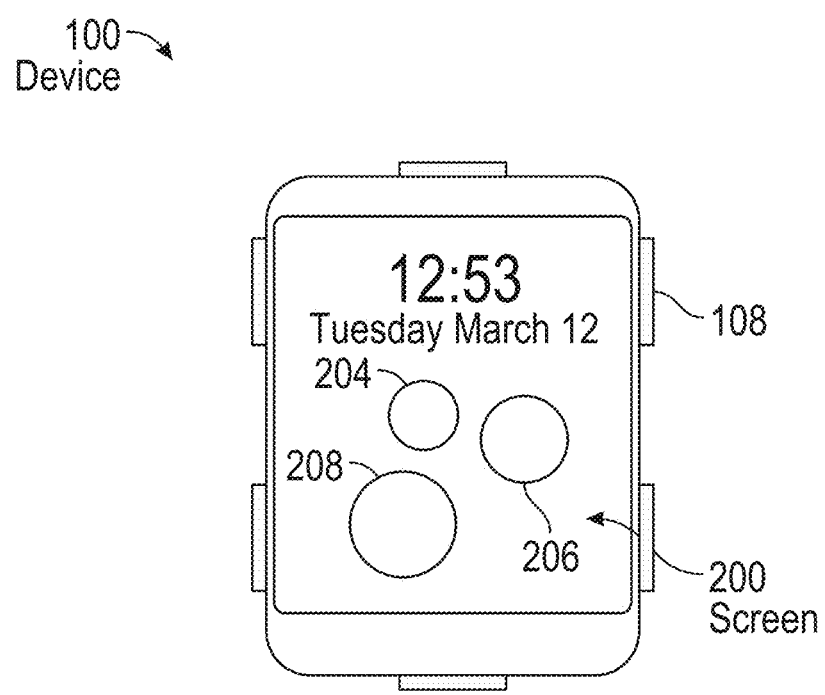
FIG. 2 illustrates an exemplary user interface.

FIGS. 2-7 illustrate exemplary user interfaces that respond to movements of crown 108 (FIG. 1). FIG. 2 shows exemplary screen 200 that can be displayed by device 100. Screen 200 can be, for example, a home screen that appears upon power-on of device 100 or that appears initially when the touchscreen display of device 100 powers-on (including wake up from a sleep state). Icons 204, 206, and 208 can be displayed in screen 200. In some embodiments, the icons can correspond to applications operable on device 100, meaning that the applications can be installed onto and/or can execute as a service on device 100. A touch (e.g., a finger tap) on an icon causes the corresponding application to launch, meaning that the application runs in the foreground of device 100 and appears on touchscreen 106. In some embodiments, the icons can correspond to text documents, media items, web pages, e-mail messages, or the like.

Device 100 can select icons 204, 206, and 208 out of larger set of available icons for display on screen 200 because these icons have information relevant to the user at the current time. For example, icon 204 can correspond to a messaging application in which the user has just received an incoming message, and icon 206 can correspond to a calendar application where the user has an upcoming calendar appointment entry.

Figure 3:
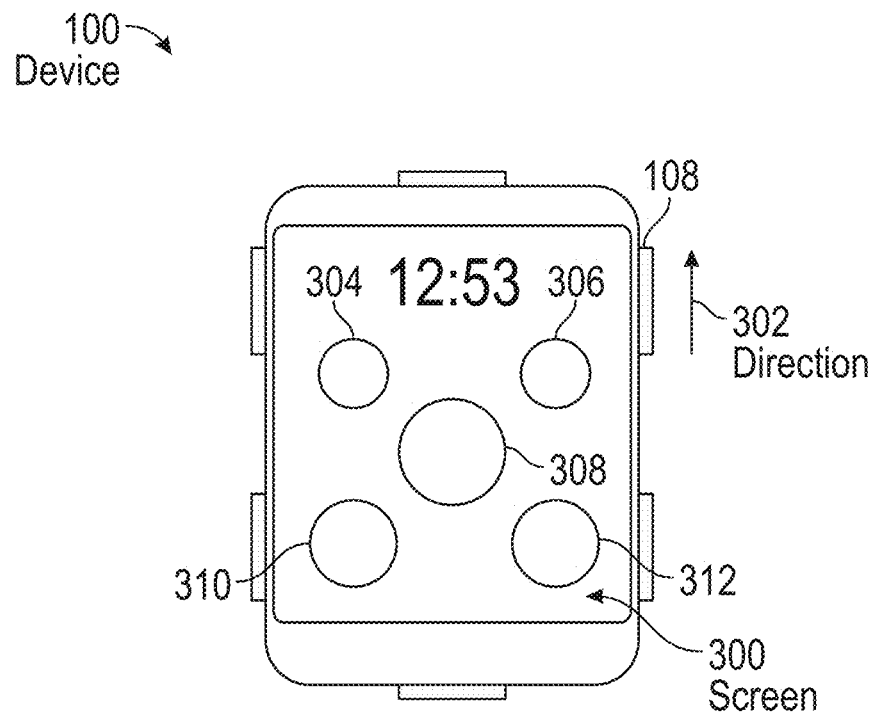
FIG. 3 illustrates an exemplary user interface.

FIG. 3 shows exemplary screen 300, which can be displayed by device 100 in response to a rotation of crown 108 in direction 302 while screen 200 (FIG. 2) is displayed. Screen 300 can show, for example, a user's favorite icons, selected previously by the user from a larger set of available icons. Also, screen 300 can include icons, selected from the larger set of available icons, by device 100 based on a user's frequency of access of the icons. Exemplary icons 304, 306, 308, 310, and 312 displayed in screen 300 can each correspond to an application operable on device 100. A touch (e.g., a finger tap) on an icon causes the corresponding application to launch.

Figure 4:
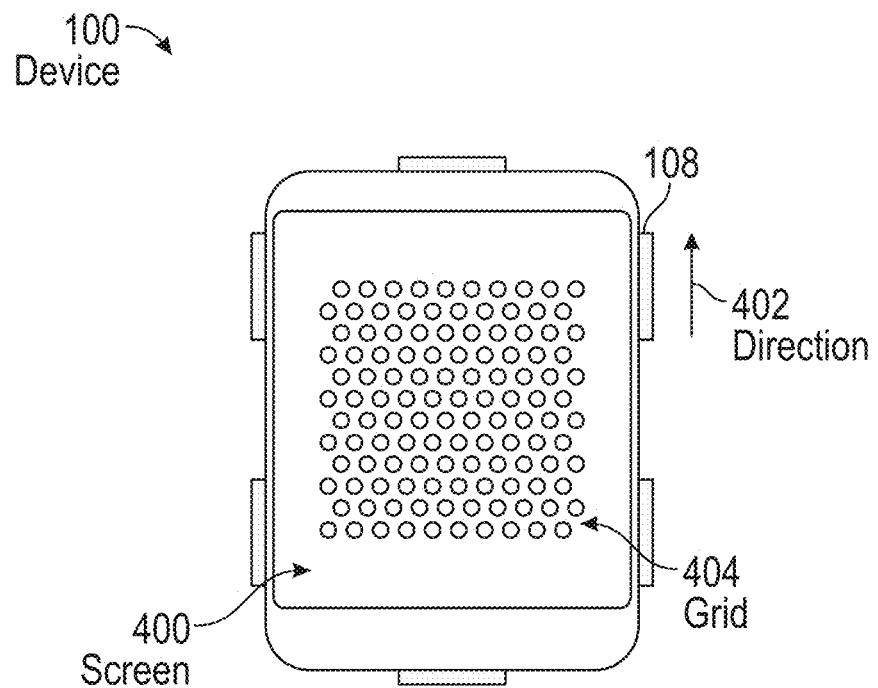
FIG. 4 illustrates an exemplary user interface.

FIG. 4 shows exemplary screen 400, which can be displayed by device 100 in response to a rotation of crown 108 in direction 402 while screen 300 (FIG. 3) is displayed. Screen 400 can show, for example, icons corresponding to all of the applications operable on device 100. Because a large number of applications can be operable on device 100, screen 400 can include a large number of icons. When many icons are displayed, the icons can be sized accordingly so that they can fit within touchscreen 106, or sized so that at least a representative number or predetermined percentage of icons can fit visibly within touchscreen 106.

Figure 5:
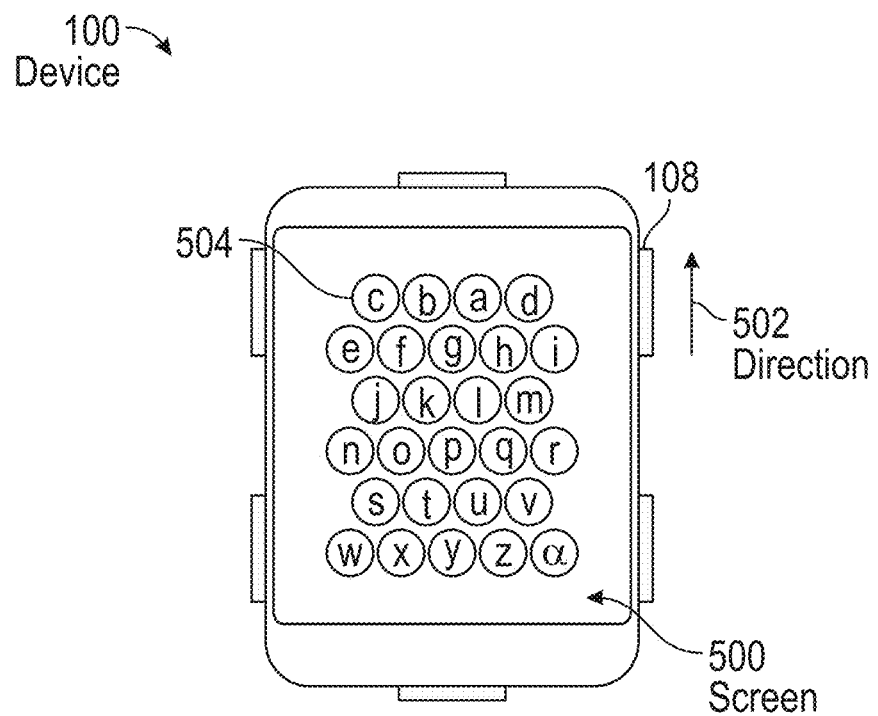
FIG. 5 illustrates an exemplary user interface.

FIG. 5 shows exemplary screen 500, which can be displayed by device 100 in response to a rotation of crown 108 in direction 502 while screen 400 (FIG. 4) is displayed. Screen 500 can show, for example, icons corresponding to a subset of the applications operable on device 100. Because fewer icons are displayed on screen 500 as compared with screen 400, the icons that are displayed on screen 500, e.g., icon 504, can become larger and can have additional fidelity as compared with the display of icons on screen 400. For example, icons on screen 500 can have indicia, in the form of text and/or imagery, identifying its corresponding application. As shown, icon 504 uses the letter "c" to suggest the name of the corresponding application begins with a "c", as in clock. In some embodiments, a touch (e.g., a finger tap) on an icon causes the corresponding application to launch.

Figure 6:
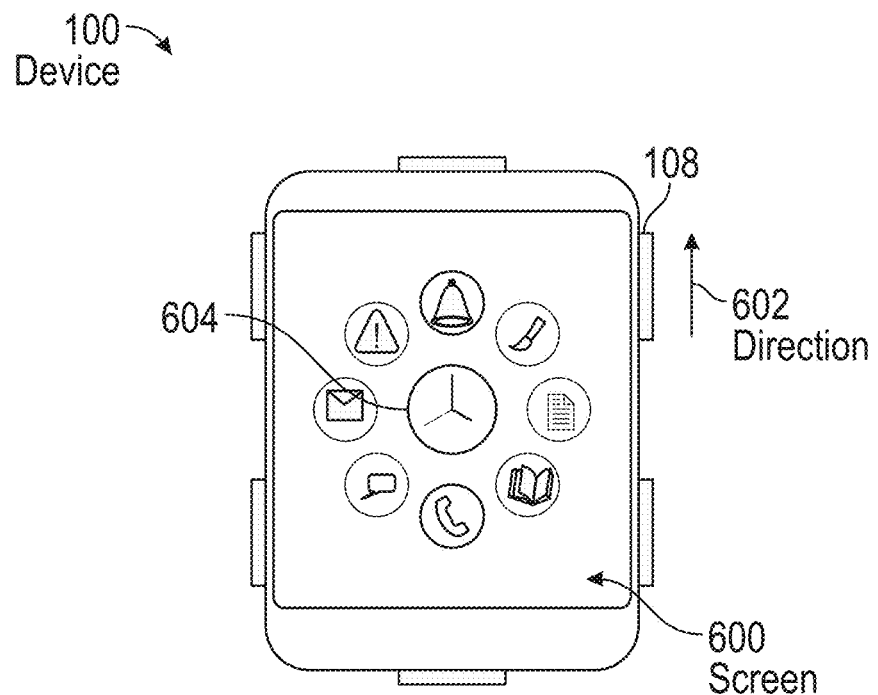
FIG. 6 illustrates an exemplary user interface.

FIG. 6 shows exemplary screen 600, which can be displayed by device 100 in response to a rotation of crown 108 in direction 602. Screen 600 can show, for example, a further winnowed subset of icons, as compared with screen 500, that correspond to applications operable on device 100. Because even fewer icons are displayed on screen 600 as compared with screen 500 (FIG. 5), the icons that are displayed (e.g., icon 604) can enlarge further and can have additional fidelity as compared with the display of icons on screens 200, 300, 400, and 500. For example, icon 604 can have the image of a clock that displays the current time. In some embodiments, a touch (e.g., a finger tap) on an icon causes the corresponding application to launch.

Figure 7:
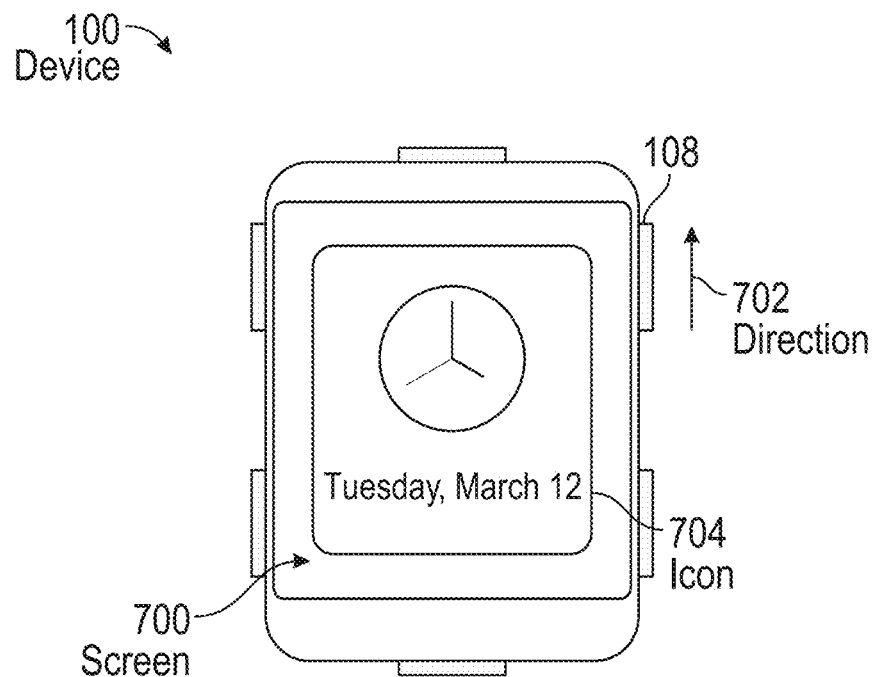
FIG. 7 illustrates an exemplary user interface.
Figure 8:
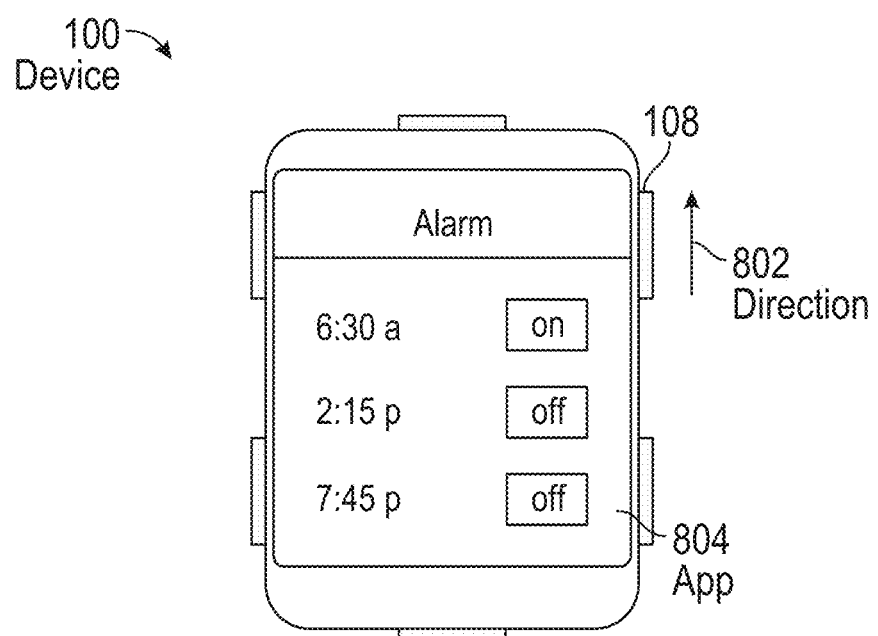
FIG. 8 illustrates an exemplary user interface.

FIGS. 7 and 8 show exemplary screens 700 and 800, respectively, that can be displayed by device 100 in response to a rotation of crown 108 in direction 702 while screen 600 (FIG. 6) is displayed.

With reference to FIG. 7, in some embodiments, screen 700 can be displayed in response to crown rotation in direction 702 when screen 600 (FIG. 6) is displayed. Because a single icon 704 is displayed on screen 700, icon 704 can have additional fidelity as compared with the previous screens. For example, icon 704 can have the image of a clock that displays day-date information along with the current time. A touch (e.g., a finger tap) on icon 704 causes the corresponding application to launch.

Turning to FIG. 8, in some embodiments, screen 800 can be displayed in response to crown rotation in direction 802 when screen 600 (FIG. 6) is displayed. Screen 800 shows application 804, which corresponds to icon 704 (FIG. 7), operating in the foreground of device 100. That is, application 804 launched in response to crown rotation in direction 802. Exemplary application 804 can be a clock application that provides alarm features. Also, in some embodiments, screen 800 becomes displayed in response to crown rotation in direction 802 when screen 700 FIG. 7) is displayed.

Screens 200-700 (FIGS. 2-7) described above can be logically organized as planes of information along an axis. Under this organization, a given screen of icons can be thought of as a plane, defined by two axes (e.g., x- and y-axes), having icons spatially positioned thereon. Multiple planes can be organized along a third axis orthogonal to at least one of the x- or y-axes, called the z-axis. (The z-axis can be perpendicular to the plane formed by the x- and y-axes.)

Figure 9:
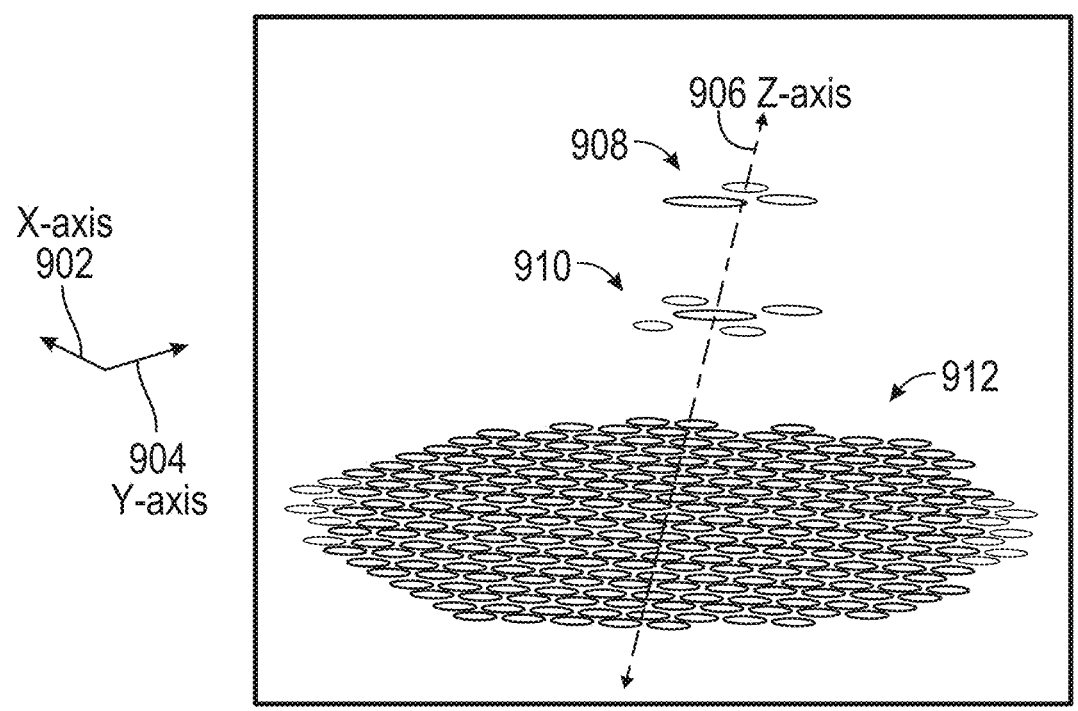
FIG. 9 illustrates an exemplary logical structure of a user interface.

This logical organization is illustrated by FIG. 9, in which x-axis 902 and y-axis 904 form a plane co-planar with the touchscreen screen surface of device 100 (FIG. 1) and z-axis 906 is perpendicular to the x/y-plane formed by axes 902 and 904. Plane 908 can correspond to screen 200 (FIG. 2). Plane 910 can correspond to screen 300 (FIG. 3). Plane 912 can represent the collection of icons that represent the operable applications of a personal electronic device. Thus, different viewpoints of plane 912 can correspond to screens 400-700 (FIGS. 4-7). Planes 908 and 910 can be related to plane 912 in that planes 908 and 910 can each include a subset of the icons available on plane 912. The particular plane of information (i.e., screen of icons) that is to be displayed on a personal electronic device can be selected via crown movement, such as crown rotation. That is, crown movement can be used to traverse the planes of information intersecting z-axis 906, or to provide alternative views of a given plane (e.g., plane 912).

In some embodiments, when an end of the z-axis (e.g., the top or bottom-most plane) is reached via crown movement, the displayed information (e.g., screen of icons) produces a rubberband effect to indicate that the end has been reached. Consider the situation in which a user has, through crown input, reached the bottom most plane of information. As the user provides additional crown input in the same direction, the displayed collection of icons shrink (to the extent possible) in accordance with the crown movement until the movement stops. When the crown movement stops, the displayed icons return from their shrunken size back to their normal size via on-screen animation, thereby producing the visual effect of rubberbanding.

One notable benefit of this logical organization is that different planes of information need not be (but can be) zoomed subsets of one another. That is, for example, planes 908 and 910 can contain entire different icons out of those icons available on a personal electronic device, but yet the different planes of information can be accessed efficiently by a user.

Alternatively, screens 200-700 (FIG. 2-7) can be logically organized as subsets of information belonging to different modal states of a personal electronic device. Under this organization, screens 200 and 300 can correspond to first and a second modal state of the device, and screens 400-700 can correspond to a third modal state, for example. The personal electronic device can cycle through modal states in response to crown pushes, and can display screens 200 or 300 in the first and second modal states, respectively. In alternative embodiments, modal states may be cycled using buttons 110, 112, or 114. When multiple screens are available within a particular modal state (e.g., the third modal state), the device can switch from the display of one screen (e.g., 300) to another screen (e.g., 400) based on crown rotation. On-screen user interface elements, such as paging dots, can be used to indicate the availability of additional screens for display within a particular modal state.

Figure 41:
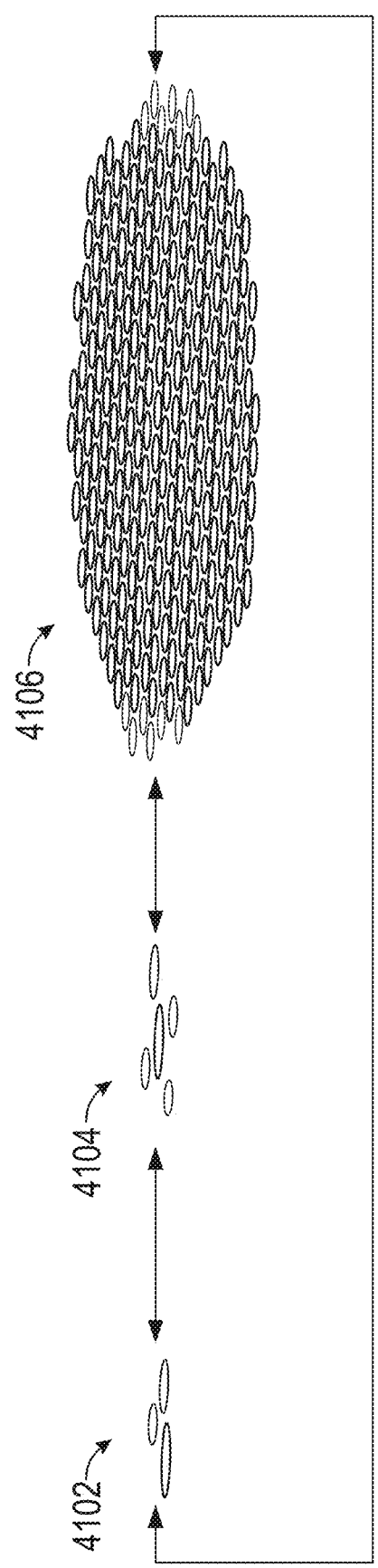
FIG. 41 illustrates an exemplary logical structure of a user interface.

This logical arrangement is illustrated by FIG. 41. As shown, planes 4102 and 4104 can correspond to screens 200 (FIG. 2) and 300 (FIG. 3) respectively. Plane 4106 can represent the collection of icons that represent the operable applications of a personal electronic device. Thus, different viewpoints of plane 4106 can correspond to screens 400-700 (FIGS. 4-7). The particular plane of information (i.e., screen of icons) that is to be displayed on a personal electronic device can be selected via crown movement, such as crown pushes.

2. Velocity-Based Crown Control

Device 100 (FIG. 1) can consider the angular velocity of rotation of crown 108 (FIG. 1) in determining whether one screen of icons should be replaced with another screen of icons. Specifically, device 100 can require crown 108 to rotate above a predetermined angular velocity before changing the display of one screen of icons to another. In this way, while slow rotations of crown 108 that are unintended by a user can still cause device 100 to receive crown input indicating angular displacement, the displacement need not be interpreted as having sufficient velocity to cause user interface updates that are unintended. The selection of predetermined angular velocities for this purpose can depend on a number of factors, such as the density of icons currently displayed, the visual arrangement of icons currently displayed, and so forth.

In some embodiments, the minimum angular velocity of crown rotation that is necessary to switch between screens of icons corresponds directly to the instantaneous angular velocity of crown 108 (FIG. 1), meaning that the user interface of device 100, in essence, responds when crown 108 reaches a sufficient angular velocity. In some embodiments, the minimum angular velocity of crown rotation necessary for switching between screens of icons is a calculated velocity that is based on, but not directly equal to, the instantaneous ("current") angular velocity of crown 108. In these embodiments, device 100 can maintain a calculated crown (angular) velocity V in discrete moments in time T according to equation 1:

$$V_T = V_{(T-1)} + \Delta V_{CROWN} - \Delta V_{DRAG}.$$ (EQ. 1)

In equation 1, $V_T$ represents a calculated crown velocity (speed and direction) at time T, $V_{(T-1)}$ represents the previous velocity (speed and direction) at time T−1, $\Delta V_{CROWN}$ represents the change in velocity caused by the force being applied through the rotation of the crown at time T, and $\Delta V_{DRAG}$ represents the change in velocity due to a drag force. The force being applied, which is reflected through $\Delta V_{CROWN}$, can depend on the current velocity of angular rotation of the crown. Thus, $\Delta V_{CROWN}$ can also depend on the current angular velocity of the crown. In this way, device 100 can provide user interface interactions based not only on instantaneous crown velocity but also based on user input in the form of crown movement over multiple time intervals, even if those intervals are finely divided. Note, typically, in the absence of user input in the form of $\Delta V_{CROWN}$, $V_T$ will approach (and become) zero based on $\Delta V_{DRAG}$ in accordance with EQ. 1, but $V_T$ would not change signs without user input in the form of crown rotation ($\Delta V_{CROWN}$).

Typically, the greater the velocity of angular rotation of the crown, the greater the value of $\Delta V_{CROWN}$ will be. However, the actual mapping between the velocity of angular rotation of the crown and $\Delta V_{CROWN}$ can be varied depending on the desired user interface effect. For example, various linear or non-linear mappings between the velocity of angular rotation of the crown and $\Delta V_{CROWN}$ can be used. In another example, the mapping can depend on the number of icons and/or icon arrangement currently being displayed.

Also, $\Delta V_{DRAG}$ can take on various values. For example, $\Delta V_{DRAG}$ can depend on the velocity of crown rotation such that at greater velocities, a greater opposing change in velocity ($\Delta V_{DRAG}$) can be produced. In another example, $\Delta V_{DRAG}$ can have a constant value. In yet another example, $\Delta V_{DRAG}$ can be based on the number of current displayed icons and/or the currently displayed icon arrangement. It should be appreciated that the above-described requirements of $\Delta V_{CROWN}$ and $\Delta V_{DRAG}$ can be changed to produce desirable user interface effects.

As can be seen from EQ. 1, the maintained velocity ($V_T$) can continue to increase as long as $\Delta V_{CROWN}$ is greater than $\Delta V_{DRAG}$. Additionally, $V_T$ can have non-zero values even when no $\Delta V_{CROWN}$ input is being received, meaning that user interface screens can continue to change without the user rotating the crown. When this occurs, screens can stop changing based on the maintained velocity at the time the user stops rotating the crown and the $\Delta V_{DRAG}$ component.

In some embodiments, when the crown is rotated in a direction corresponding to a rotation direction that is opposite the current user interface changes, the $V_{(T-1)}$ component can be reset to a value of zero, allowing the user to quickly change the direction of the screen changes without having to provide a force sufficient to offset the $V_T$.

In other embodiments, different physical crown states other than rotation of the crown are used to navigate through displayed icons.

3. User Interface Appearance

Figure 10:
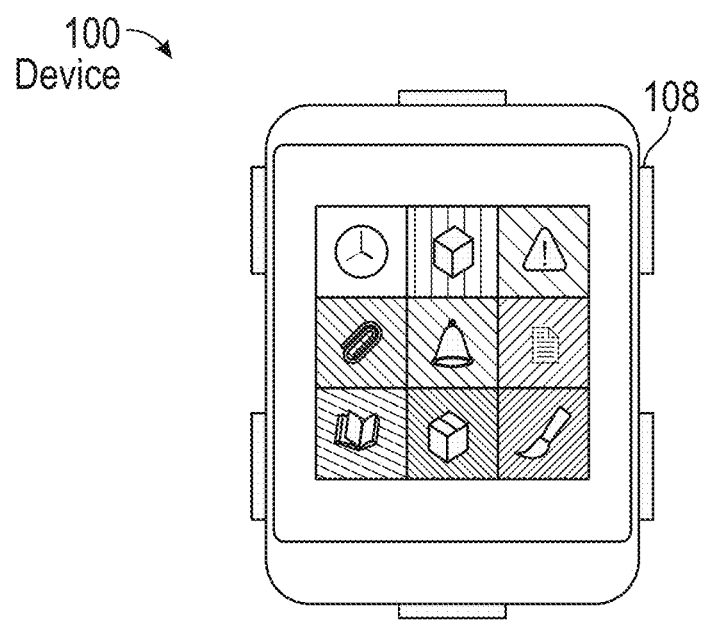
FIG. 10 illustrates an exemplary user interface.

Icons can take on various visual appearances. For example, icons can be rectangular in shape, as shown in FIG. 10. As another example, icons can be circular, as shown in FIGS. 2-7. Further, icons can take on various spatial arrangement schemes, meaning that icons can be arranged along the rows and columns of an invisible grid. Grids can be symmetrical or non-symmetrical. In FIG. 10, a symmetrical grid is used, for example. In FIG. 5, a non-symmetrical grid having x icons arranged on a first row and y icons arranged along a second row is used, for example.

Figure 11:
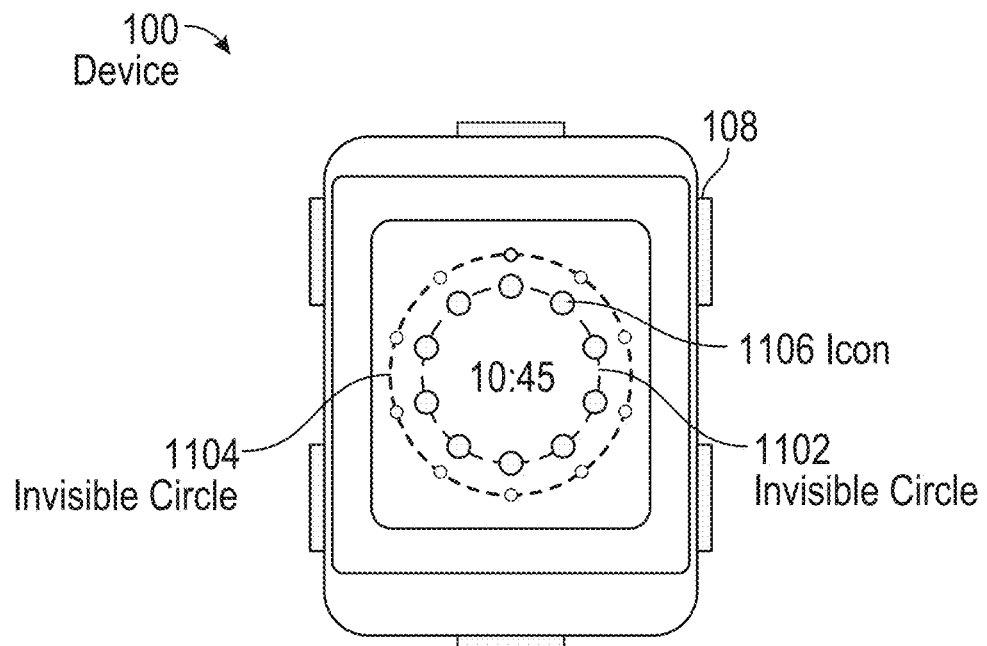
FIG. 11 illustrates an exemplary user interface.

FIG. 11 illustrates a radial icon arrangement scheme where circular icons are aligned along the circumference of invisible circles 1102 and 1104 of different diameters. Invisible circles 1102 and 1104 are, but need not be, concentric. Icons, such as icon 1106, arranged along different invisible circles can have different sizes. As shown, icons arranged along invisible circle 1102 are closer to the center of device 100 and are larger than those arranged along invisible circle 1104. Also, although not illustrated in FIG. 11, icons in a radial arrangement can be arranged along more than two invisible circles.

The distance that a particular icon is position from the center of the radial icon arrangement can depend on different factors. For example, the distance can be proportional to frequency of use of the icon; an icon that is used frequently is closer to the center. As another example, the distance can depend on whether an incoming notification has been received for (the application corresponding to) the icon. As another example, the distance can be user-defined, or can be otherwise determined by device 100 (i.e., curated).

Figure 25A:
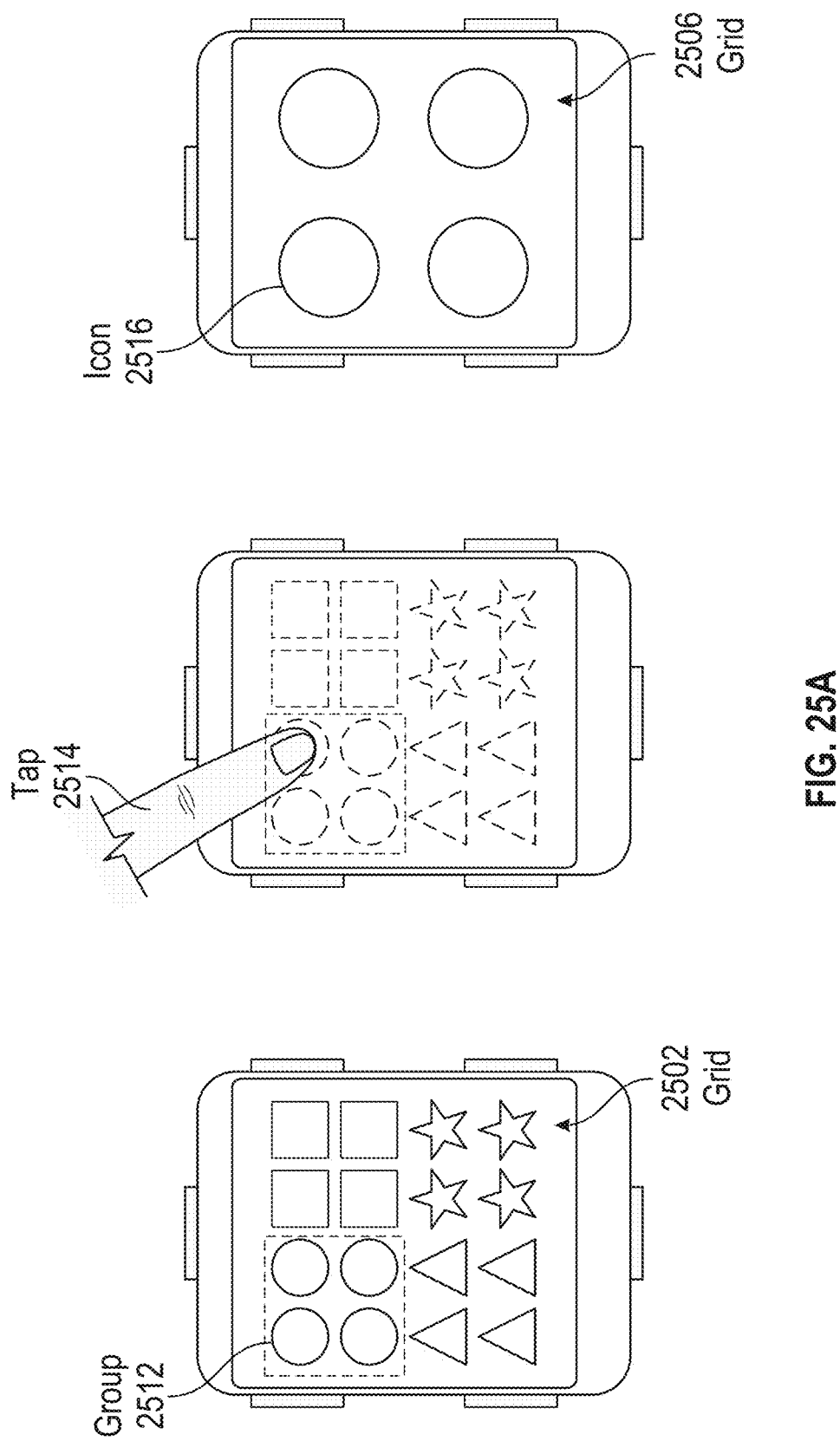
FIG. 25A and FIG. 25B illustrate an exemplary user interface.
Figure 25B:
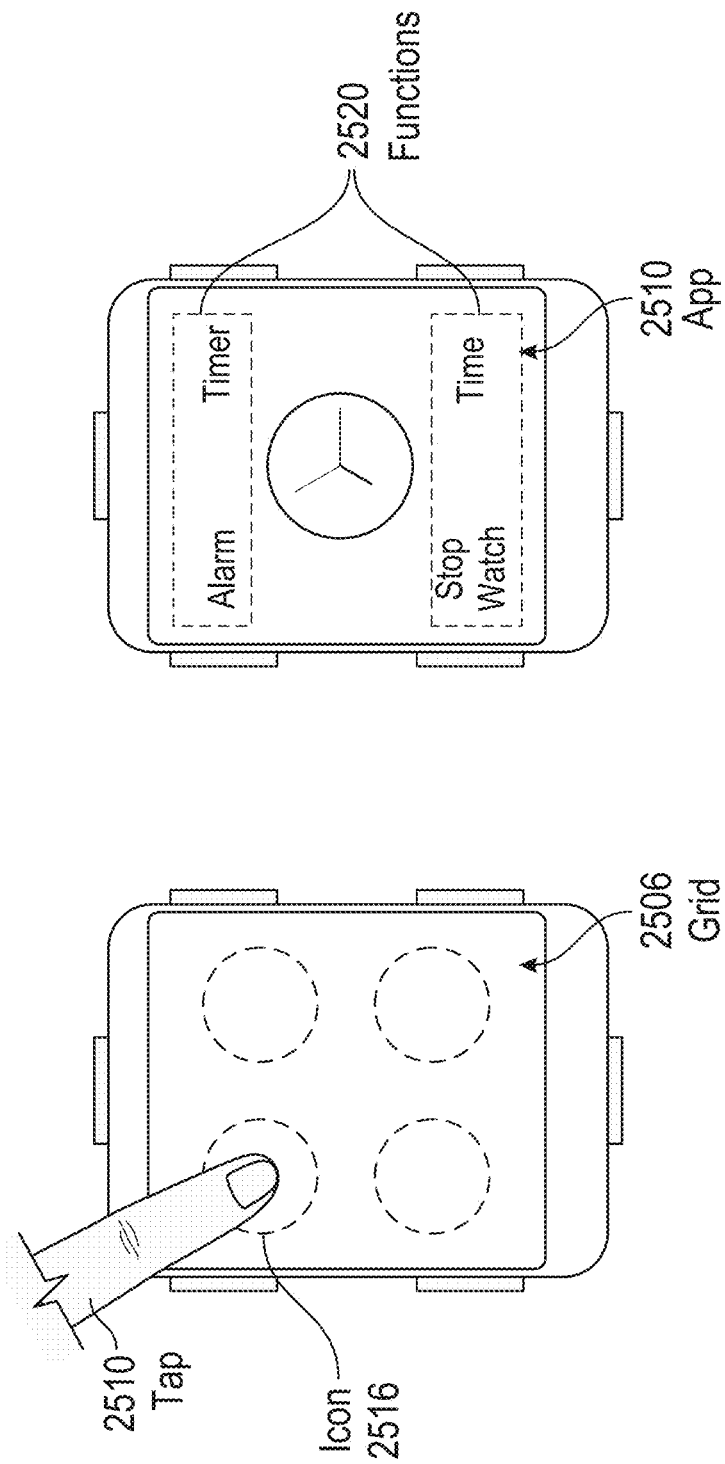

FIG. 25A illustrates an arrangement of icons into icon groups. On grid 2502, four groups of icons, including icon group 2512, are displayed. In response to a touch input, such as a finger tap at touchscreen location 2514 on group 2512, the icons within group 2512 can be displayed in enlarged form. In grid 2506, the icons within group 2512, including icon 2516, are displayed in enlarged form. FIG. 25B illustrates an arrangement of application functionalities into groups. On grid 2508, as discussed above, the four icons of icon group 2512 are displayed on grid 2506. A selection of icon 2516 (e.g., via finger tap 2518) can cause a group of functions 2520 provided by application 2510 (which corresponds to icon 2508) to be displayed.

Figure 42:
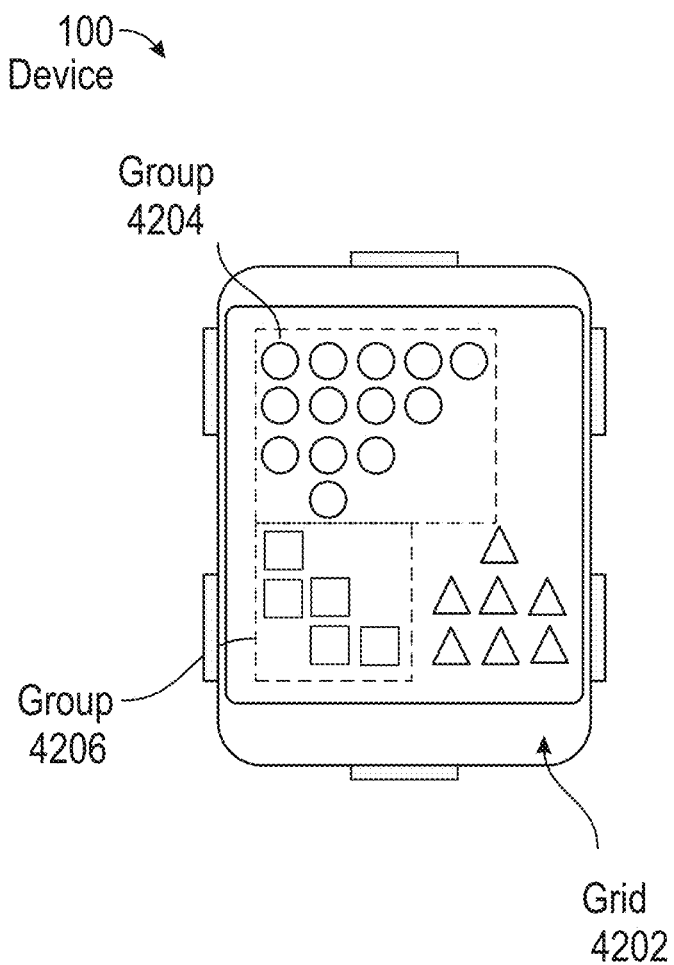
FIG. 42 illustrates an exemplary user interface.

The size and shape of icon groups can be organic or defined. Icon groups that are defined, such as icon group 2512 in grid 2502 (FIG. 25A), share a predefined group size and group shape. Organic icon groups, shown in FIG. 42, can be of a user-defined group size and/or group shape. For example, icon groups 4204 and 4206 in grid 4202 are of different user-defined shapes and sizes. In some embodiments, organic icon groups are defined using software running on a computer external to the personal electronic device and downloaded onto the personal electronic device.

FIG. 30 illustrates an icon arrangement scheme where icons are arranged similar to pages of a rolodex. Pages of exemplary rolodex 3002 can flip in response to crown rotation. For example, page (icon) 3004 can flip downward onto page (icon) 3006 in response to a crown rotation.

FIG. 31 illustrates an icon arrangement scheme where icons are arranged on the outer circumference of a spinning dial. Exemplary spinning dial 3102 can spin in response to crown rotation. For example, a crown rotation in direction 3104 can cause dial 3102 to spin in the same direction (3106). Also, a crown push (or pull) can change the number of columns in 3102, allowing the icons of the remaining columns to be enlarged and/or to have increased fidelity.

FIG. 32 illustrates an icon arrangement scheme in the form of a thumbnailed list 202. Icon 3204 within exemplary thumbnailed list 3202 can have corresponding thumbnail 3206. The icons of thumbnailed list 3202 can be traversed via crown rotation. A specific icon, such as icon 3204, can be selected directly for display by touching corresponding thumbnail 3206.

FIG. 33 illustrates an arrangement scheme where icons are aligned with the surface of an invisible sphere or polyhedron. Icons on the foreground surface of the invisible sphere, such as icon 3302, can be displayed. Icons on the far side of the invisible sphere's surface are not displayed. The invisible sphere can rotate in response to crown rotation and/or touchscreen input, thereby changing the specific icons that are displayed.

During operation, device 100 (FIG. 1) can use one or more of the icon arrangement schemes described above. The particular arrangement(s) used by device 10 can be user-selected and/or system-selected. That is, a user may be permitted to identify one or more preferred arrangements for display. Also, arrangements can be selected by device 100 based on criteria such as the total number of applications installed on the device, the number frequently accessed icons, and so forth.

Further, the specific ordering and placement of icons within a particular icon arrangement scheme can be user-selected and/or system-selected. For example, a user can be permitted to specify the position of an icon on a given screen. Also, icon placement can be determined by device 100 (i.e., curated) based on criteria such as the frequency of use of particular icons, a calculated relevance, and so forth.

4. Responses to User Input

Figure 12:
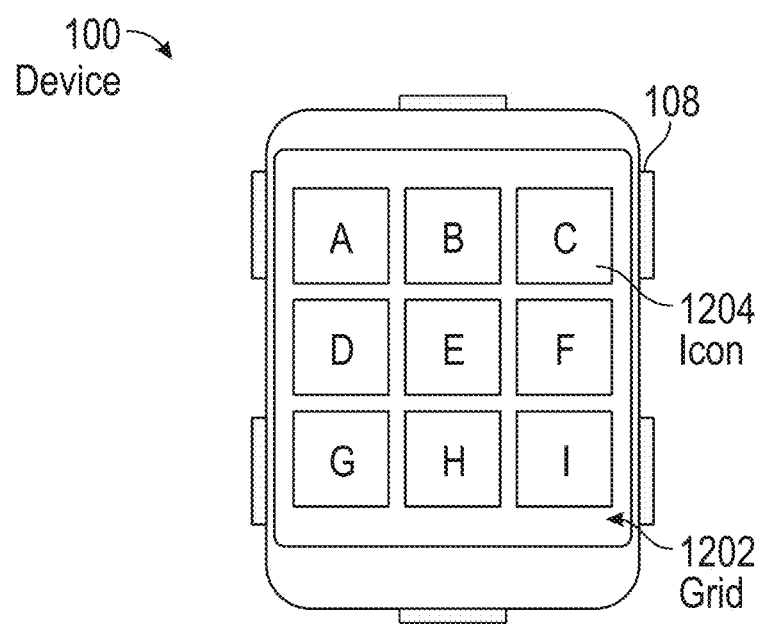
FIG. 12 illustrates an exemplary user interface.
Figure 13:
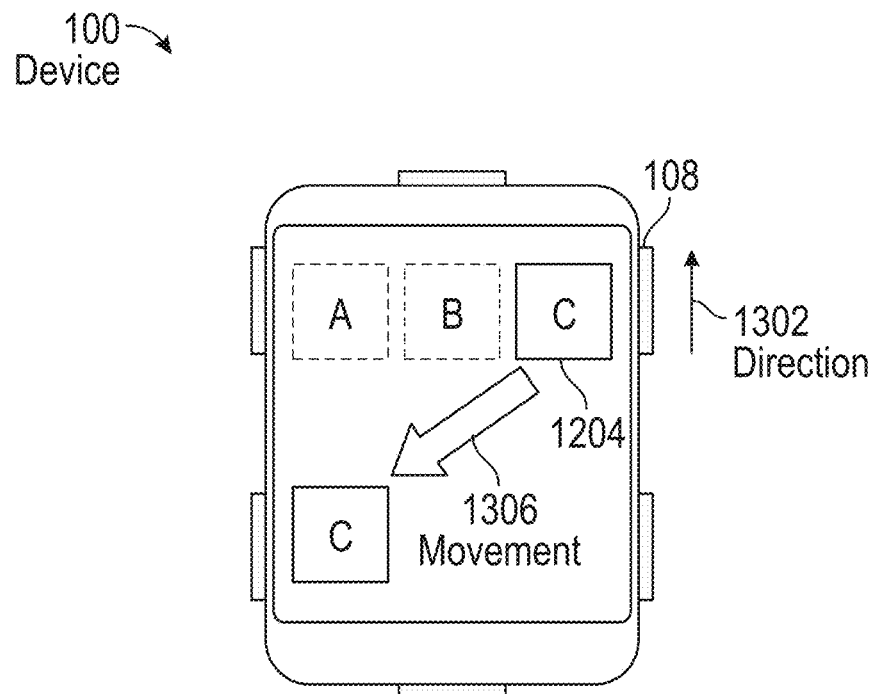
FIG. 13 illustrates an exemplary user interface transition.
Figure 14:
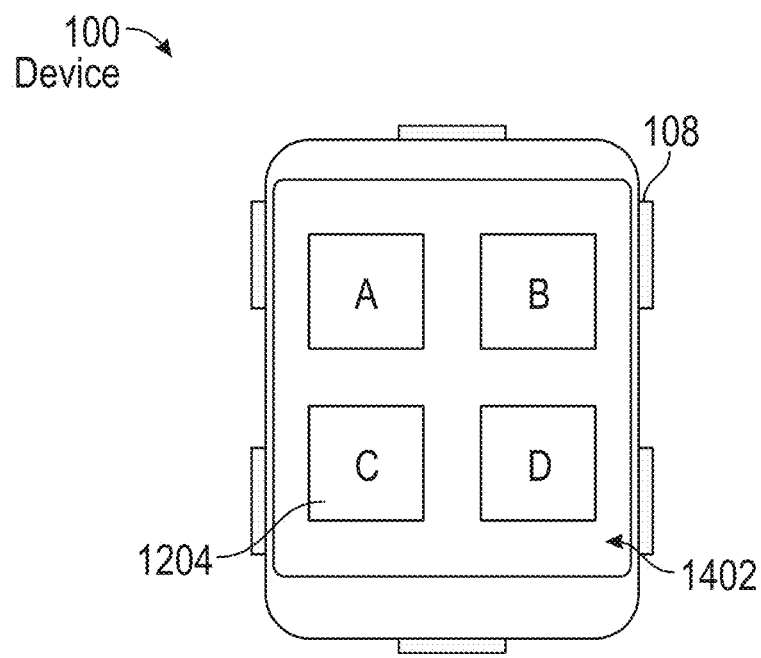
FIG. 14 illustrates an exemplary user interface.

Displayed icons can respond to user input. FIGS. 12-14 illustrate a rearrangement of displayed icons in response to crown rotation. In FIG. 12, nine icons are displayed along a 3-by-3 symmetric grid 1202. Icon 1204 is displayed in the top-right position of grid 1202. As discussed above with respect to FIGS. 4-7, a rotation of crown 108 can cause device 100 to reduce the number of displayed icons. For example, a rotation of crown 108 can cause device 100 to display a 2-by-2 grid, thereby reducing the number of displayed icons. FIG. 13 illustrates an exemplary transition to a 2-by-2 grid in response to a crown rotation in direction 1302. As shown, in response to crown rotation 1302, icon 1204 is translated visibly on-screen from its top-right position in the 3-by-3 grid of FIG. 12 to its new position in the 2-by-2 grid to be displayed. Specifically, as shown in FIG. 14, icon 1204 is translated to the lower-left corner of 2-by-2 grid 1402. Further, icons that are to remain displayed in the 2-by-2 grid after the transition from grid 1202 are enlarged and positioned into the 2-by-2 grid 1402.

Figure 15:
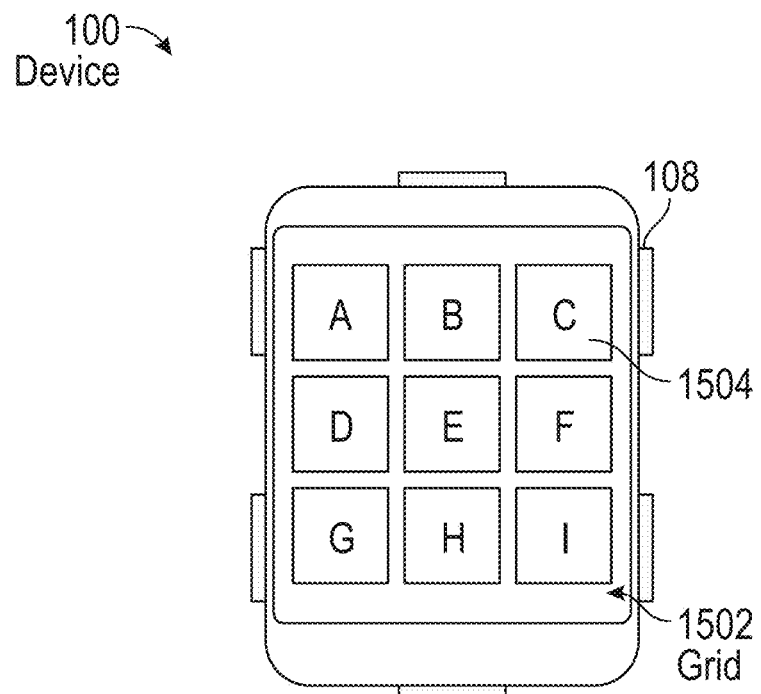
FIG. 15 illustrates an exemplary user interface.
Figure 16:
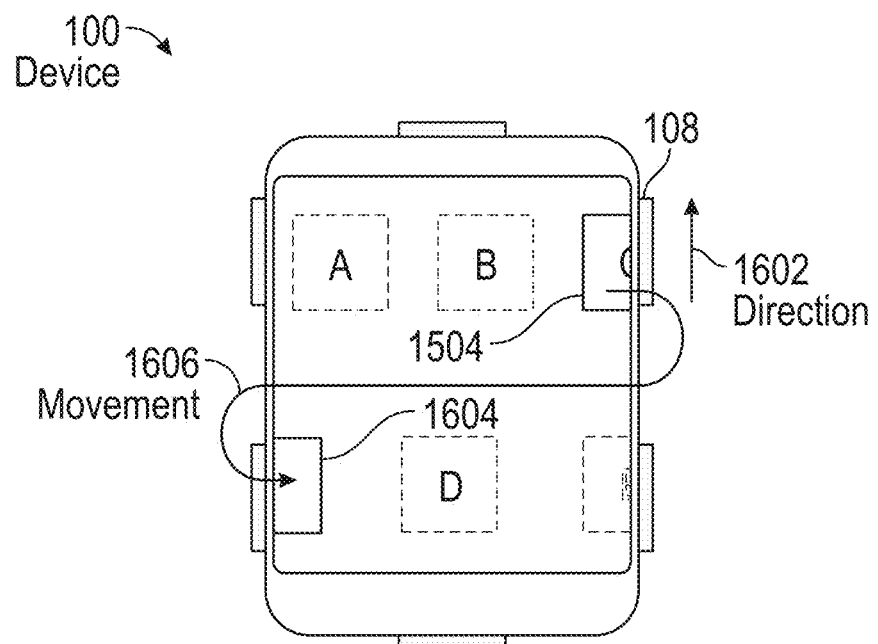
FIG. 16 illustrates an exemplary user interface transition.
Figure 17:
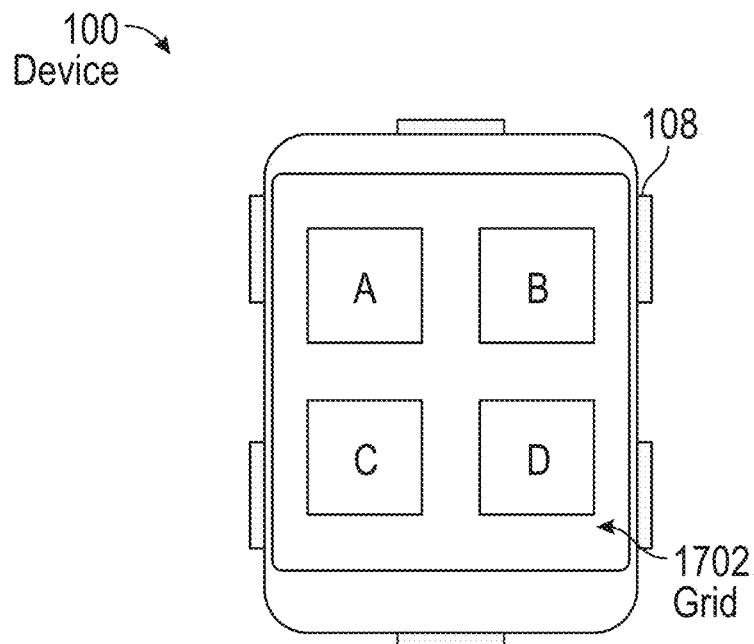
FIG. 17 illustrates an exemplary user interface.

FIGS. 15-17 illustrate another rearrangement of icons in response to crown rotation. In FIG. 15, nine icons are displayed along a 3-by-3 symmetric grid 1502. Icon 1504 is displayed in the top-right position of grid 1502. As shown in FIG. 16, in response to crown rotation 1602, icon 1504 is translated off-screen from its position in grid 1502 (FIG. 15) while it is translated into its new position in the 2-by-2 grid to be displayed. To put another way, during the transition illustrated by FIG. 16, icon 1504 can be split into two portions that are displayed in two separate, non-abutting positions of the touchscreen of device 100. More specifically, while one portion of icon 1504 remains partially displayed in the top-right corner as icon 1504 is translated off-screen, the remaining portion of 1504 is partially displayed in the lower-left corner as it is translated on-screen. As shown in FIG. 17, icon 1504 is translated to the lower-left corner of 2-by-2 grid 1702. Further, icons that are to remain displayed in the 2-by-2 grid after the transition from grid 1502 are enlarged and positioned into the 2-by-2 grid 1702.

Figure 18:
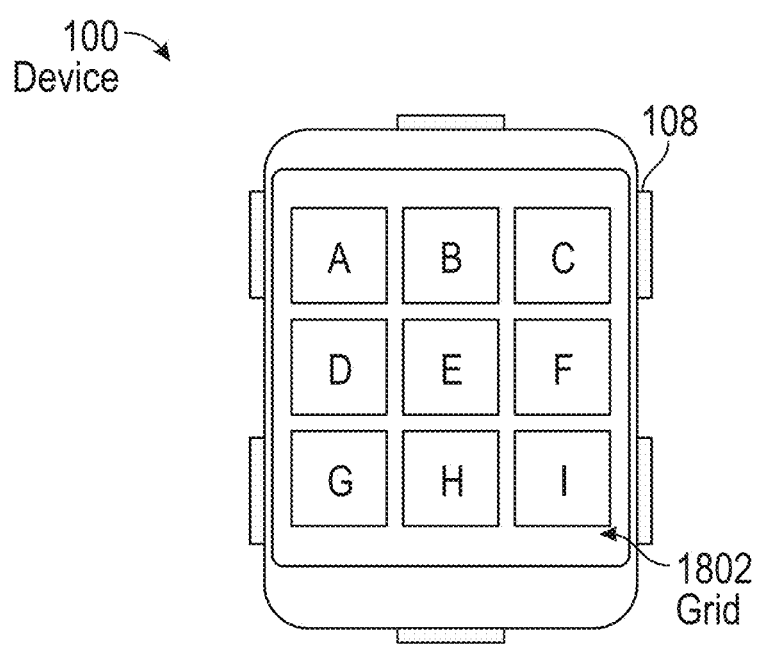
FIG. 18 illustrates an exemplary user interface.
Figure 19:
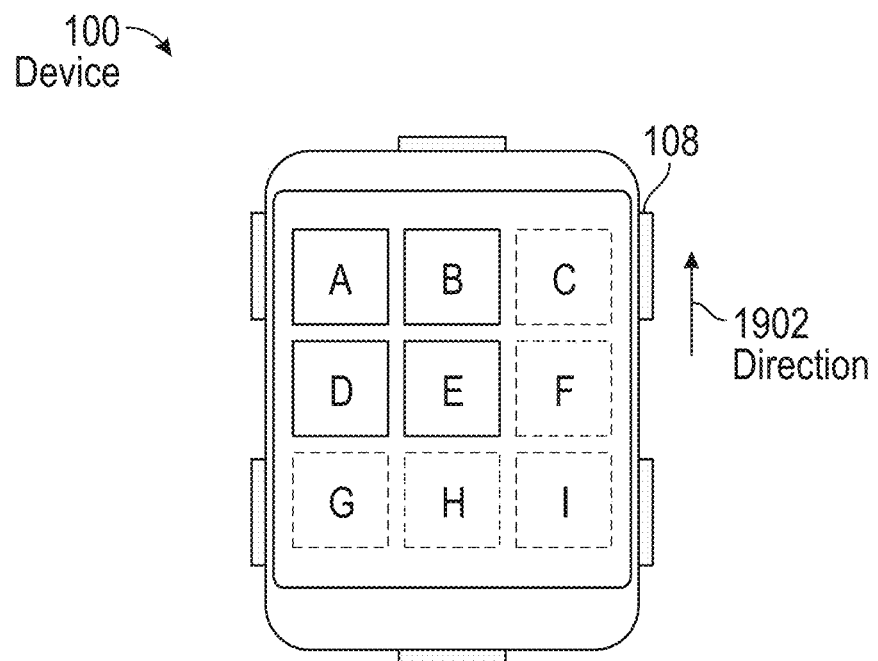
FIG. 19 illustrates an exemplary user interface transition.
Figure 20:
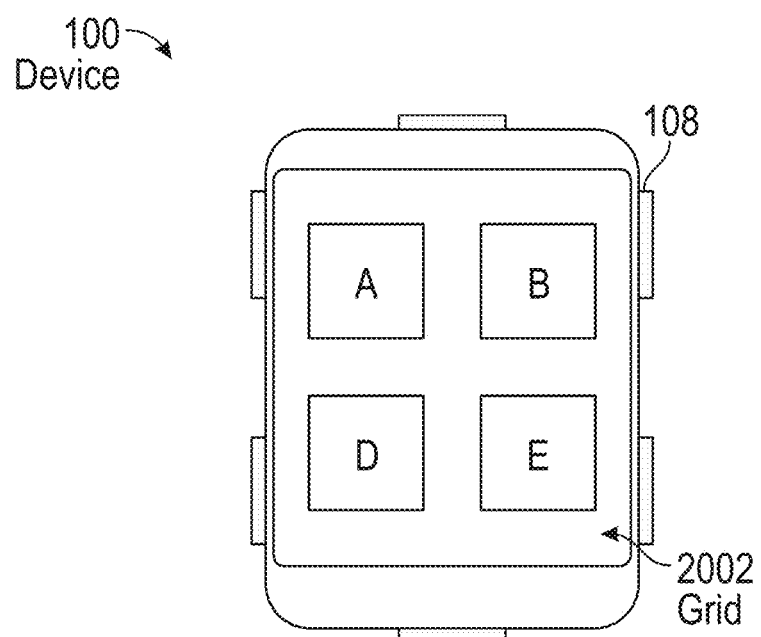
FIG. 20 illustrates an exemplary user interface.

FIGS. 18-20 illustrate another rearrangement of icons in response to crown rotation. In FIG. 18, nine icons are displayed along a 3-by-3 symmetric grid 1802. As shown in FIG. 19, in response to crown rotation 1902, the icons along the right and bottom boundaries of grid 1802 (FIG. 18) are removed from display while the remaining icons are enlarged. The remaining icons are displayed enlarged as shown in grid 2002 of FIG. 20.

It should be noted that in the exemplary screens shown in FIGS. 12-20, the icon displayed in the upper-left corner (i.e., marked "A") is anchored, meaning that the above-described transitions do not cause the icon to move away from the upper-left corner. It is possible, however, to unanchor such an icon through user input, as discussed below.

Figure 21:
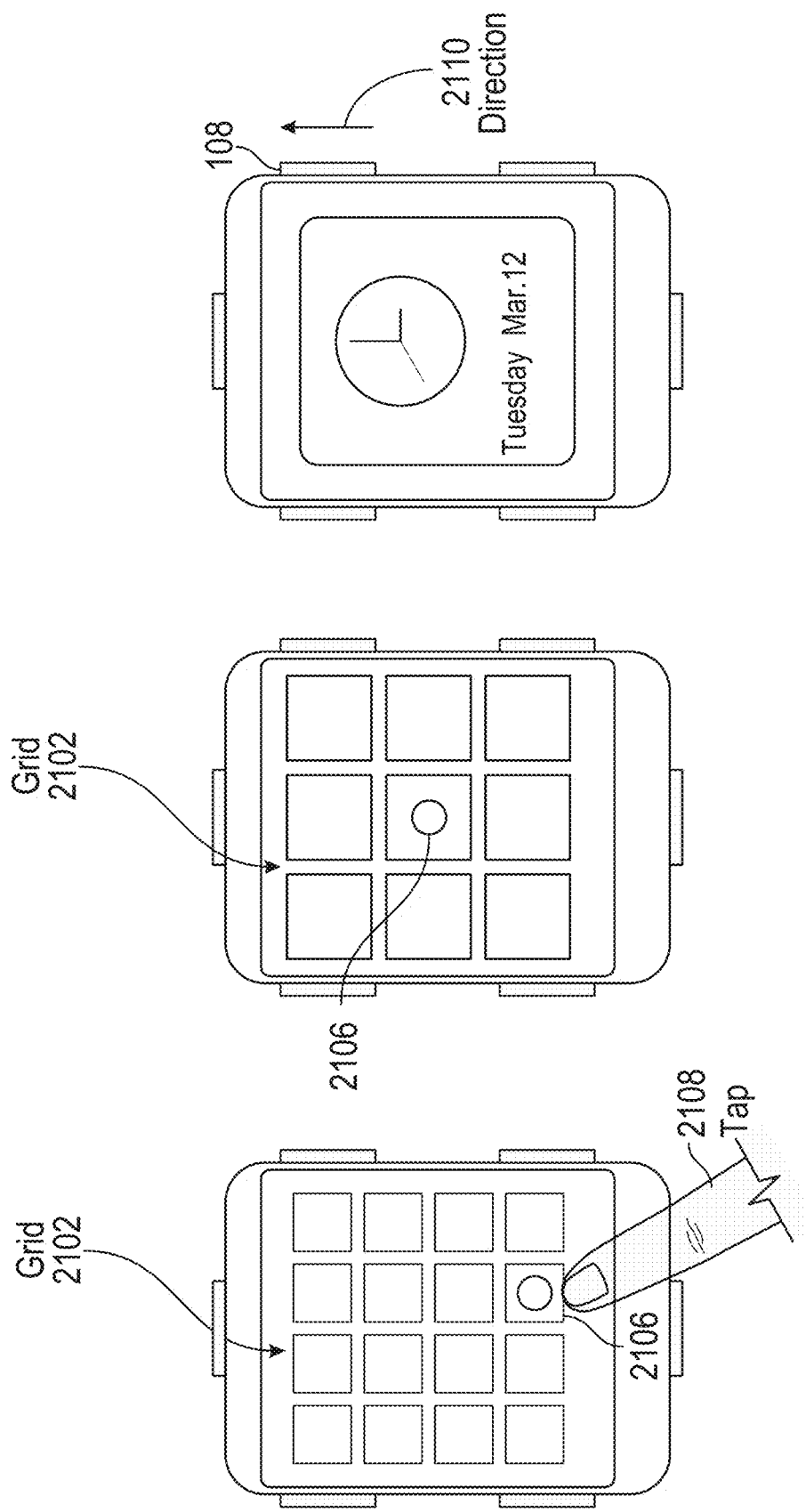
FIG. 21 illustrates an exemplary user interface.

FIG. 21 illustrates a rearrangement of icons in response to touchscreen input. As shown, icon 2106 is displayed in the bottom row of 4-by-4 grid 2012. In response to a finger tap 2104 on icon 2106, 3-by-3 grid 2108 is displayed with icon 2106 enlarged in the center. Notably, the icon marked "A," which is displayed in grid 2012, is no longer displayed in grid 2108. FIG. 21 also illustrates an update of displayed icons in response to crown rotation. Specifically, in response to crown rotation 2110, icon 2106 is further enlarged and becomes the only icon displayed on-screen.

Figure 22:
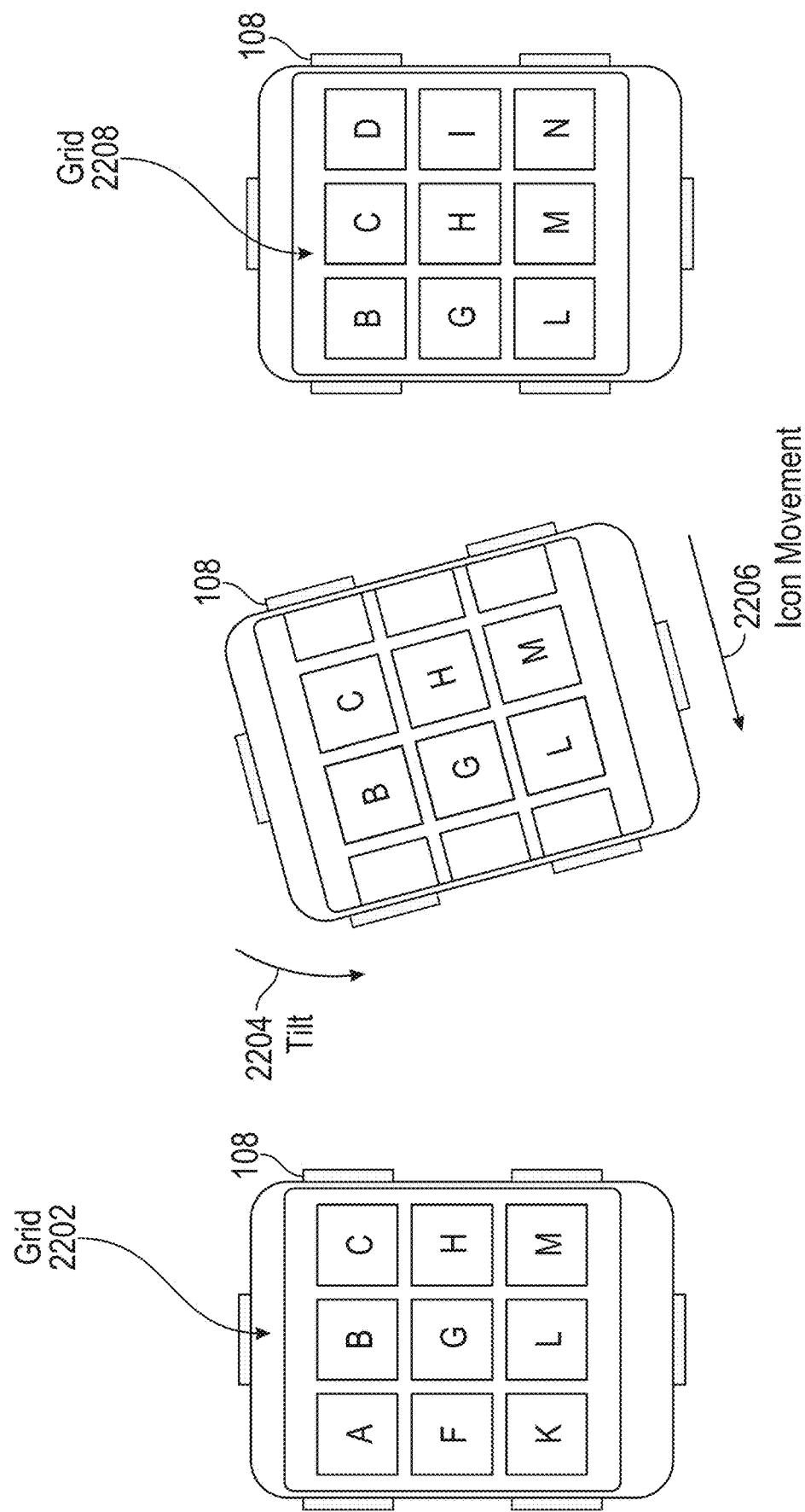
FIG. 22 illustrates an exemplary user interface and transition.

FIG. 22 illustrates a rearrangement of icons in response to movement of device 100. Device movement can be detected using one or more sensors, for example, a gyroscope. As shown, various icons are displayed in grid 2202. In response to tilting of device 100 in direction 2204, the displayed icons are translated in direction 2206, resulting in the display of different icons in grid 2208. Specifically, in response to the leftward tilting of device 100 in direction 2204, the icons of grid 2202 translate in the left direction 2206. In some embodiments, the translation may be incremental such that a single row or column transitions off a single row or column transitions onto the display. Alternatively, a whole screen of icons may transition off as a completely new set of icons transition onto the display.

Figure 23:
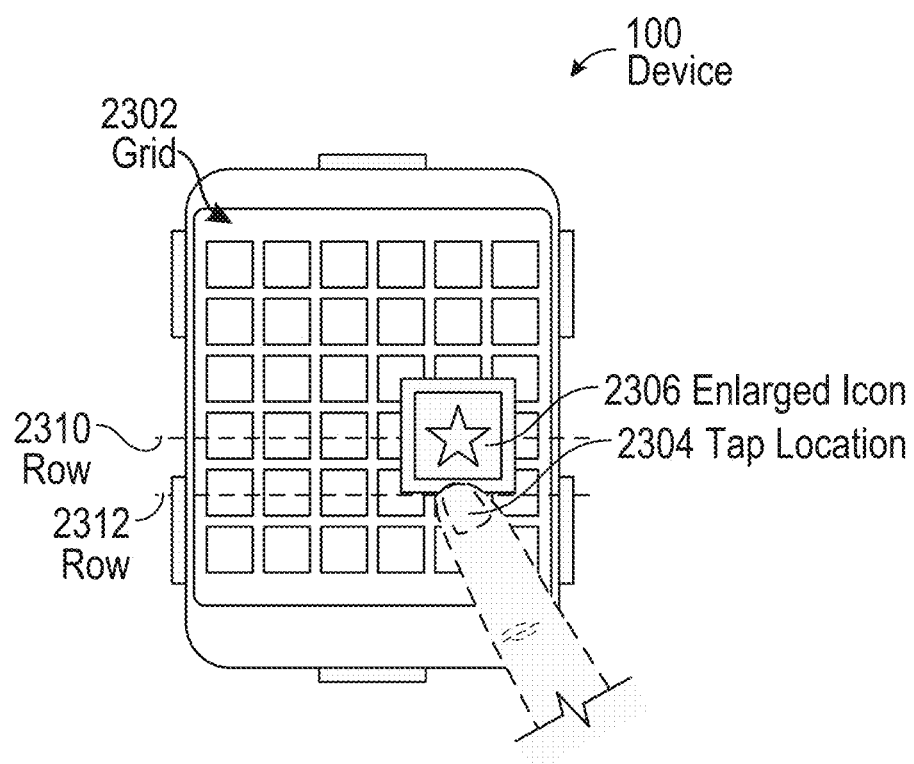
FIG. 23 illustrates an exemplary user interface.

FIG. 23 illustrates a change in icon appearance in response to touchscreen input. As shown, in response to a touch at location 2304, icon 2306 becomes enlarged. Notably, icon 2306 is not located at location 2304, rather, icon 2306 (in its unenlarged state) is in row 2310 above touch location 2304 which is along row 2312. In this way, user visibility of icon 2306 is improved both because the icon is enlarged and because the icon is not blocked from view by the potentially opaque object that is touching device 100. It should be noted that more than one icon can be enlarged in response to a nearby touch. Multiple icons can be enlarged at different levels of magnification inversely proportional to the distance between each icon being enlarged and the touch location.

Figure 40:
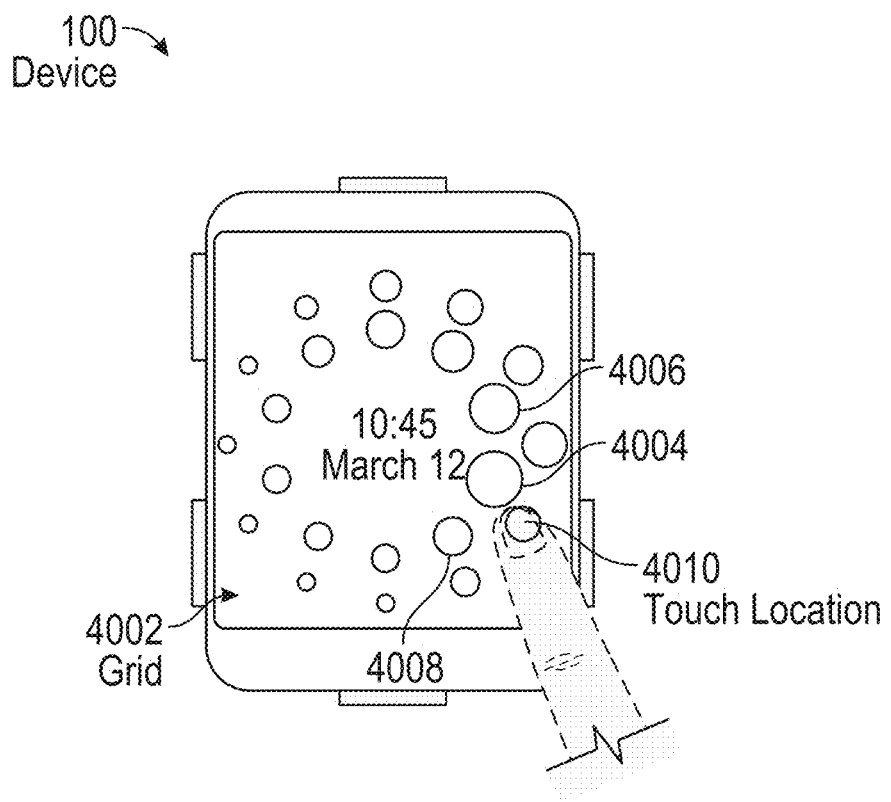
FIG. 40 illustrates an exemplary user interface.

FIG. 40 illustrates icon movements that account for physical interaction between nearby icons. As shown, grid 4002 includes a number of icons arranged in a radial arrangement. In response a touch input at location 4010, a number of icons are enlarged to at different levels of magnification. Notably, the enlarging of icon 4004 can cause adjacent icons 4006 and 4008 to move away from icon 4004 so the icons do not block each other from view.

Figure 24:
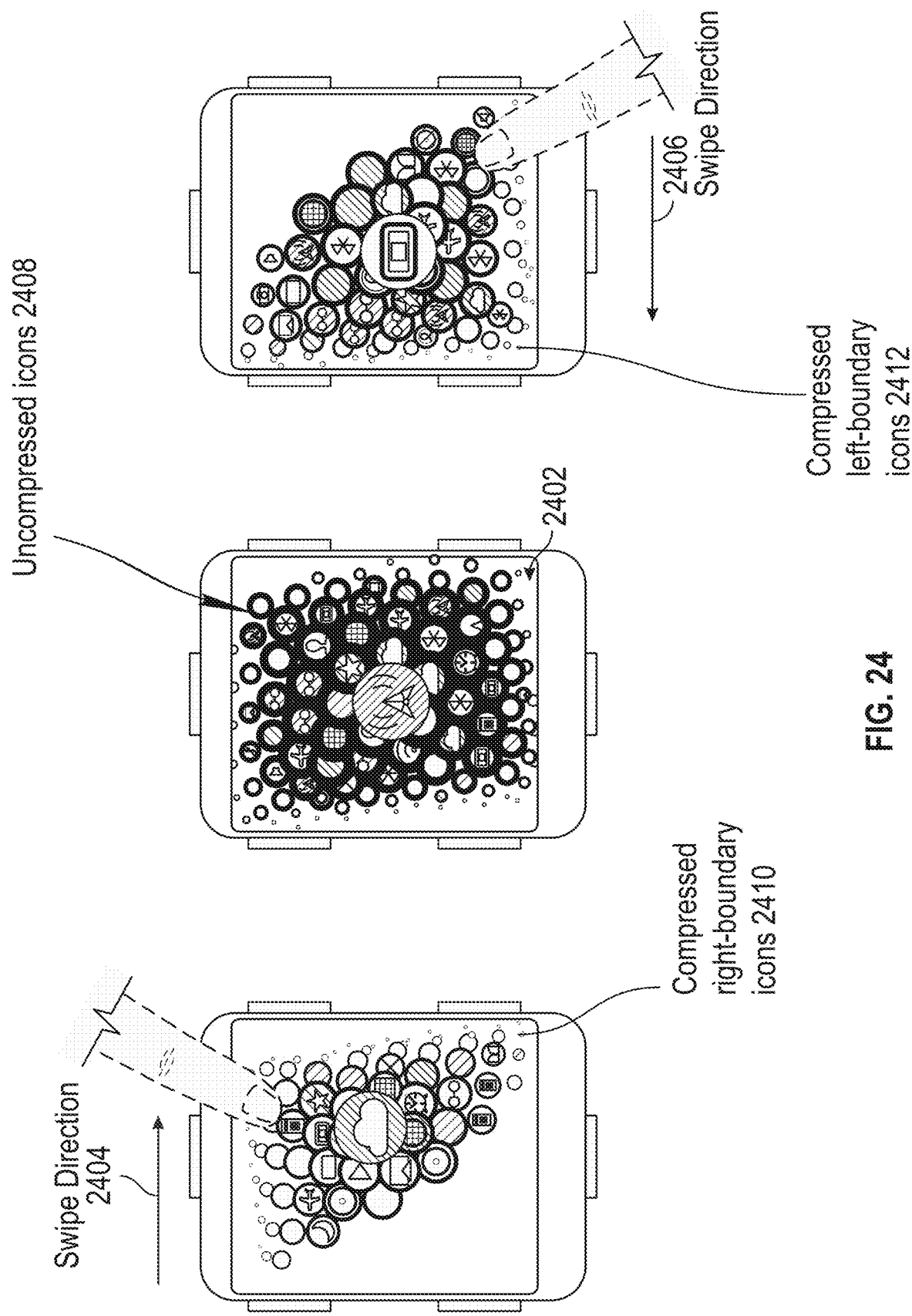
FIG. 24 illustrates an exemplary user interface and transition.

FIG. 24 illustrates icon movements that account for interaction between icons and grid boundaries. As shown, a number of icons are displayed according to non-symmetrical grid 2402. The displayed icons include uncompressed icons 2408. In response to touch input in the form of a rightward gesture in direction 2404, icons on the right boundary of grid 2402 can be compressed into compressed icons 2406 so that icons from the left side of grid 2402 are more predominately displayed either in enlarged or unenlarged form. Also, in response to a touch gesture in the leftward direction 2406, icons that are on the left boundary of grid 2402 can be compressed into compressed icons 2412 so that icons from the right side of grid 2402 are more predominately displayed. The above-described interaction allows all, or substantially all, icons to be simultaneously displayed while allowing a user to easily view and select an icon. Note that this compression may occur in a symmetrical grid, although not shown.

Figure 34:
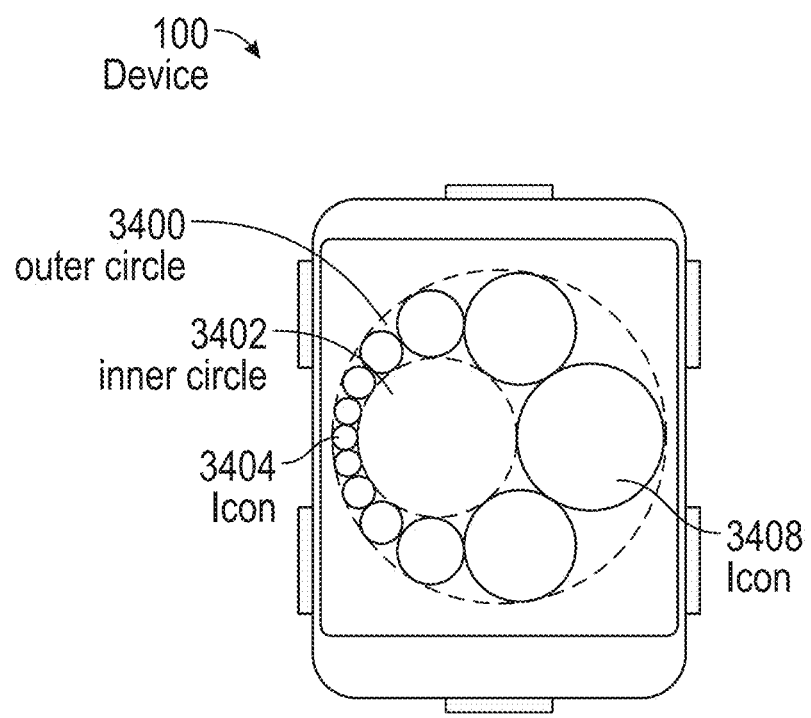
FIG. 34 illustrates an exemplary user interface.

FIG. 34 illustrates icon movements that account for interaction between grid boundaries and nearby icons. In the radial arrangement of FIG. 34, icons are arranged between invisible inner circle 3402 and invisible outer boundary circle 3400. Outer circle 3400 can be sized based on the physical size the touchscreen of device 100. Inner circle 3402 can be sized based on design and/or user preferences. Inner circle 3402 can also be sized based on user input, such as a crown rotation. Inner circle 3402 can respond to touchscreen input within its surface area. For example, a touch down that occurs within the surface area of inner circle 3402 and subsequent touch movement can be interpreted as panning of inner circle 3402. When inner circle 3402 is panned, the icons that are arranged between the inner circle 3402 and outer circle 3400, such as icons 3404 and 3408, can be resize based on the available spacing between inner circle 3402 and outer circle 3400, the number of icons being displayed, and the sizes of adjacent icons. For example, in response to the rightward panning of circle 3402, icon 3404 can increase in size, and the enlarging of icon 3404 can cause icon 3408 to decrease in size.

Note, in the absence of user input, displayed icons can be programmed to move on-screen to prevent screen burn-in. Also, icon arrangements can respond to multi-touch gestures. For example, a two-finger downward gesture on the touchscreen of device 100 (FIG. 1) can cause the display of system information such as a status bar. As another example, a two-finger gesture in which the two fingers move in opposite directions can configure device 100 (FIG. 1) for left-handed or right-handed use.

5. Additional Features

Turning back to FIG. 2, home screen 200 can display system-generated information such as alerts. For example, home screen 200 can display a reminder that the user has sat for an extended duration and exercise is in order. Also, screen 200 can display a suggestion for rest because the user has a busy calendar for the next morning. Also turning back to FIG. 3, screen 300 can be displayed when device 100 is coupled with a dock.

Figure 26:
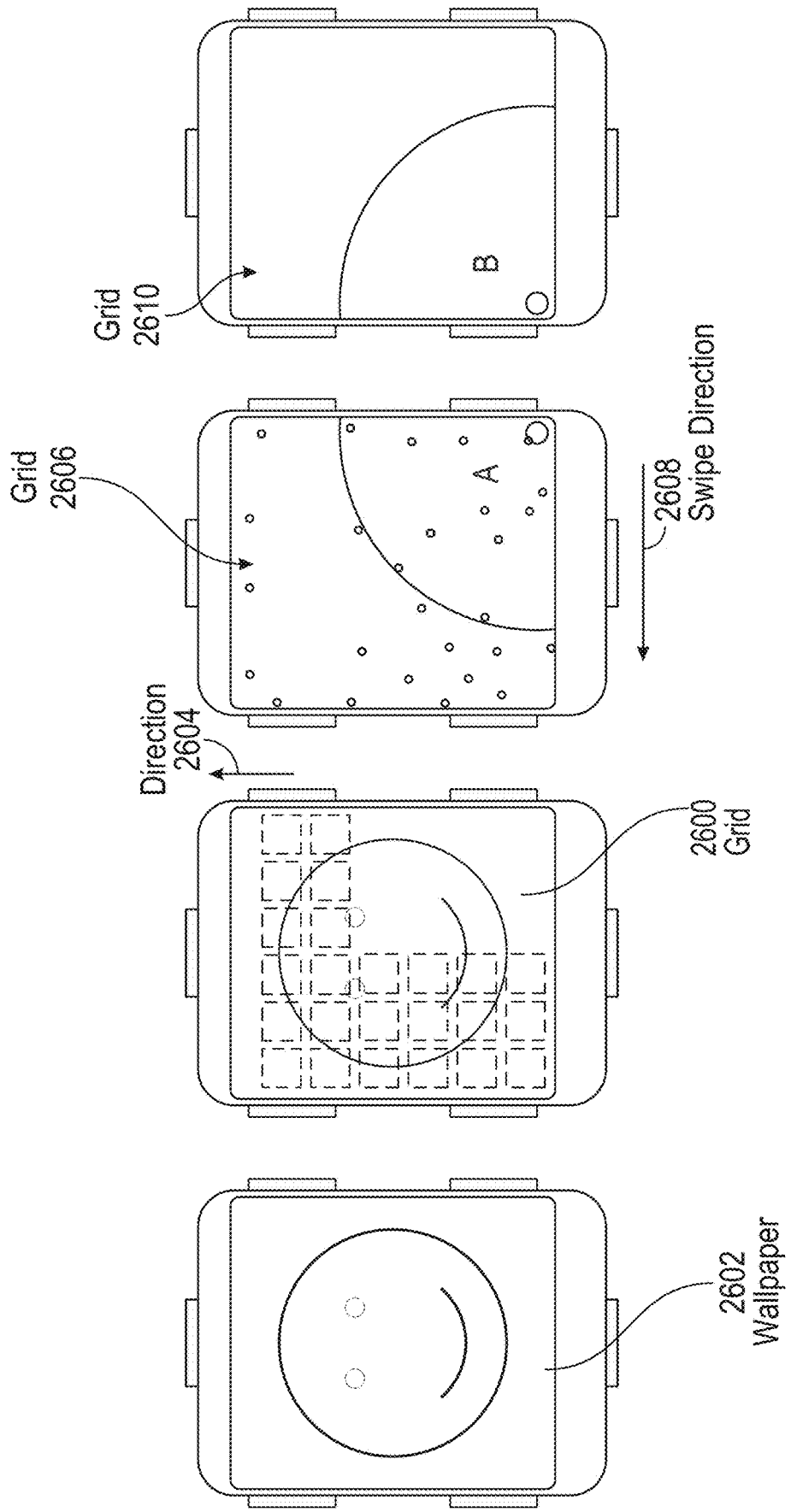
FIG. 26 illustrates an exemplary user interface.

FIG. 26 illustrates the use of wallpaper 2602 to aid user navigation in a grid of icons. As shown, grid 2600 has a relatively large number of icons. In response to crown rotation 2604, a subset of the icons from grid 2600 is enlarged and displayed in grid 2606. In addition, the corresponding portion of wallpaper 2602 displayed in the background of the subset is also displayed, meaning that, for example, if icons from the upper-left quadrant of grid 2600 become displayed in grid 2606, then the upper-left quadrant of wallpaper 2602 is also displayed with grid 2606. Also as shown, in response to a touch gesture in leftward direction 2608, device 100 can display another subset of icons from grid 2600. For example, in grid 2610, icons from the upper-right quadrant of grid 2600 are displayed together with the upper-right quadrant of wallpaper 2602. In this way, a user can determine the relationship between a set of currently displayed icons relative to the totality of icons available for display on device 100.

Figure 27:
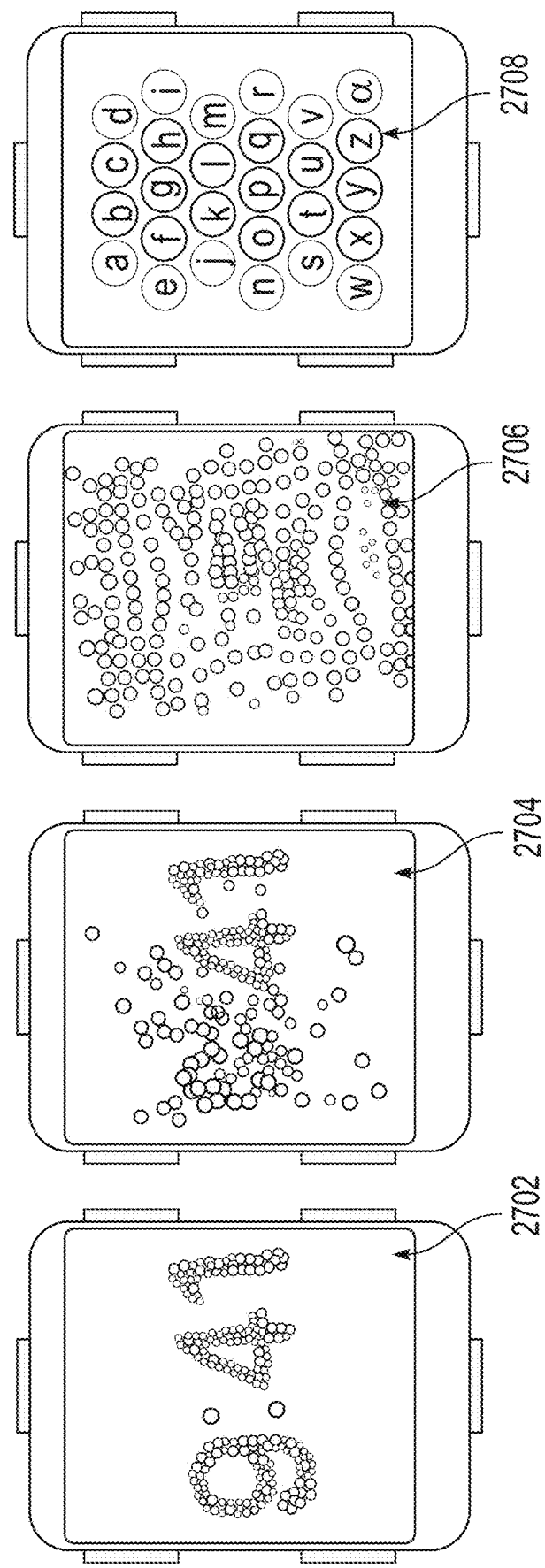
FIG. 27 illustrates an exemplary user interface and transition.

FIG. 27 illustrates an exemplary arrangement of icons where the arrangement provides information, for example current time information, to a user. The arrangement can be displayed in response to crown movement. Also, the arrangement can be displayed after a predetermined period of user input inactivity. For example, screen 2702, which uses icons in small sizes to show the current time, can be displayed after a predetermined period of user input inactivity. Further, in response to a crown rotation, screen 2702 can transition through screens 2704 and 2706 to screen 2708, which shows a grid of icons.

Figure 28:
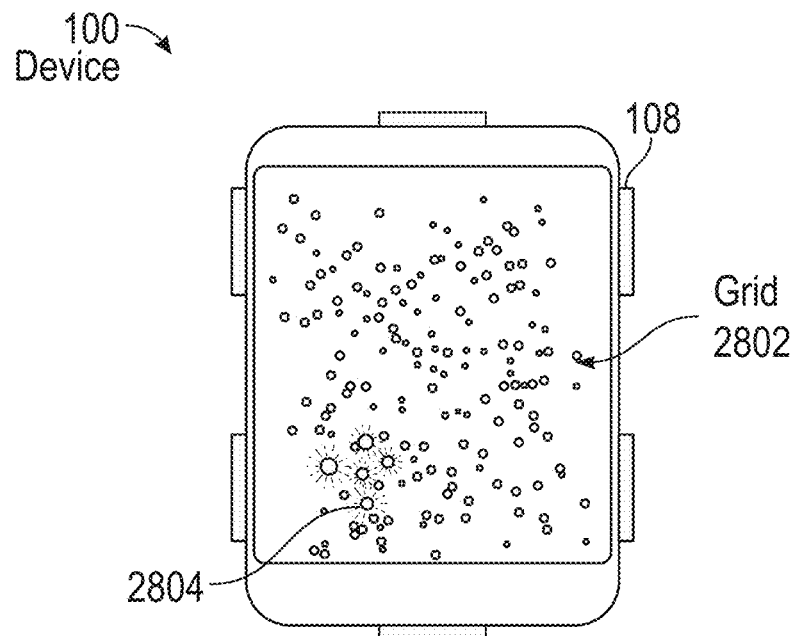
FIG. 28 illustrates an exemplary user interface.
Figure 29:
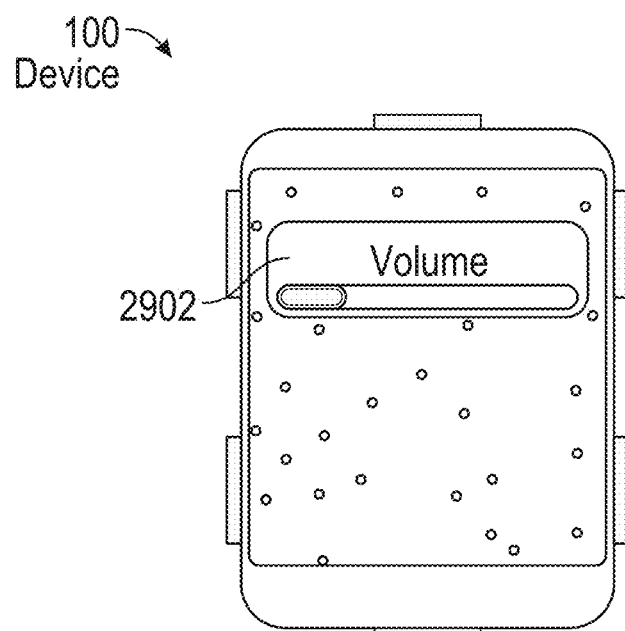
FIG. 29 illustrates an exemplary user interface.

FIG. 28 illustrates an exemplary arrangement of icons (grid 2802) where the color and/or intensity of displayed icons can change in response to incoming information. For example, icon 2804 corresponding to a messaging application can blink or glow when a new message arrives. In some embodiments, the blink or glow can correspond to the popularity of an application in an application store or frequency of use of the application in a larger ecosystem of users. Further, the icons of grid 2802 can show icons representing a larger set of applications available in an application store, beyond those applications that are installed FIG. 29 illustrates an exemplary display of a contextual message. A contextual message can be displayed in response to detection of a user's touch of crown 108. A contextual message indicates the current functionality of crown 108, which can take on different functions depending on the application that is currently operating in the foreground of device 100. For example, when a music application is operating in the foreground of device 100, a touch on crown 108 can result in the display of contextual message 2902 in the form of a volume indicator, which can indicate to a user that the current functionality of crown 108 is volume control.

Figure 35:
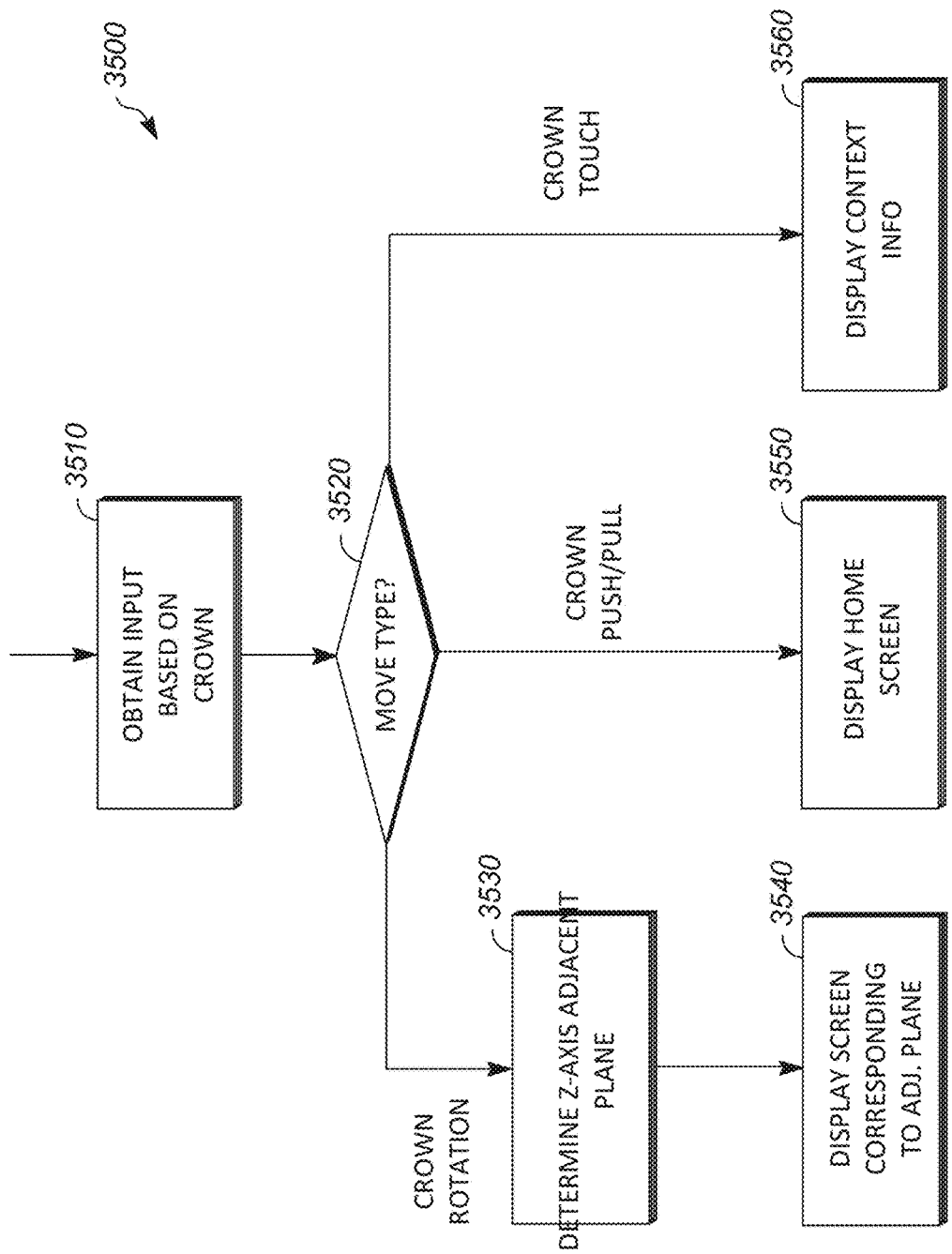
FIG. 35 illustrates an exemplary process.

FIG. 35 depicts exemplary process 3500 for providing the user interface techniques described above. At block 3510, input based on crown movement and/or crown touch is received. The crown movement can be a rotation, a push, and/or a pull. At block 3520, a decision is made based on the type of crown movement represented by the received input. If the received input represents a crown rotation, processing proceeds to block 3530. If the received input represents a crown push or pull, processing proceeds to block 3550. If the received input represents a crown touch (without a rotation or a push/pull), processing proceeds to block 3560. At block 3530, the currently displayed screen and its corresponding position along z-axis 906 (FIG. 9) can be determined. In addition, an adjacent level of information along the z-axis 906 can be determined. The adjacent level can be determined based on the direction of the crown rotation that is represented by the received input. A corresponding grid of icons, such as those illustrated by each of FIGS. 4-7, can be displayed. At block 3550, a home screen, such as the exemplary screen 200 of FIG. 2, can be displayed. In the alternative, a user-favorites screen, such as the exemplary screen 300 of FIG. 3, can be displayed. At block 3560, a contextual message, such as the exemplary contextual message 2902 of FIG. 29, can be displayed.

Figure 36:
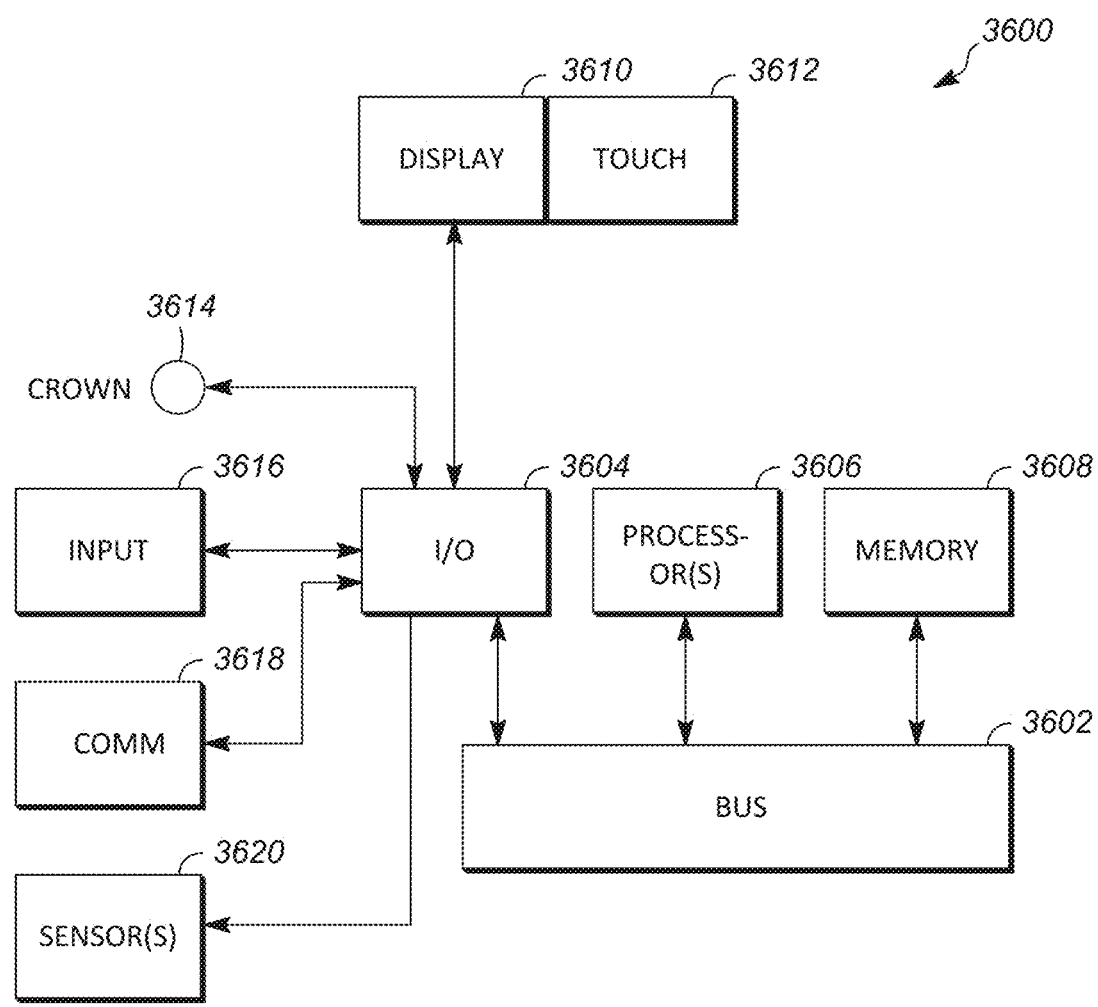
FIG. 36 illustrates an exemplary computing system.

FIG. 36 depicts exemplary computing system 3600 for providing the user interface techniques described above. In some embodiments, computing system 3600 can form device 100. As shown, computing system 3600 can have bus 3602 that connects I/O section 3604, one or more computer processors 3606, and a memory section 3608 together.

Memory section 3608 can contain computer-executable instructions and/or data for carrying out the above-described techniques, including process 3500 (FIG. 35). I/O section 3604 can be connected to display 3610, which can have touch-sensitive component 3612. I/O section 3604 can be connected to crown 3614. I/O section 3604 can be connected to input device 3616, which may include buttons. I/O section 3604 can be connected to communication unit 3618, which can provide Wi-Fi, Bluetooth, and/or cellular features, for example. I/O section 3604 can be connected to sensor pack 3620, which can have a gyroscope, a GPS sensor, a light sensor, a gyroscope, an accelerometer, and/or a combination thereof. Note, one or more of the above-described components can be part of a system-on-a-chip.

Memory section 3608 of computing system 3600 can be a non-transitory computer readable storage medium, for storing computer-executable instructions, which, when executed by one or more computer processors 3606, for example, can cause the computer processors to perform the user interface techniques described above, including process 3500 (FIG. 35). The computer-executable instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer readable storage medium" can be any medium that can contain or store computer-executable instructions for use by or in connection with the instruction execution system, apparatus, or device. The non-transitory computer readable storage medium can include, but is not limited to, magnetic, optical, and/or semiconductor storages. Examples of such storage include magnetic disks, optical discs based on CD, DVD, or Blu-ray technologies, as well as RAM, ROM, EPROM, flash memory, and solid-state memory.

Figures 37, 38, 39:
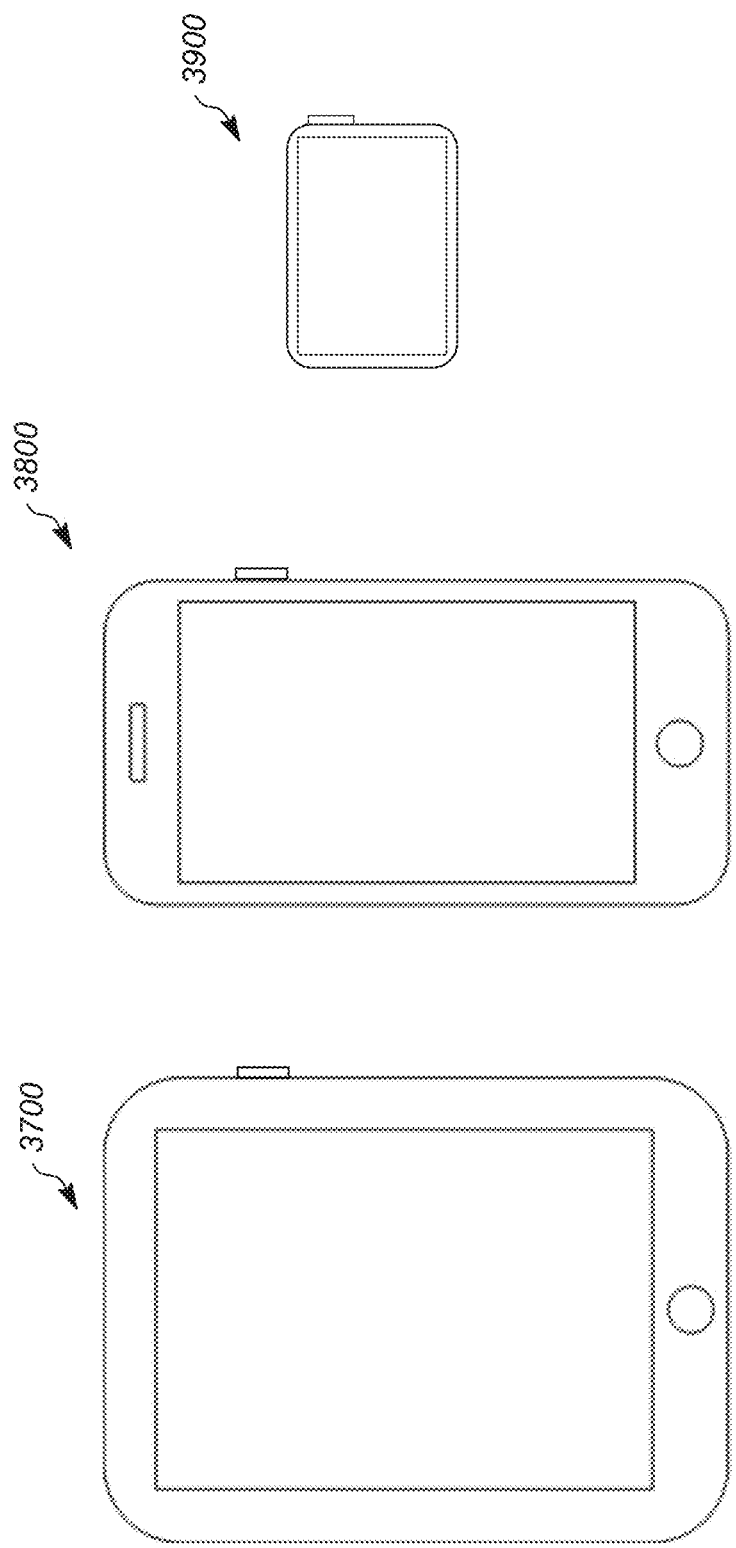
FIG. 37 illustrates an exemplary personal electronic device.
FIG. 38 illustrates an exemplary personal electronic device.
FIG. 39 illustrates an exemplary personal electronic device.

Computing system 3600 is not limited to the components and configuration of FIG. 36, but can include other or additional components in multiple configurations. In some embodiments, system 3600 can form personal electronic device 3700, which is a tablet, as shown in FIG. 37. In some embodiments, computing system 3600 can form personal electronic device 3800, which is a mobile phone, as shown in FIG. 38. In some embodiments, computing system 3600 can form personal electronic device 3900, which is a portal music device, as shown in FIG. 39.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the appended claims.

What is claimed is:

1. A computer-implemented method, comprising:
   at an electronic device with a display and a touch-sensitive surface:
      displaying a plurality of application icons at different sizes including a first size and a second size that is smaller than the first size;
      detecting a swipe input on the touch-sensitive surface, and in response to detecting the swipe input resizing a plurality of the application icons:
         in accordance with a determination that the swipe input is in a first direction:
            reducing a size of one or more application icons in the plurality of application icons that are within a predefined distance of a first edge of the display to the second size; and
            increasing a size of application icons of one or more application icons closest to a second edge of the display so that the application icons closest to the second edge of the display are all larger than the second size, wherein at least one application icon in the plurality of application icons is displayed at the first size that is larger than the second size after increasing the size of the one or more application icons closest to the second edge of the display; and
         in accordance with a determination that the swipe input is in a second direction that is different from the first direction:
            reducing a size of one or more application icons in the plurality of application icons that are within the predefined distance of the second edge of the display to the second size; and
            increasing a size of application icons of one or more application icons closest to the first edge of the display so that the application icons closest to the first edge of the display are all larger than the second size, wherein at least one application icon in the plurality of application icons is displayed at the first size that is larger than the second size after increasing the size of the one or more application icons closest to the first edge of the display.

2. The method of claim 1, further comprising:
   prior to detecting the swipe input on the touch-sensitive surface, displaying a first application icon of the plurality of application icons substantially centered relative to the display; and
   in accordance with a determination that the swipe input is in a first direction:
      cease displaying the first application icon of the plurality of application icons substantially centered relative to the display; and
      displaying a second application icon of the plurality of application icons different from the first application icon substantially centered relative to the display.

3. The method of claim 1, further comprising:
   prior to detecting the swipe input on the touch-sensitive surface, displaying a first application icon of the plurality of application icons larger relative to the remaining application icons of the plurality of application icons; and
   in accordance with a determination that the swipe input is in a first direction:
      cease displaying the first application icon of the plurality of application icons larger relative to the remaining application icons of the plurality of application icons; and
      displaying the second application icon of the plurality of application icons different from the first application icon larger relative to the remaining application icons of the plurality of application icons.

4. The method of claim 3, further comprising:
   prior to detecting the swipe input on the touch-sensitive surface, displaying the first application icon of the plurality of application icons substantially centered relative to the display; and
   in accordance with a determination that the swipe input is in a second direction:

cease displaying the first application icon of the plurality of application icons substantially centered relative to the display; and displaying a third application icon of the plurality of application icons substantially centered relative to the display, wherein the third application icon is different from the first application icon and the second application icon.

5. The method of claim 1, further comprising:

prior to detecting the swipe input on the touch-sensitive surface, displaying a first application icon of the plurality of application icons larger relative to the remaining application icons of the plurality of application icons; and in accordance with a determination that the swipe input is in a second direction:

cease displaying the first application icon of the plurality of application icons larger relative to the remaining application icons of the plurality of application icons; and displaying a third application icon of the plurality of application icons larger relative to the remaining application icons of the plurality of application icons, wherein the third application icon is different from the first application icon and the second application icon.

6. The method of claim 1, wherein the plurality of application icons correspond plurality open applications on the electronic device.

7. The method of claim 1, wherein the plurality of application icons correspond to a user- generated set of applications on the electronic device.

8. The method of claim 1, wherein the electronic device is a wearable electronic device.

9. The method of claim 1, further comprising:

receiving information representing an activity in an application, wherein the application corresponds to a displayed application icon; and in response to the received information, altering an appearance of the displayed application icon.

10. The method of claim 9, wherein the altering is one or more of blinking, changing color, and animating.

11. An electronic device comprising:

one or more processors;

a memory;

a display; and a touch-sensitive surface operatively coupled to the one or more processors; and one or more programs, wherein the one or more programs are stored in the memory and configured to be executed by the one or more processors, the one or more programs including instructions for:

displaying a plurality of application icons at different sizes including a first size and a second size that is smaller than the first size;

detecting a swipe input on the touch-sensitive surface, and in response to detecting the swipe input resizing a plurality of the application icons:

in accordance with a determination that the swipe input is in a first direction:

reducing a size of one or more application icons in the plurality of application icons that are within a predefined distance of a first edge of the display to the second size; and increasing a size of application icons of one or more application icons closest to a second edge of the display so that the application icons closest to the second edge of the display are all larger than the second size, wherein at least one application icon in the plurality of application icons is displayed at the first size that is larger than the second size after increasing the size of the one or more application icons closest to the second edge of the display; and in accordance with a determination that the swipe input is in a second direction that is different from the first direction:

reducing a size of one or more application icons in the plurality of application icons that are within the predefined distance of the second edge of the display to the second size; and increasing a size of application icons of one or more application icons closest to the first edge of the display so that the application icons closest to the first edge of the display are all larger than the second size, wherein at least one application icon in the plurality of application icons is displayed at the first size that is larger than the second size after increasing the size of the one or more application icons closest to the first edge of the display.

12. The electronic device of claim 11, the one or more programs further including instructions for:

prior to detecting the swipe input on the touch-sensitive surface, displaying a first application icon of the plurality of application icons substantially centered relative to the display; and in accordance with a determination that the swipe input is in a first direction:

cease displaying the first application icon of the plurality of application icons substantially centered relative to the display; and displaying a second application icon of the plurality of application icons different from the first application icon substantially centered relative to the display.

13. The electronic device of claim 11, the one or more programs further including instructions for:

prior to detecting the swipe input on the touch-sensitive surface, displaying a first application icon of the plurality of application icons larger relative to the remaining application icons of the plurality of application icons; and in accordance with a determination that the swipe input is in a first direction:

cease displaying the first application icon of the plurality of application icons larger relative to the remaining application icons of the plurality of application icons; and displaying the second application icon of the plurality of application icons different from the first application icon larger relative to the remaining application icons of the plurality of application icons.

14. The electronic device of claim 13, the one or more programs further including instructions for:

prior to detecting the swipe input on the touch-sensitive surface, displaying the first application icon of the plurality of application icons substantially centered relative to the display; and in accordance with a determination that the swipe input is in a second direction:

cease displaying the first application icon of the plurality of application icons substantially centered relative to the display; and displaying a third application icon of the plurality of application icons substantially centered relative to the display, wherein the third application icon is different from the first application icon and the second application icon.

15. The electronic device of claim 11, the one or more programs further including instructions for:

prior to detecting the swipe input on the touch-sensitive surface, displaying a first application icon of the plurality of application icons larger relative to the remaining application icons of the plurality of application icons; and in accordance with a determination that the swipe input is in a second direction:

cease displaying the first application icon of the plurality of application icons larger relative to the remaining application icons of the plurality of application icons; and displaying a third application icon of the plurality of application icons larger relative to the remaining application icons of the plurality of application icons, wherein the third application icon is different from the first application icon and the second application icon.

16. The electronic device of claim 11, wherein the plurality of application icons correspond plurality open applications on the electronic device.

17. The electronic device of claim 11, wherein the plurality of application icons correspond to a user-generated set of applications on the electronic device.

18. The electronic device of claim 11, wherein the electronic device is a wearable electronic device.

19. The electronic device of claim 11, the one or more programs further including instructions for:

receiving information representing an activity in an application, wherein the application corresponds to a displayed application icon; and in response to the received information, altering an appearance of the displayed application icon.

20. The electronic device of claim 19, wherein the altering is one or more of blinking, changing color, and animating.

21. A non-transitory computer-readable storage medium storing one or more programs configured to be executed by one or more processors of an electronic device with a display and a touch-sensitive surface, the one or more programs including instructions for:

displaying a plurality of application icons at different sizes including a first size and a second size that is smaller than the first size;

detecting a swipe input on the touch-sensitive surface, and in response to detecting the swipe input resizing a plurality of the application icons:

in accordance with a determination that the swipe input is in a first direction:

reducing a size of one or more application icons in the plurality of application icons that are within a predefined distance of a first edge of the display to the second size; and increasing a size of application icons of one or more application icons closest to a second edge of the display so that the application icons closest to the second edge of the display are all larger than the second size, wherein at least one application icon in the plurality of application icons is displayed at the first size that is larger than the second size after increasing the size of the one or more application icons closest to the second edge of the display; and in accordance with a determination that the swipe input is in a second direction that is different from the first direction:

reducing a size of one or more application icons in the plurality of application icons that are within the predefined distance of the second edge of the display to the second size; and increasing a size of application icons of one or more application icons closest to the first edge of the display so that the application icons closest to the first edge of the display are all larger than the second size, wherein at least one application icon in the plurality of application icons is displayed at the first size that is larger than the second size after increasing the size of the one or more application icons closest to the first edge of the display.

22. The non-transitory computer-readable storage medium of claim 21, the one or more programs further including instructions for:

prior to detecting the swipe input on the touch-sensitive surface, displaying a first application icon of the plurality of application icons substantially centered relative to the display; and in accordance with a determination that the swipe input is in a first direction:

cease displaying the first application icon of the plurality of application icons substantially centered relative to the display; and displaying a second application icon of the plurality of application icons different from the first application icon substantially centered relative to the display.

23. The non-transitory computer-readable storage medium of claim 21, the one or more programs further including instructions for:

prior to detecting the swipe input on the touch-sensitive surface, displaying a first application icon of the plurality of application icons larger relative to the remaining application icons of the plurality of application icons; and in accordance with a determination that the swipe input is in a first direction:

cease displaying the first application icon of the plurality of application icons larger relative to the remaining application icons of the plurality of application icons; and displaying the second application icon of the plurality of application icons different from the first application icon larger relative to the remaining application icons of the plurality of application icons.

24. The non-transitory computer-readable storage medium of claim 23, the one or more programs further including instructions for:

prior to detecting the swipe input on the touch-sensitive surface, displaying the first application icon of the plurality of application icons substantially centered relative to the display; and in accordance with a determination that the swipe input is in a second direction:

cease displaying the first application icon of the plurality of application icons substantially centered relative to the display; and displaying a third application icon of the plurality of application icons substantially centered relative to the display, wherein the third application icon is different from the first application icon and the second application icon.

25. The non-transitory computer-readable storage medium of claim 21, the one or more programs further including instructions for:
prior to detecting the swipe input on the touch-sensitive surface, displaying a first application icon of the plurality of application icons larger relative to the remaining application icons of the plurality of application icons; and
in accordance with a determination that the swipe input is in a second direction:
cease displaying the first application icon of the plurality of application icons larger relative to the remaining application icons of the plurality of application icons; and
displaying a third application icon of the plurality of application icons larger relative to the remaining application icons of the plurality of application icons, wherein the third application icon is different from the first application icon and the second application icon.

26. The non-transitory computer-readable storage medium of claim 21, wherein the plurality of application icons correspond plurality open applications on the electronic device.

27. The non-transitory computer-readable storage medium of claim 21, wherein the plurality of application icons correspond to a user-generated set of applications on the electronic device.

28. The non-transitory computer-readable storage medium of claim 21, wherein the electronic device is a wearable electronic device.

29. The non-transitory computer-readable storage medium of claim 21, the one or more programs further including instructions for:
receiving information representing an activity in an application, wherein the application corresponds to a displayed application icon; and
in response to the received information, altering an appearance of the displayed application icon.

30. The non-transitory computer-readable storage medium of claim 29, wherein the altering is one or more of blinking, changing color, and animating.

* * * * *

UNITED STATES PATENT AND TRADEMARK OFFICE
CERTIFICATE OF CORRECTION

PATENT NO. : 10,921,976 B2
APPLICATION NO. : 15/930300
DATED : February 16, 2021
INVENTOR(S) : Nicholas Zambetti et al.

Page 1 of 1

It is certified that error appears in the above-identified patent and that said Letters Patent is hereby corrected as shown below:

In the Claims

Claim 7, Column 15, Line 32, please delete "user- generated" and insert -- user-generated -- therefor.

Signed and Sealed this
Twenty-third Day of July, 2024

Katherine Kelly Vidal
*Director of the United States Patent and Trademark Office*